(12) United States Patent  
Takeuchi et al.

(10) Patent No.: US 12,022,245 B2  
(45) Date of Patent: Jun. 25, 2024

(54) EASY ACCESS PATCH PANEL

(71) Applicant: Go!Foton Holdings, Inc., Somerset, NJ (US)

(72) Inventors: Kenichiro Takeuchi, North Brunswick, NJ (US); Alla Shtabnaya, Hillsborough, NJ (US); David Zhi Chen, Dallas, TX (US); Haiguang Lu, Los Altos, CA (US)

(73) Assignee: Go!Foton Holdings, Inc., Somerset, NJ (US)

( * ) Notice: Subject to any disclaimer, the term of this patent is extended or adjusted under 35 U.S.C. 154(b) by 1013 days.

(21) Appl. No.: 16/916,980

(22) Filed: Jun. 30, 2020

(65) Prior Publication Data

US 2021/0409841 A1 Dec. 30, 2021

(51) Int. Cl.
| | |
|---|---|
| H04Q 1/00 | (2006.01) |
| H01R 24/00 | (2011.01) |
| H01R 24/64 | (2011.01) |
| H04Q 1/02 | (2006.01) |
| H04Q 1/04 | (2006.01) |

(52) U.S. Cl.
CPC ............ *H04Q 1/023* (2013.01); *H01R 24/64* (2013.01); *H04Q 1/04* (2013.01); *H01R 2201/04* (2013.01); *H04Q 2213/003* (2013.01)

(58) Field of Classification Search
CPC ...... H01R 2201/04; H01R 24/64; H04Q 1/04; H04Q 2213/003; H04Q 1/133; H04Q 1/023; H04Q 1/06; H04Q 1/13; G02B 6/3825; G02B 6/3897; G02B 6/4452
See application file for complete search history.

(56) References Cited

U.S. PATENT DOCUMENTS

| | | | |
|---|---|---|---|
| 5,100,221 A | 3/1992 | Carney et al. | |
| 6,301,424 B1 | 10/2001 | Hwang | |
| 6,786,647 B1 | 9/2004 | Hinds et al. | |
| 8,307,996 B2 * | 11/2012 | Taylor ..................... | H05K 7/18 211/26 |
| 8,712,206 B2 | 4/2014 | Cooke et al. | |

(Continued)

FOREIGN PATENT DOCUMENTS

| | | |
|---|---|---|
| CA | 3121187 A1 | 6/2020 |
| CN | 101657776 A | 2/2010 |

(Continued)

OTHER PUBLICATIONS

European Search Report issued in Applnn. No. 21181022.1 dated Dec. 17, 2021 (2 pages).

*Primary Examiner* — Abdullah A Riyami
*Assistant Examiner* — Thang H Nguyen
(74) *Attorney, Agent, or Firm* — Lerner David LLP

(57) ABSTRACT

Technology allowing for easy access to connectors in a patch panel. In one of the configurations a patch panel includes at least one patch panel subassembly, each patch panel subassembly including at least one mounting plate and a plurality of port assemblies, the at least one mounting plate being configured to accommodate the port assemblies so that each port assembly can individually translate along a direction parallel to a surface of the mounting plate and can rotate about an axis perpendicular to the surface of the mounting plate.

5 Claims, 58 Drawing Sheets

(56) References Cited

U.S. PATENT DOCUMENTS

| | | | |
|---|---|---|---|
| 8,827,568 B1* | 9/2014 | Isenhour | G02B 6/3825 |
| | | | 385/53 |
| 9,020,320 B2 | 4/2015 | Cooke et al. | |
| 9,291,790 B2* | 3/2016 | Kimbrell | G02B 6/4471 |
| 10,094,996 B2* | 10/2018 | Cooke | G02B 6/4455 |
| 10,120,153 B2 | 11/2018 | Cooke et al. | |
| 10,268,013 B2* | 4/2019 | Wiltjer | G02B 6/4452 |
| 10,444,456 B2 | 10/2019 | Cooke et al. | |
| 10,488,612 B2* | 11/2019 | Gonzalez Covarrubias | |
| | | | G02B 6/4452 |
| 10,890,724 B2* | 1/2021 | Haase | G02B 6/32 |
| 11,002,932 B2* | 5/2021 | Alexi | H02G 15/117 |
| 11,448,843 B2* | 9/2022 | Geling | G02B 6/4455 |
| 2003/0096536 A1 | 5/2003 | Clark et al. | |
| 2005/0237721 A1* | 10/2005 | Cowley | G02B 6/4452 |
| | | | 361/727 |
| 2006/0018622 A1 | 1/2006 | Caveney et al. | |
| 2007/0249222 A1* | 10/2007 | Skluzacek | H01R 9/2475 |
| | | | 439/541.5 |
| 2008/0254684 A1 | 10/2008 | Tracy et al. | |
| 2008/0292261 A1 | 11/2008 | Kowalczyk et al. | |
| 2009/0207577 A1 | 8/2009 | Fransen et al. | |
| 2010/0111483 A1 | 5/2010 | Reinhardt et al. | |
| 2010/0316334 A1* | 12/2010 | Kewitsch | G02B 6/356 |
| | | | 901/2 |
| 2012/0236490 A1 | 9/2012 | Xia | |
| 2012/0236491 A1 | 9/2012 | Wallace et al. | |
| 2012/0236493 A1 | 9/2012 | Wallace et al. | |
| 2013/0343019 A1 | 12/2013 | Amann et al. | |
| 2014/0112828 A1 | 4/2014 | Grant et al. | |
| 2014/0133822 A1* | 5/2014 | de los Santos Campos | |
| | | | G02B 6/44 |
| | | | 385/137 |
| 2014/0219622 A1 | 8/2014 | Coan et al. | |
| 2015/0362692 A1 | 12/2015 | Grandidge et al. | |
| 2017/0023740 A1 | 1/2017 | Kewitsch | |
| 2017/0276893 A1 | 9/2017 | Geling et al. | |
| 2017/0293099 A1 | 10/2017 | Alexi et al. | |
| 2018/0217337 A1* | 8/2018 | Smith | G02B 6/3897 |
| 2018/0275355 A1* | 9/2018 | Haase | G02B 6/3839 |
| 2018/0299632 A1 | 10/2018 | Van Baelen et al. | |
| 2020/0088964 A1* | 3/2020 | Desard | H02G 15/013 |
| 2020/0310046 A1* | 10/2020 | Kanai | G02B 6/4471 |
| 2023/0335950 A1* | 10/2023 | Liu | H01R 13/502 |

FOREIGN PATENT DOCUMENTS

| | | |
|---|---|---|
| CN | 106647201 A | 5/2017 |
| CN | 107076953 A | 8/2017 |
| CN | 107111092 A | 8/2017 |
| CN | 108139542 A | 6/2018 |
| CN | 108139544 A | 6/2018 |
| EP | 1096617 A1 | 5/2001 |
| WO | 2009126860 A2 | 10/2009 |

\* cited by examiner

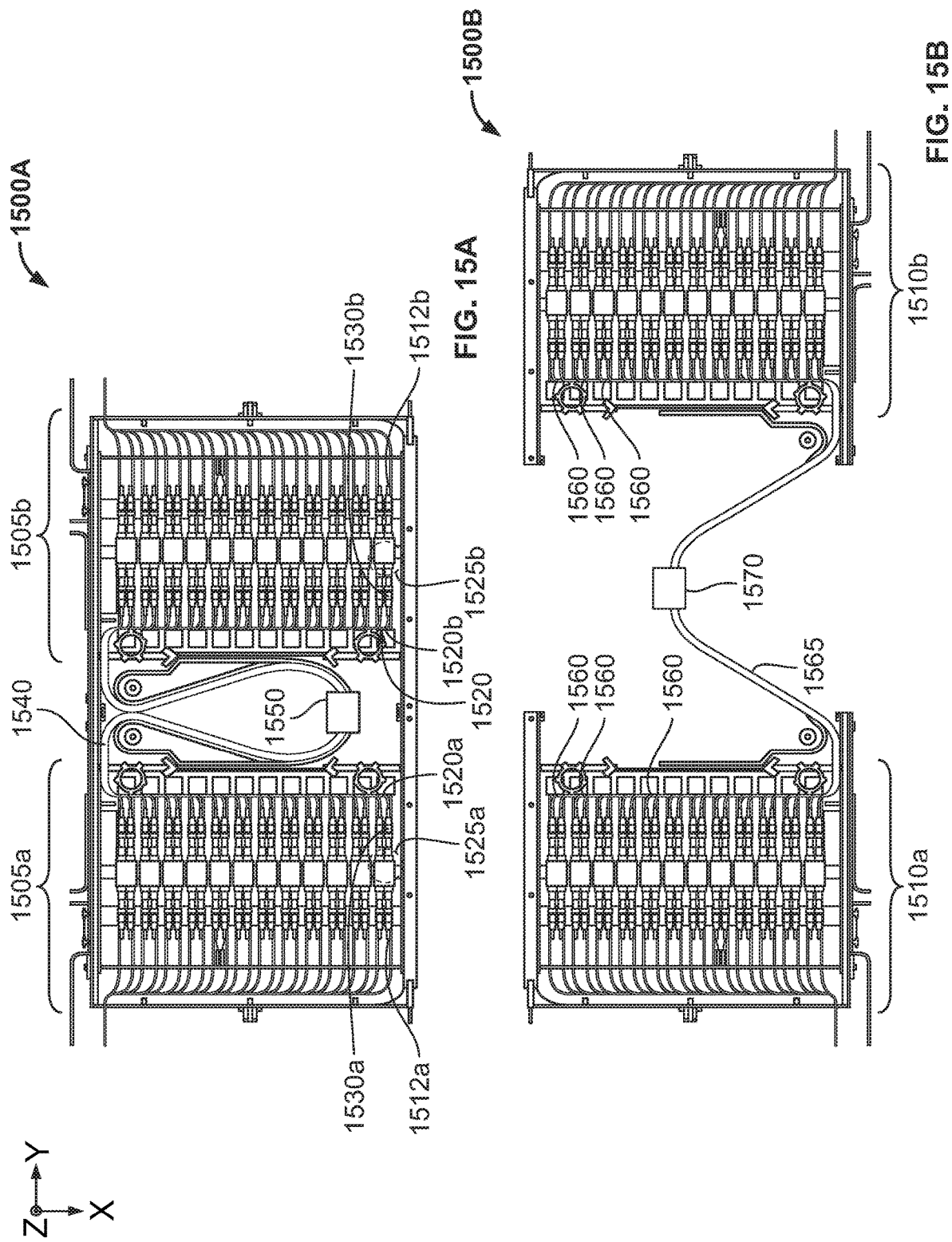

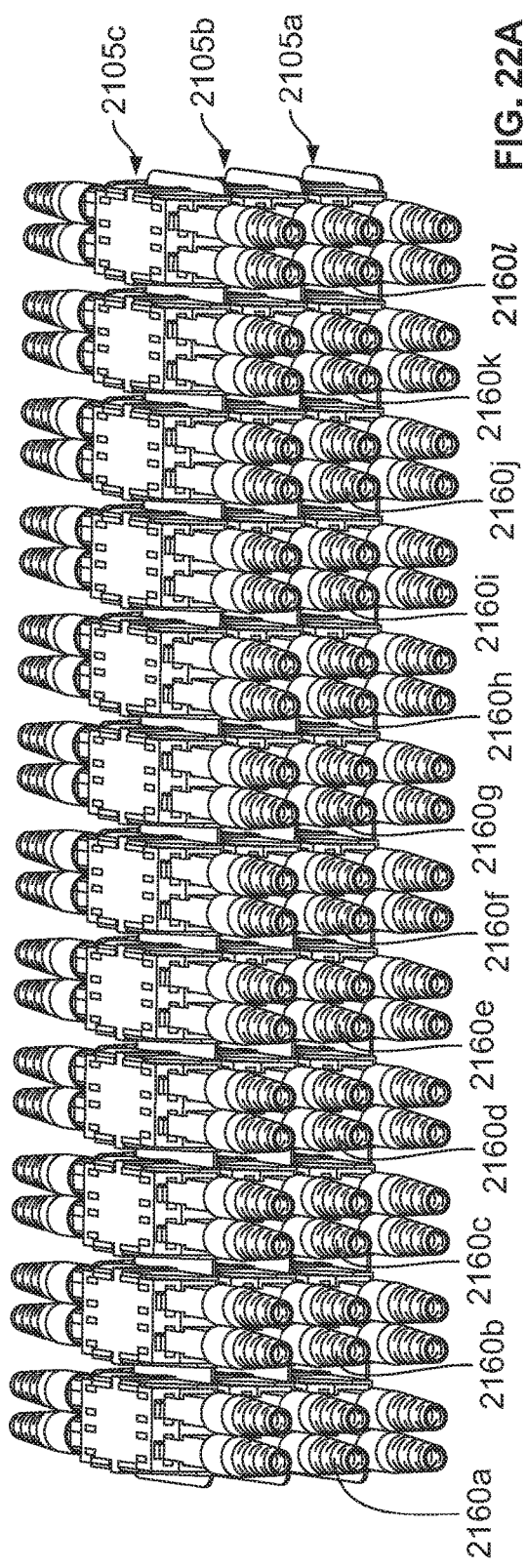
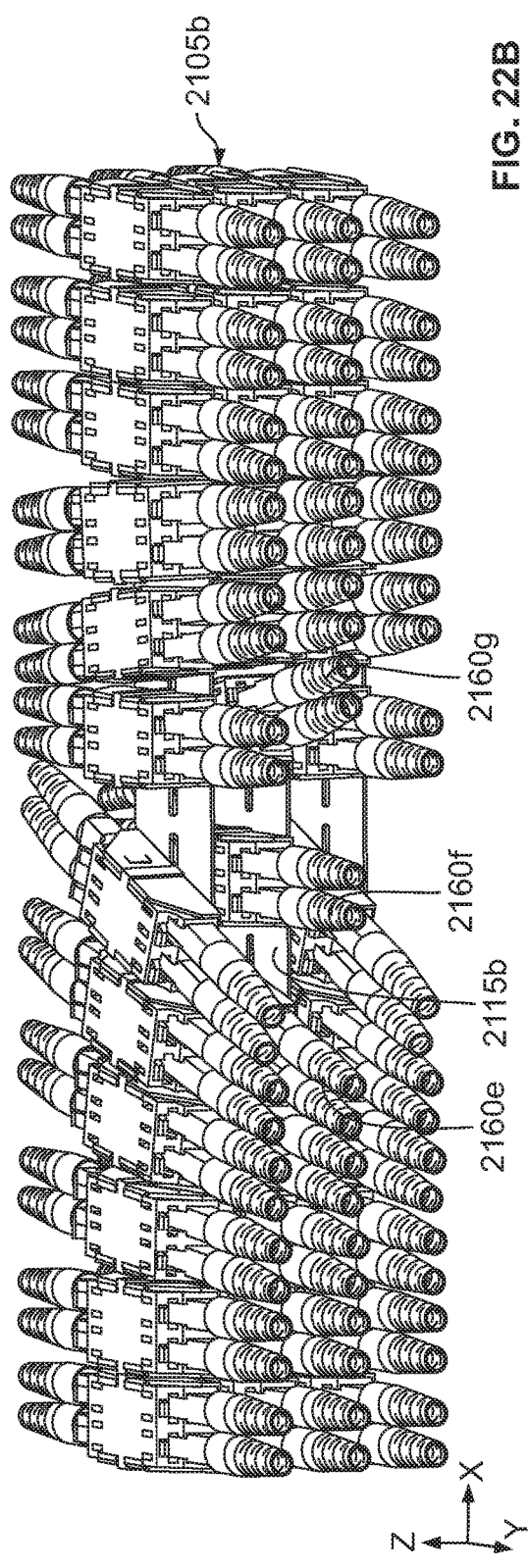
FIG. 22A
FIG. 22B

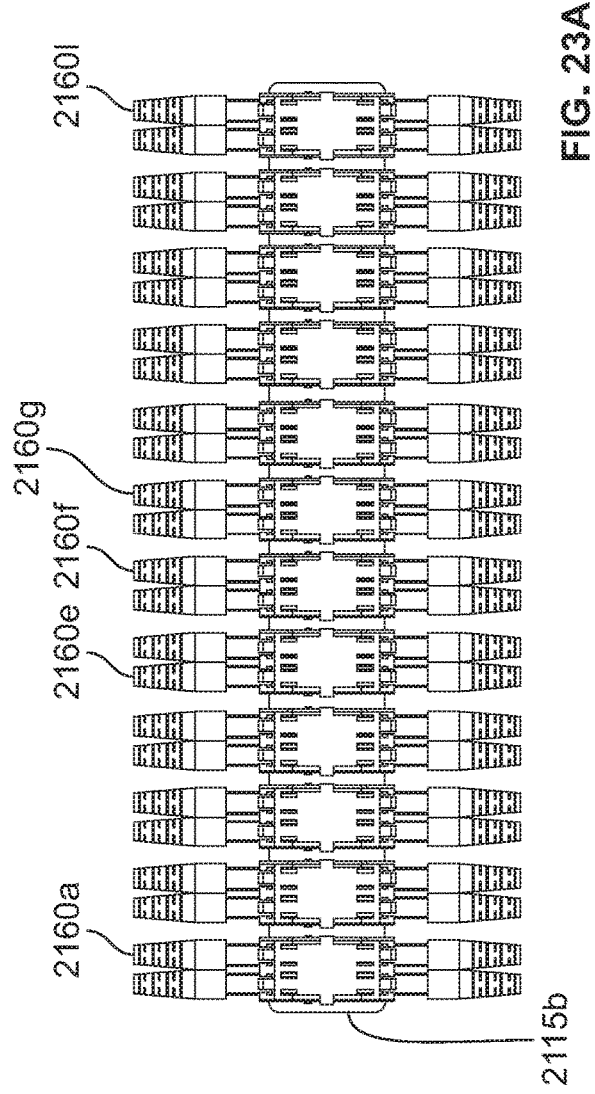
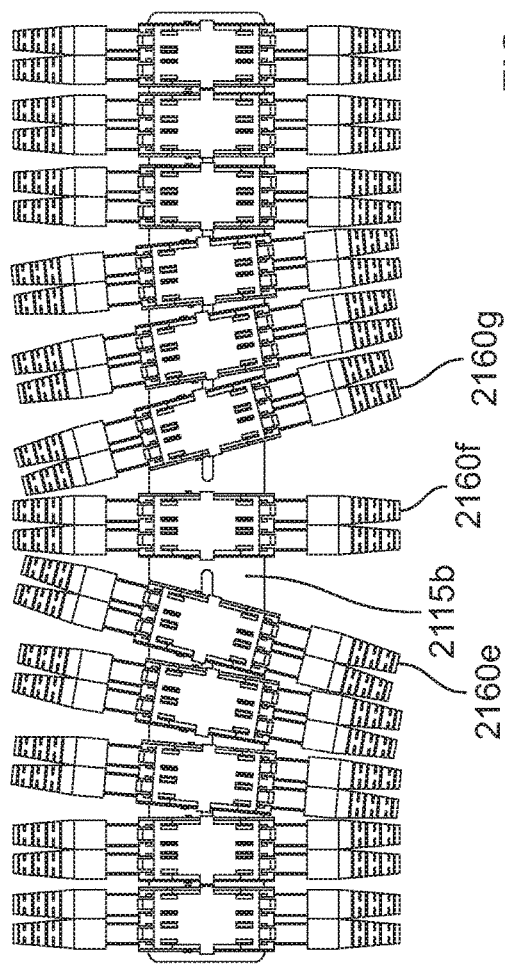
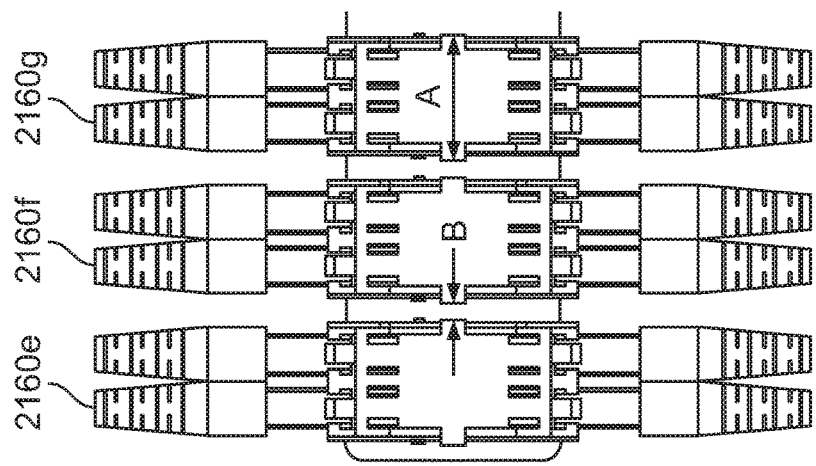
FIG. 23A
FIG. 23C
FIG. 23B

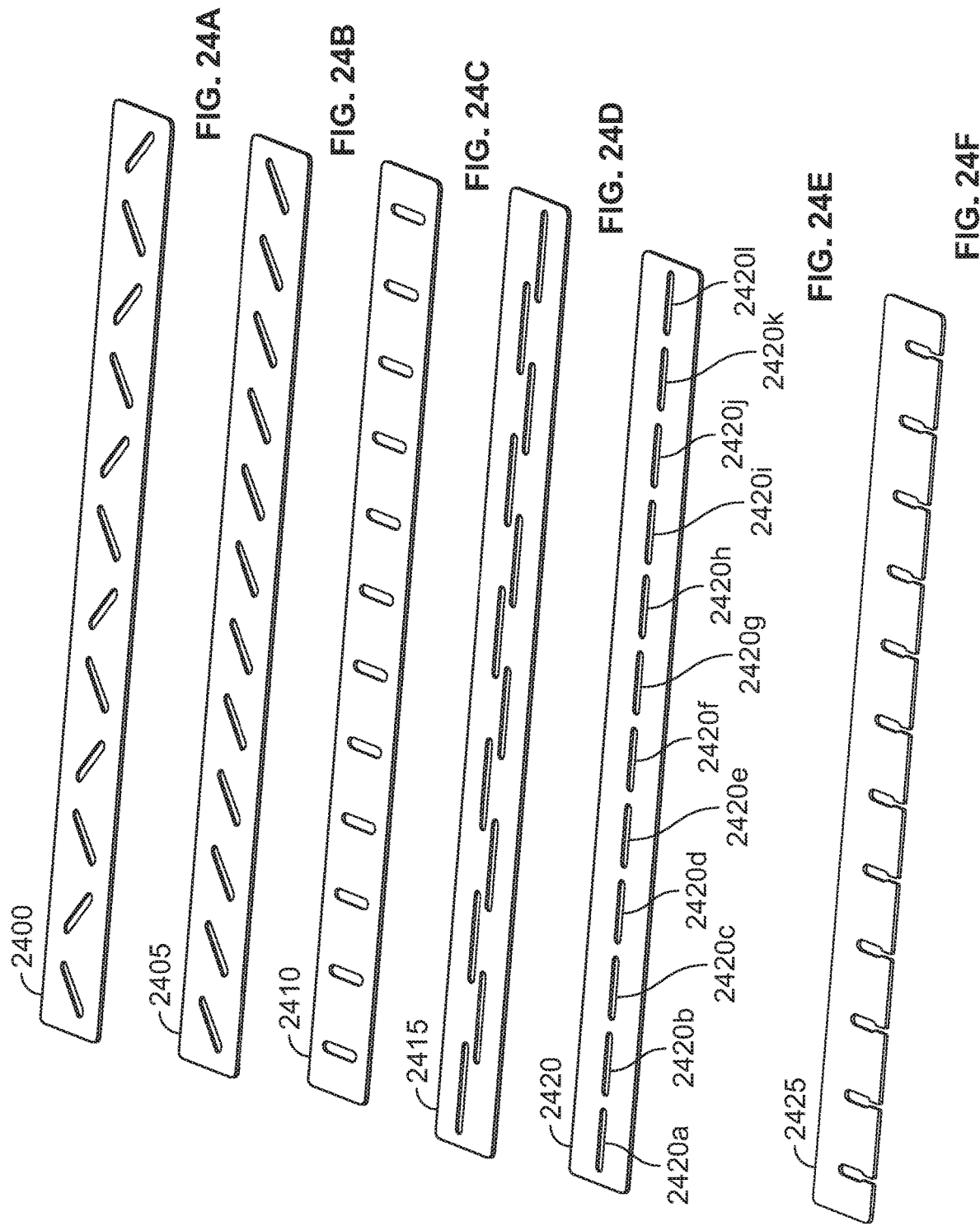

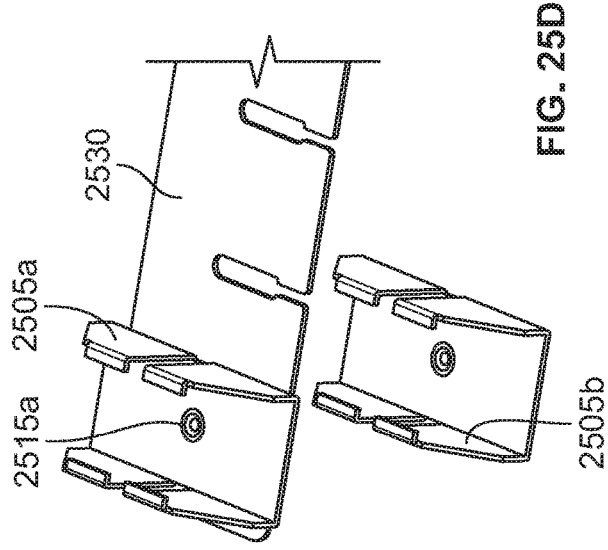
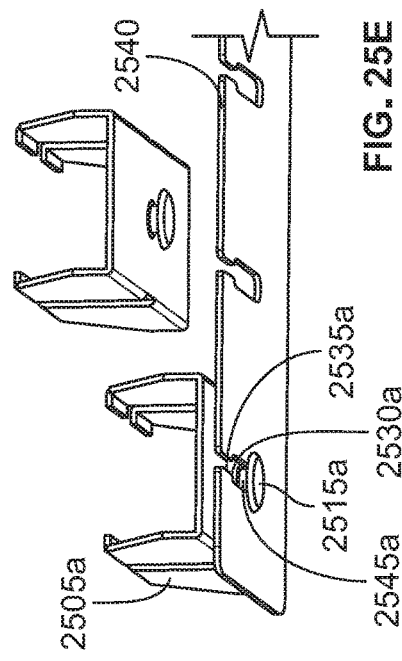
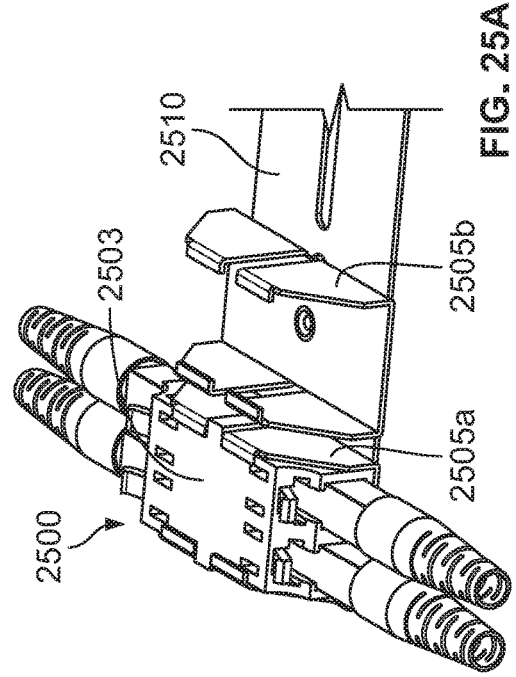
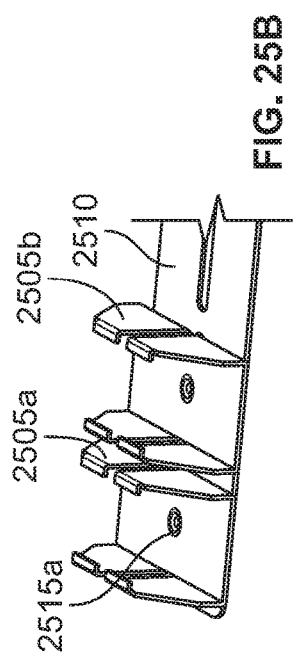
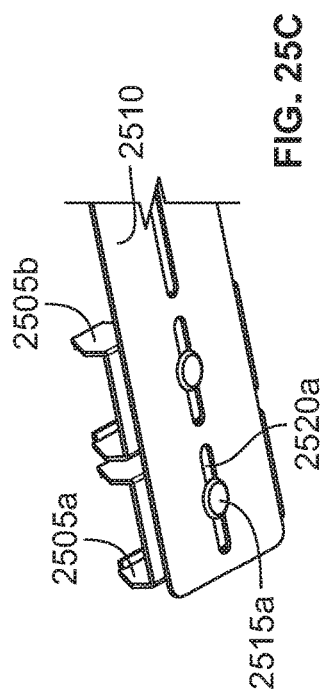

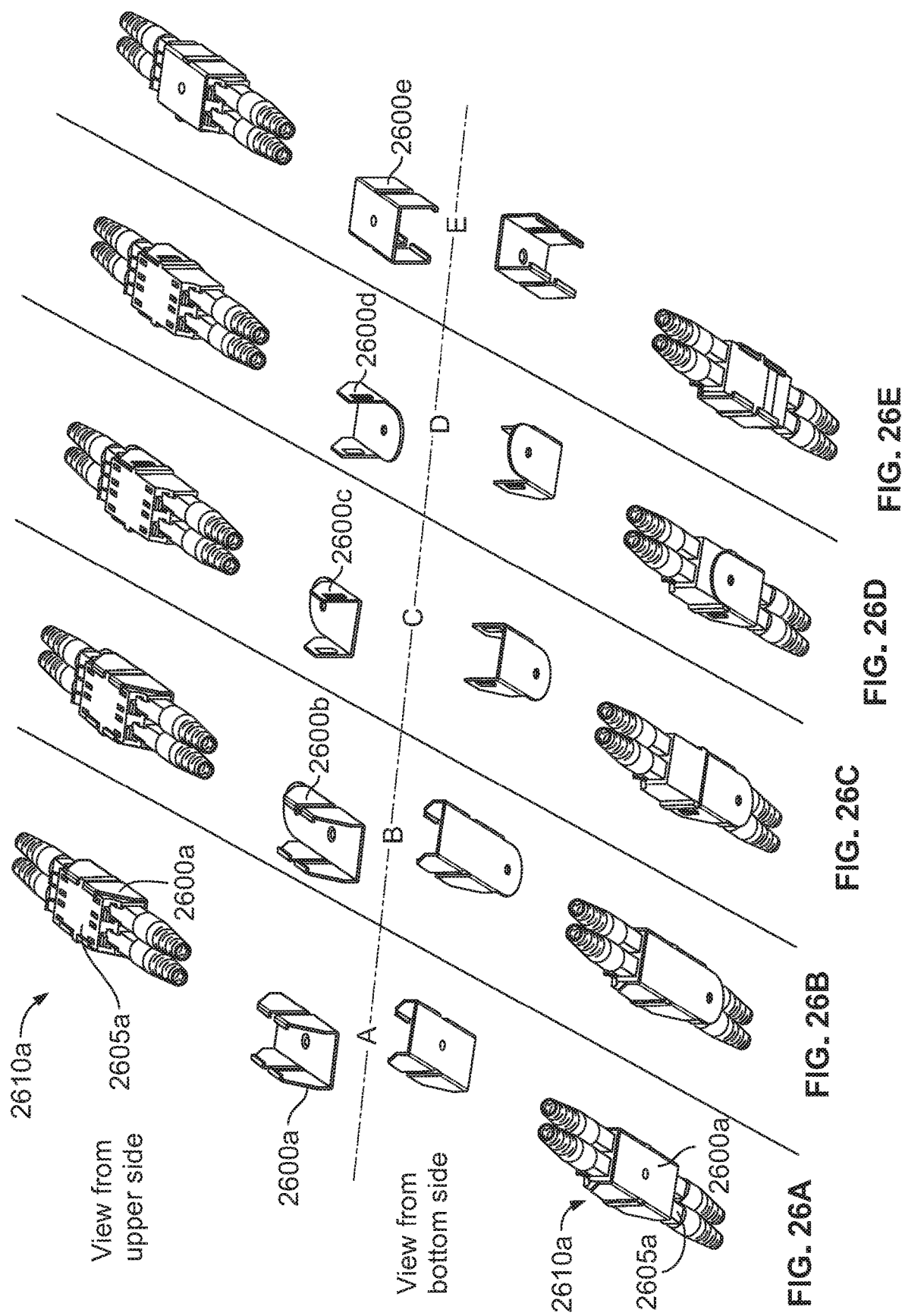

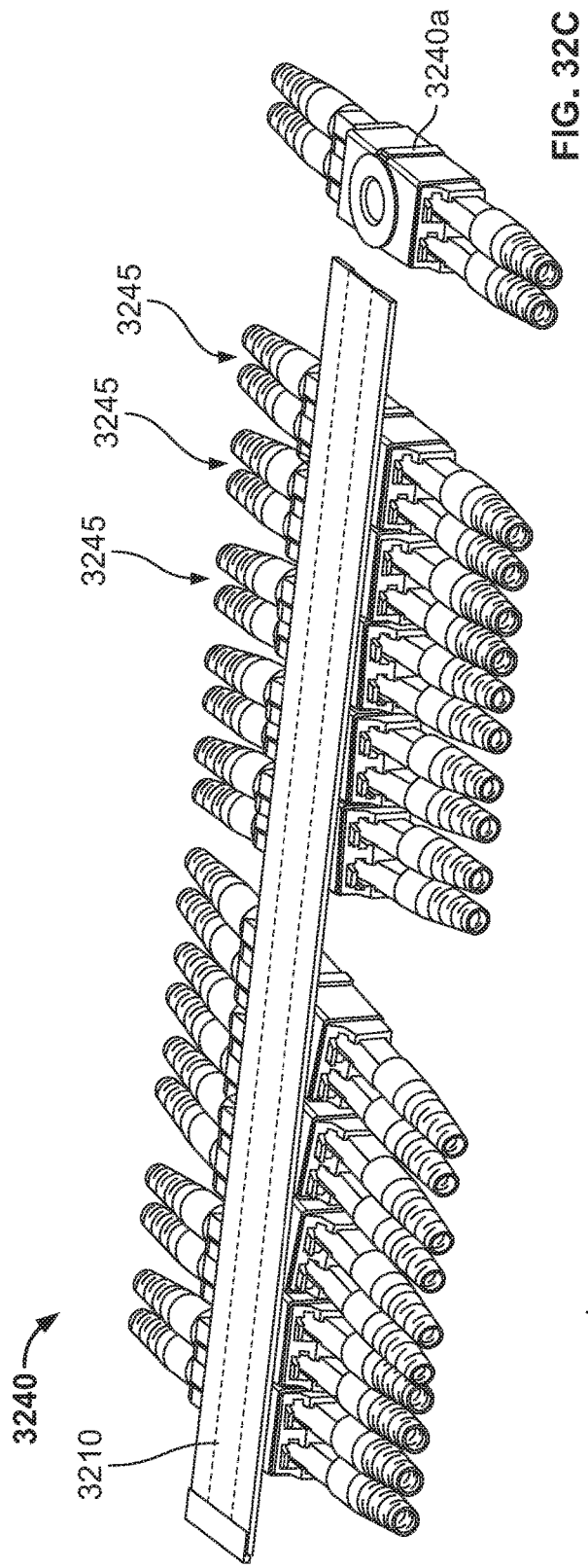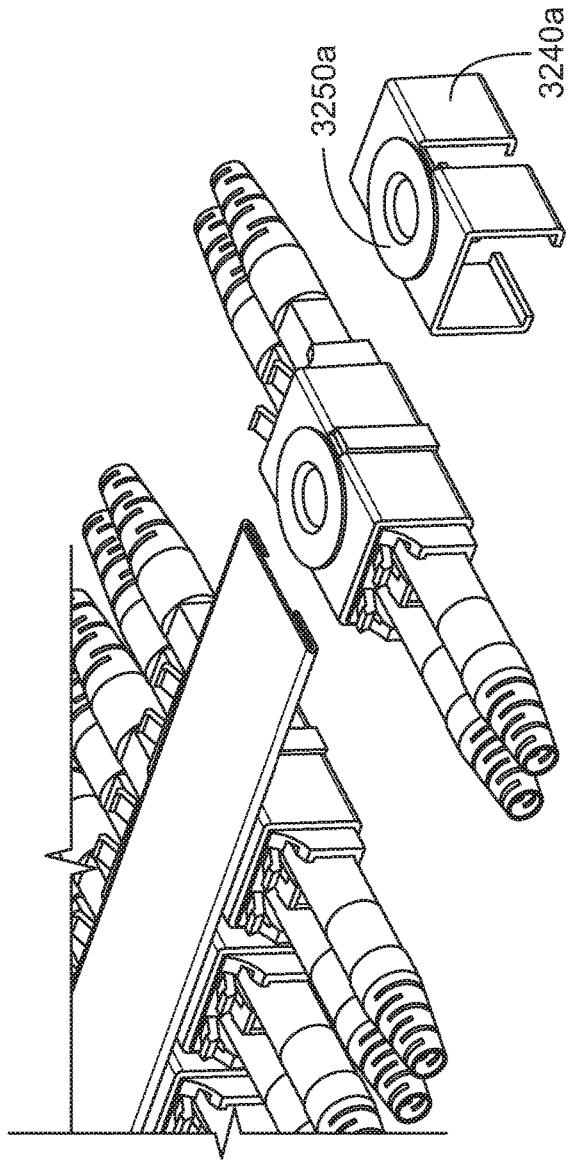

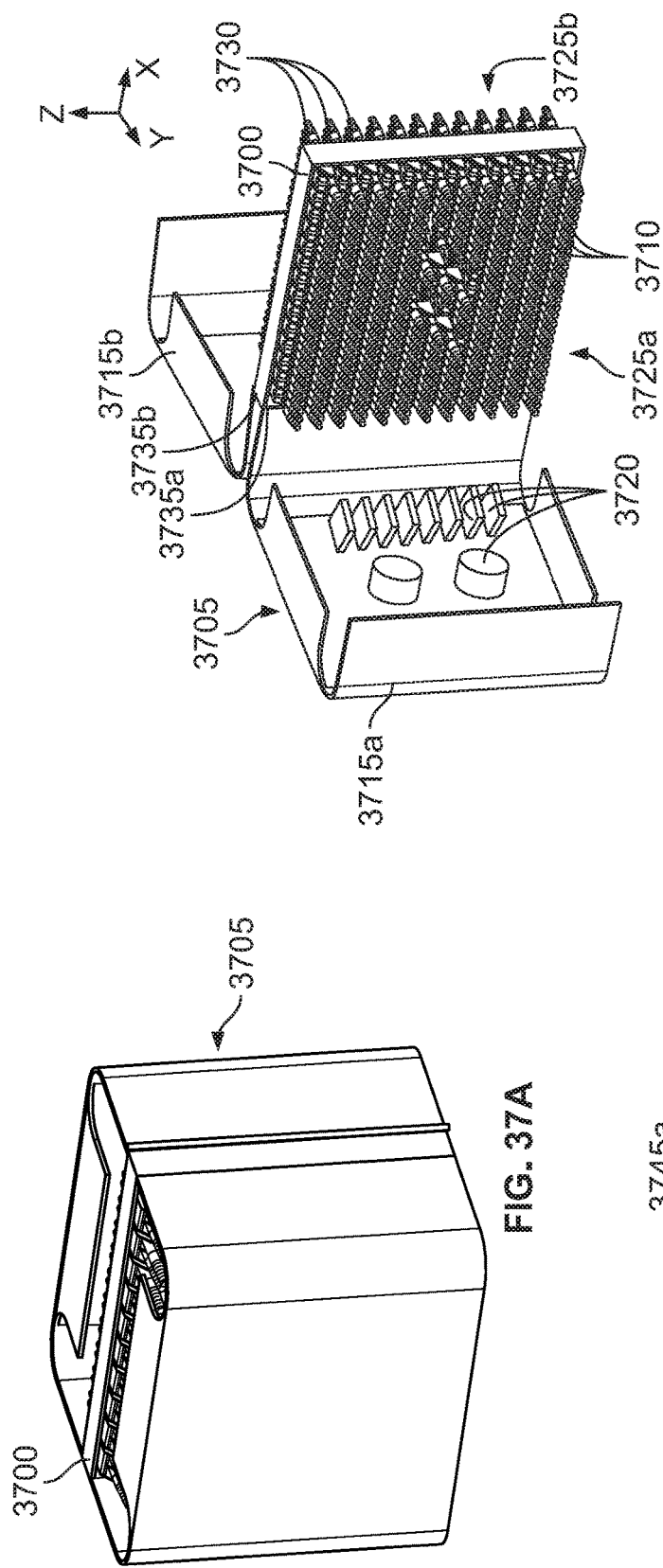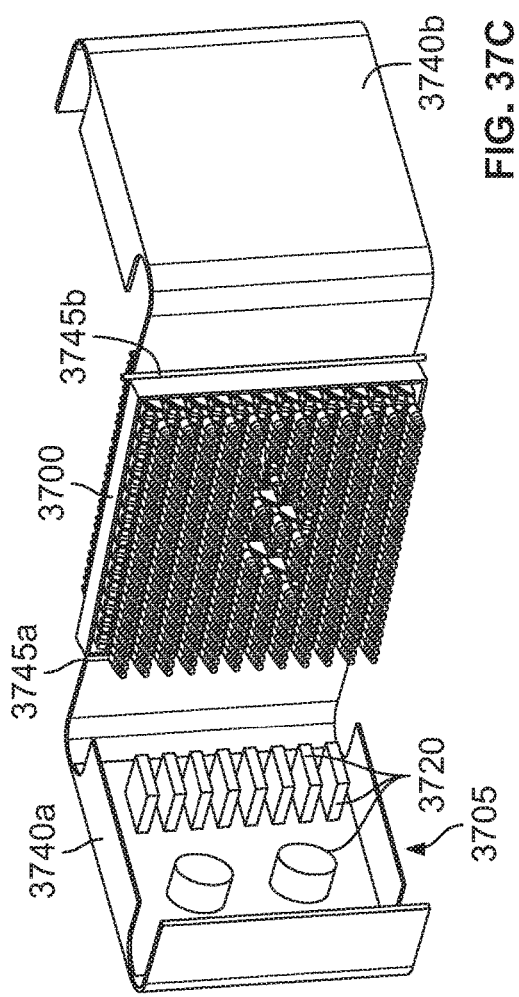

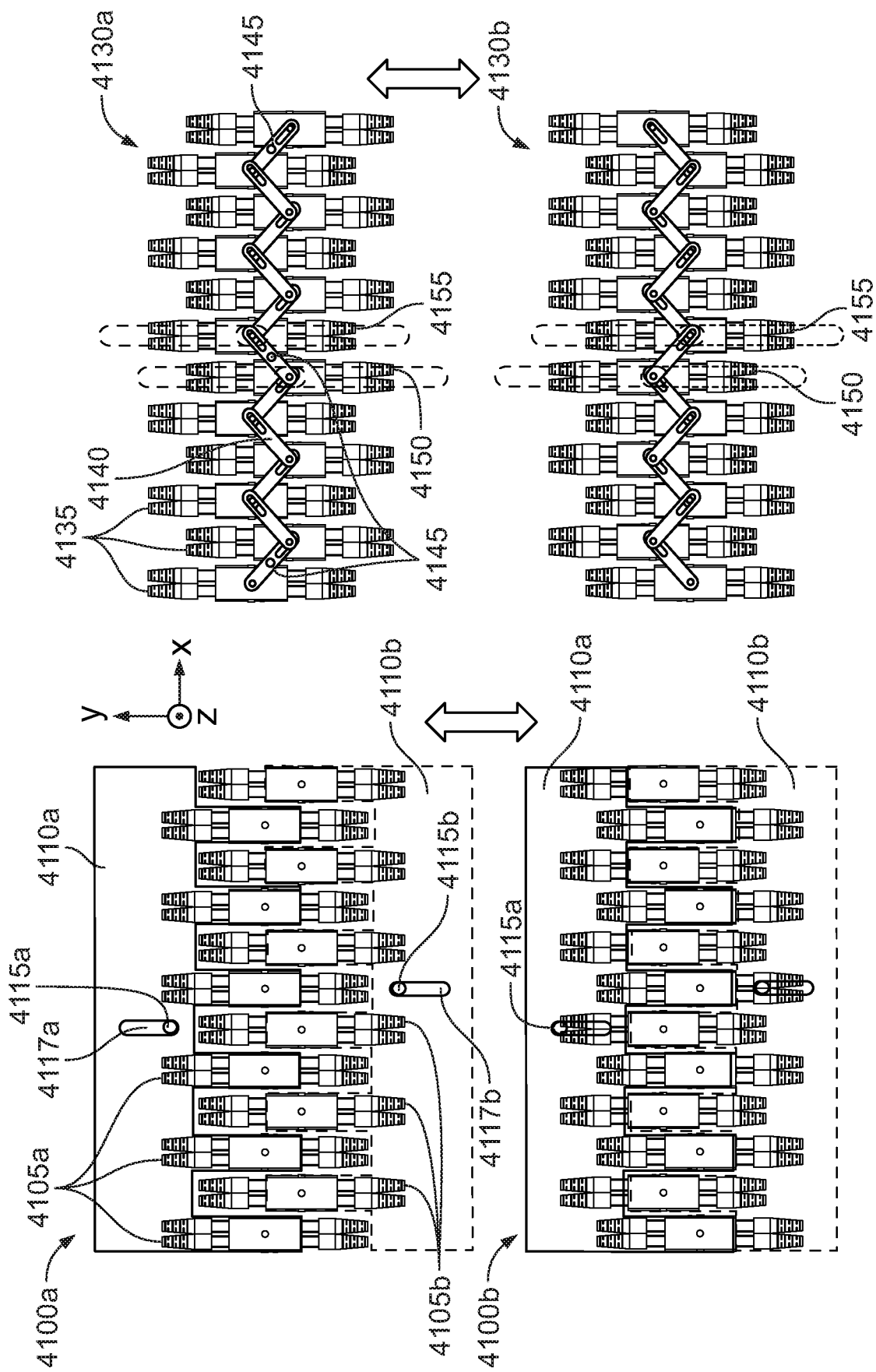

EASY ACCESS PATCH PANEL

BACKGROUND OF THE INVENTION

Patch panels are widely used in network systems to monitor, interconnect and test circuits. A patch panel generally consists of a two-sided array of connection ports that are adapted to receive communication lines, such as optical fiber cables. The connection ports may themselves be two-sided, with the cable inserted on one side of a given connection port being communicatively coupled to the cable inserted on the other side of the same connection port.

Patch panels have shrunken in size over time in order to conserve space. However, as the patch panel shrinks in size, it also becomes increasingly difficult to maintain the patch panel and manage the cable connections. The cables are connected and disconnected by manual latching mechanisms, and a user must be able to access the latching mechanisms in order to latch or unlatch a cable with its corresponding connection port.

In order to make the cable connections more accessible, the patch panel may be designed with sliding trays. The connection ports are built into the sliding trays, so that when a tray is slid out, the connection ports slide out with the trays. The sliding trays make the connection ports much more accessible since a single row of ports can be slid out of the array at a time, so that the rows of connection ports immediately above and below no longer interfere with access to the row of connection ports on the slid-out tray.

One tradeoff of the sliding tray design is that the cables connected to the connection ports must be extra-long in order to move in and out with the sliding tray, such that undesired bending stresses on cables caused by pulling on cables with the movement of the trays may be avoided. This excess length in the cables can itself make accessing the connection ports more difficult, especially in a high density patch panel configuration where space for running the lengths of cables extending from the connection ports is limited. Additionally, longer length cables are more liable to become tangled with one another.

Ultimately, access to the cable connections to manually latch and unlatch cables is an important feature of a patch panel, and providing cables that are as short as possible and do not have slack is also an important feature of the patch panel. But there is a tradeoff between these features, since the cable slack is needed in order to pull a row of connection ports out to make them more accessible.

Therefore, an improved patch panel is desired that provides for ease of access to cable connections to connectors of the patch panel while minimizing lengths of cables extending from the connectors at the patch panel.

BRIEF SUMMARY OF THE INVENTION

The present disclosure is directed to a patch panel and patch panel rack that permit for improved access to the cable connection ports while also providing as little slack as possible in the connected cables.

In accordance with an aspect, a patch panel includes a frame, and a plurality of trays supported by the frame and stacked in a first direction, each of the trays configured to receive respective pairs of cable connection terminals, whereby for each pair of cable connection terminals the terminals are configured to be communicatively coupled to each other such that the cable connection terminals extend outward from each other in a direction of a first axis, wherein each tray of the plurality of trays is adapted to slide along one or more guides in the frame between a tray-in position and at least one tray-out position by sliding parallel, or substantially parallel, to other trays of the plurality of trays and in a direction of a second axis angularly offset from the first axis, the tray being displaced less than 100 millimeters when slid between the tray-in position and the tray-out position, and wherein one or more of the trays of the plurality of trays includes at least one handle configured for use in sliding the tray.

In accordance with an aspect, a patch panel includes a frame, and a plurality of pairs of trays supported by the frame and stacked in a first direction, each of the pairs of trays configured to receive respective pairs of cable connection terminals so that, for each pair of cable connection terminals received by a pair of trays, one of the cable connection terminals is received by a first tray of the pair of trays, a second of the cable connection terminals is received by a second tray of the pair of trays, and the first cable connection terminal and the second cable connection terminal are configured to be communicatively coupled to each other by an intermediate cable such that the cable connection terminals extend outward from each other in a direction of a first axis, wherein the first tray of the pair of trays is adapted to slide between a first tray-in position and at least one first tray-out position by sliding parallel to, or substantially parallel, to trays in other pairs of the plurality of pairs of trays while the second tray of the pair of trays does not move.

In accordance with an aspect, a patch panel includes at least one patch panel subassembly, the patch panel subassembly including at least one mounting plate and a plurality of port assemblies, the at least one mounting plate being configured to accommodate the port assemblies so that each port assembly can individually translate along a direction parallel to a surface of the mounting plate and can rotate about an axis perpendicular to the surface of the mounting plate.

In accordance with an aspect, a patch panel includes a plurality of port assemblies that are individually rotatable such that for any one of the port assemblies an axis passing through the center of a front port of the one of the port assemblies and through the center of a corresponding rear port of the one of the port assemblies is positionable to be non-parallel with an axis passing through the center of a front port of another one of the port assemblies and through the center of a corresponding rear port of the another one of the port assemblies.

In accordance with an aspect a patch panel includes a plurality of port assemblies arranged in a space, wherein one dimension of the space is less than two times a depth dimension of the port assemblies, and wherein the port assemblies are individually translatable and rotatable in the space.

In accordance with an aspect, a patch panel includes a plurality of port assemblies arranged in a space, wherein one dimension of the space is less than two times a depth dimension of the port assemblies, and wherein the port assemblies are individually translatable and rotatable in the space, and wherein a distance between a port of one of the port assemblies and a port of another one of the port assemblies is changeable by moving one or both of the one of the port assemblies and the another one of the port assemblies.

In accordance with an aspect, a patch panel includes a plurality of port assemblies which is associated with at least one mounting means, wherein each port assembly of the plurality of port assemblies is rotatable and translatable while keeping in contact with the at least one mounting means.

In accordance with an aspect, a plurality of port assemblies are secured in an elongated space, a longitudinal axis of the space defining a first direction, wherein the port assemblies have at least one front port and one rear port and configured to accept a first cable connection terminal at the front port and to accept a second cable connection terminal at the rear port to make an energy conveying connection between the first cable connection terminal and the second cable connection terminal, the relative positions of the front port and the rear port defines a second direction, the angle between the first direction and the second direction is adjustable within the range of 30 degrees to 90 degrees, and the port assembly can be translated in at least the first direction.

BRIEF DESCRIPTION OF THE DRAWINGS

FIGS. 15A and 15B show two paired tray patch panel arrangements in a side by side configuration, with one of the paired tray arrangements having both trays is a tray-in position and the other paired tray arrangement having one tray in a tray-in position and one tray in a tray-out position.

FIG. 22A is a perspective view of a portion of the unit of FIG. 21 with the depicted port assemblies in neutral positions.

FIG. 22B is a perspective view of the portion of FIG. 22A with selected ones of the depicted port assemblies moved from their neutral positions.

FIG. 23A is a plan view of the middle row FIG. 22A.

FIG. 23B is a plan view of three of the port assemblies of FIG. 23A

FIG. 23C is a plan view of the middle row of FIG. 22B.

FIGS. 24A-24F are perspective views of mounting plates for use in patch panel subassemblies in accordance with embodiments.

FIGS. 25A-25E are partial perspective views showing detailed examples of a port assembly and port holders secured to mounting plates.

FIGS. 26A-26E are perspective views showing port holder embodiments and corresponding attachment of the port holder embodiments to ports.

FIG. 32C is a perspective view of an arrangement of port assemblies and mounting plate according to an embodiment.

FIG. 32D is a detail view of a portion of the FIG. 32C embodiment and includes a view of a port holder of the embodiment in isolation.

FIG. 37A is a perspective view of a patch panel and enclosure according to an embodiment, in a fully closed state.

FIG. 37B is a perspective view of a patch panel and enclosure according to an embodiment, in a fully opened state.

FIG. 37C is a perspective view of a patch panel and enclosure according to an embodiment, in a fully opened state.

FIG. 41A shows an arrangement of port assemblies and mounting plates in two different positions in accordance with an embodiment.

FIG. 41B shows an arrangement of port assemblies in two different positions in accordance with an embodiment.

DETAILED DESCRIPTION

Figure 1:
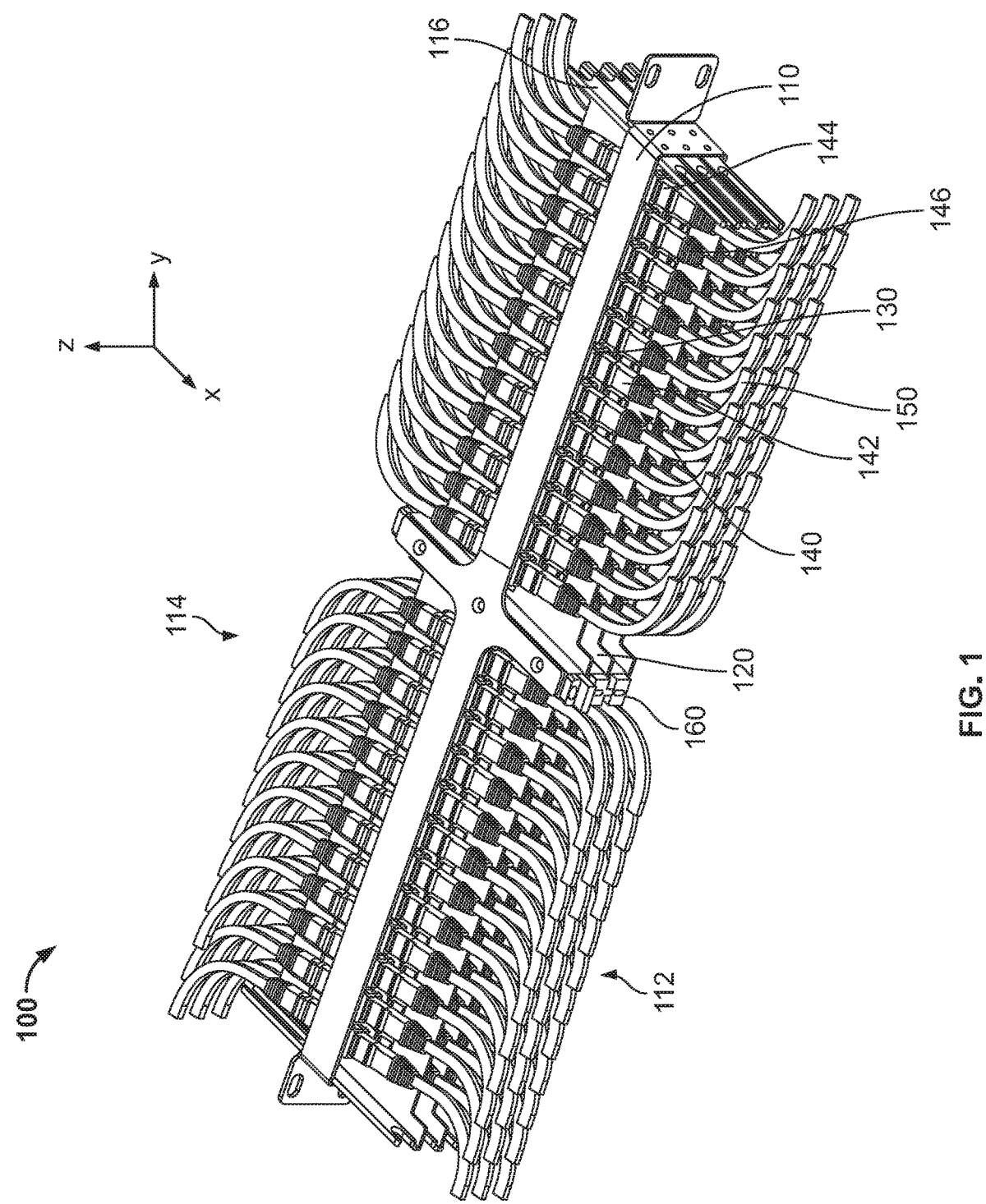
FIG. 1 is a perspective view of a patch panel in a tray-in or storage position in accordance with an aspect of the present disclosure.
Figure 2:
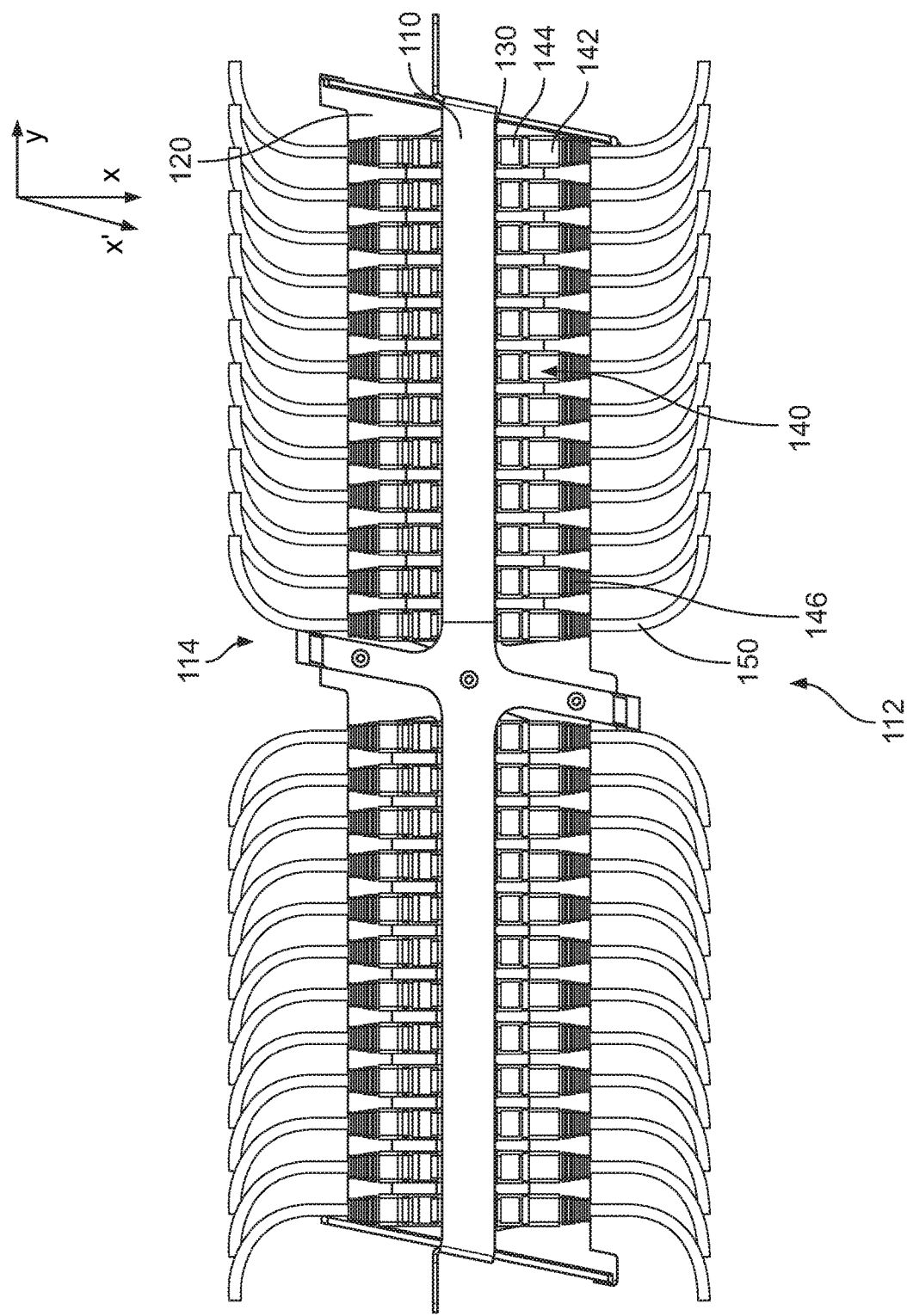
FIG. 2 is a top view of the patch panel of FIG. 1
Figure 3:
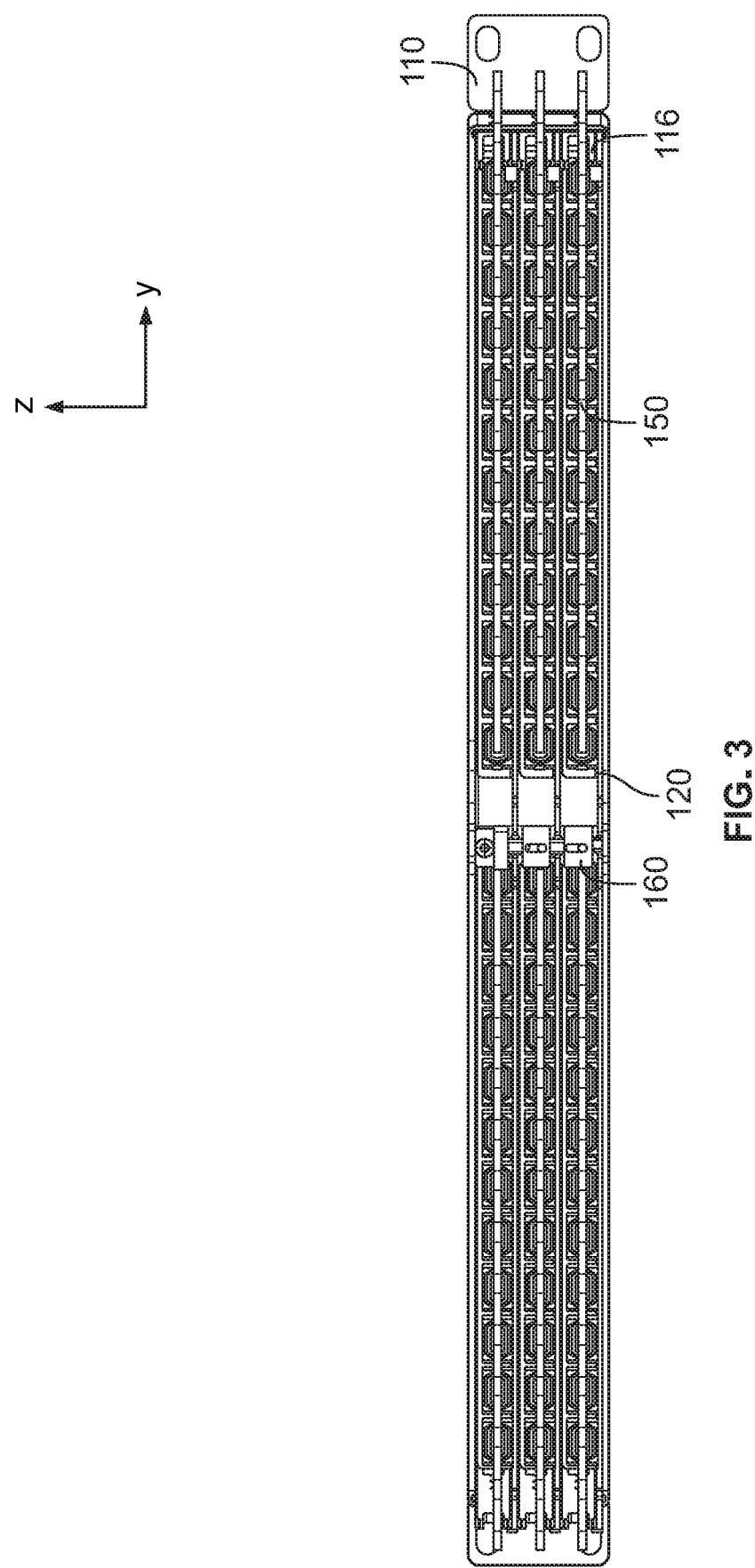
FIG. 3 is a front view of the patch panel of FIG. 1

FIGS. 1, 2 and 3 illustrate a patch panel 100 from various angles. FIG. 1 is a perspective view of the patch panel. FIG. 2 is a top view of the patch panel. FIG. 3 is a front view of the patch panel. Each of FIGS. 1-3 is provided with a coordinate space key [x,y,z] to clarify the relationships between the relative views.

The patch panel 100 may include a frame 110 having a frame-depth in a direction of axis x, a frame-width in a direction of axis y, and a frame-height in a direction of axis z. The frame 110 may be made of a sturdy supporting material such as metal or a heavy-gauge plastic.

The patch panel 100 further may include a plurality of trays 120 supported by the frame 110 and stacked vertically in the frame-height direction. In the present example, the trays 120 do not rest directly on top of each other or otherwise directly touch one another, such that any one tray may be pulled out of the patch panel 100 array without moving or touching the other trays. In the present example, three trays are stacked one on top of another, although in other examples more or fewer trays may be stacked. Additionally, in the present example, the two stacks of trays are arranged adjacent to one another, although in other examples, there may be only one stack of trays, or there may be more than two adjacent stacks of trays.

Each of the trays 120 may be substantially the same as one another. For purposes of clarity, the description below explains the structure and function of a single tray 120 in the middle of a vertical stack of trays, but it should be understood that the same structure and function may apply to each of the trays in the vertical stack.

The tray 120 may be positioned inside the frame 110. The frame 110 is open on each of a first side 112 and an opposing second side 114 along the frame-depth direction, such that the tray may be accessed from either side of the frame 110.

A plurality of connection ports 130 may be connected to the tray 120. In the present example, the tray may include a row of twelve connection ports 130 aligned in the frame-width direction, although more or fewer connection ports may be included in other examples. The connection ports are two-sided and configured to receive cable connection terminals 140 from either side 112, 114 of the frame 110.

Each of the connection ports 130 and cable connection terminals 140 may be substantially the same as one another. For purposes of clarity, the description below explains the structure and function of a single connection port 130 and a single cable connection terminal 140, but it should be understood that the same structure and function may apply to each of the connection ports and connection terminals included in the tray.

The cable connection terminal 140 may include a rigid housing 142 configured to attach to and partially house a cable 150. The rigid housing 142 may be adapted to fit into an opening in the connection port 130. In the present example, fitting cable connection terminals into opposite sides of a connection port 130 causes the cables housed by the respective cable connection terminals to be communicatively coupled to one another.

The cable connection terminal 140 may also include a dis-latching mechanism 144 or more generally a latch. The dis-latching mechanism 144 may be provided on an outer surface of the rigid housing 142. The dis-latching mechanism 144 may be a depressible finger adapted to engage a recessed edge of an inner surface of the connection port 130. When the dis-latching mechanism 144 is engaged, it may prevent the cable connection terminal 140 from disconnecting from the connection port 130. The dis-latching mechanism 144 may be disengaged manually, such as by a user pressing, pulling, or twisting the dis-latching mechanism 144. Screws, bolts, springs, or other well-known cable locking devices and mechanisms may be used to achieve similar results. Further, in other examples, the latch may be provided on the connection port 130 itself, such that disengaging the latch on the connection port may cause a cable connection terminal inserted in the connection port to become disconnected.

The cable connection terminal 140 may further include a flexible boot 146 positioned between the rigid housing 142 and an exposed, non-housed portion of the cable 150. The boot may be flexible in order to improve durability of the cable connection terminal 140 and ensure that the cable 150 does not become disconnected from the patch panel 100. The boot provides strain relief, preventing the cable 150 from being bent sharply as such sharp bending could cause the inner fiber to be broken and result in transmission loss.

When inserted into the connection port 130, the cable connection terminals 140 on either side of the connection port 130 may extend away from the connection port 130 along a first axis. In the example of FIGS. 1-3, the first axis may be the same as the frame-depth direction x. However, in other examples, the first axis may be angularly offset from the frame-depth direction, such that the cable connection terminals enter the connection ports at an angle relative to the frame depth direction.

Returning to the tray 120, the tray may be supported by guides 116 on one or both sides of the frame 110. The guides 116 may extend along a second axis angularly offset from the first axis. In FIG. 2, a second axis x' is shown, and is angularly offset from the frame-depth direction x. However, in those examples where the first axis is itself angularly offset from the frame-depth direction x, the second axis may be the same direction as the frame-depth direction.

The tray 120 may be adapted to slide along the guides 116, such that the tray moves in either direction in the direction of axis x'. This is noticeable from the top view illustration of FIG. 2, in which the tray 120 is parallelogram-shaped such that the side edges of the tray extend in the x' axis direction and may slide in the direction x' offset from the frame-depth direction x. It can be further seen from FIG. 2 that the side edges of the frame 110 (and impliedly the guides 116 of the frame) may extend in the same direction as the side edges of the tray 120, as opposed to the direction in which the cable connection terminals 140 extend. As explained in greater detail below, the angling of the frame 110, guides 116 and tray 120 are important for making the dis-latching mechanism 144 on the cable connection terminal 140 accessible without having to pull the tray from an interior of the patch panel frame to a position where the cable connection terminal 140 is completely out of the patch panel 100.

The cable connection terminals 140 in the present illustrated example are multi-fiber push-on (MPO) cable terminals (also referred to as MTP cables), and the cables 150 connected to the terminals are multi-fiber cables. In the example of MPO cable terminals, the connection port may include a hook affixed to an inner surface of the port, and the cable connection terminal may include a corresponding latch configured to be secured by the hook. Securing the latch to the hook may result in the cable connection terminal being operatively connected to the patch panel connection port. The connection port may further be configured to release the latch when the latch is slid out of the hook. In other examples, other types of cables and terminals may be used. For instance, any known fiber cable (e.g., single core fiber cable) and any known connector having a latch or other mechanism for connecting and disconnecting the cable from a port (e.g., an SC connector) may be compatible with a patch panel designed according to the present disclosure.

Figure 4:
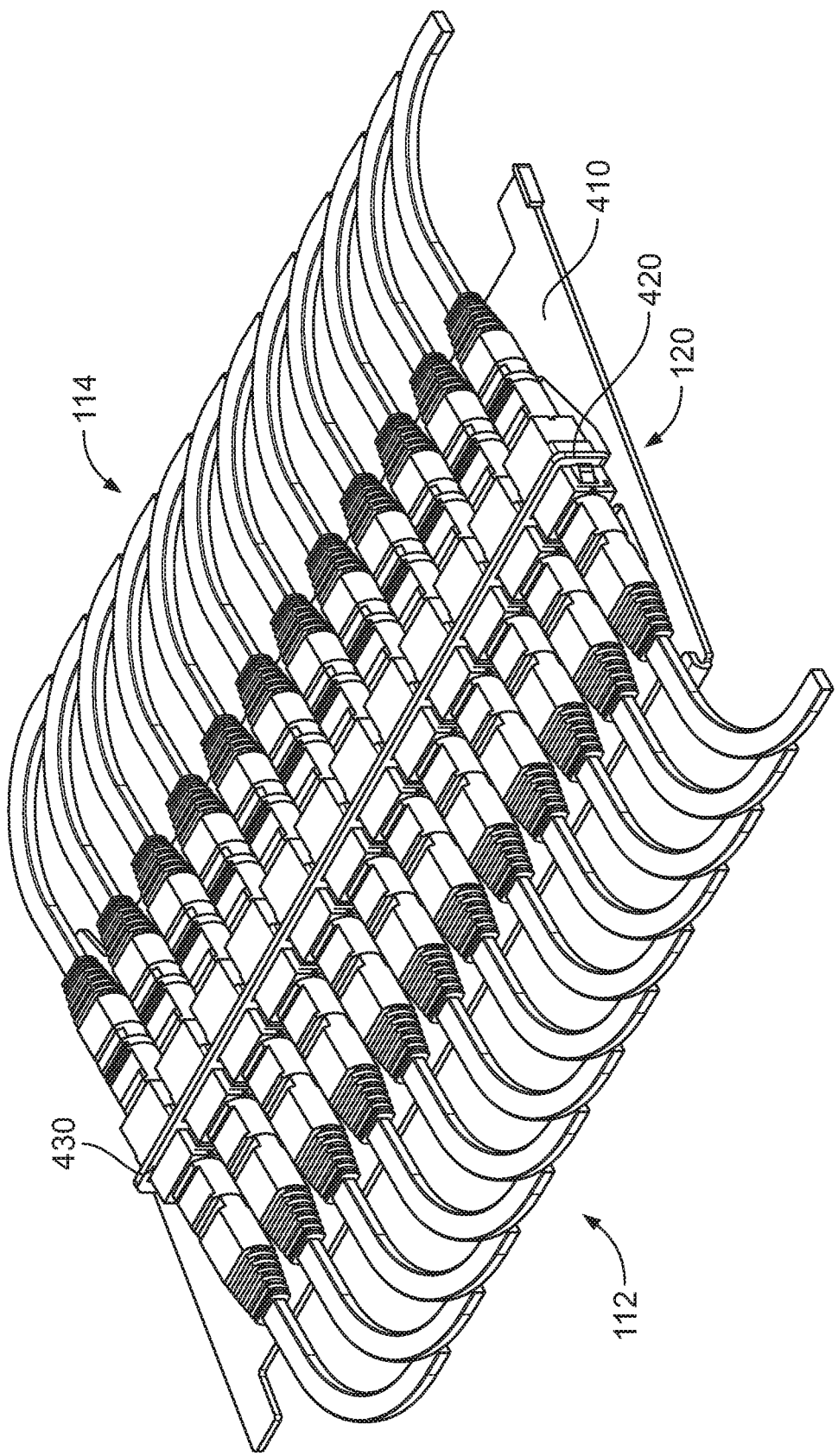
FIG. 4 is a top-down perspective view of a patch panel tray in accordance with an aspect of the present disclosure.

FIG. 4 is a perspective view of an example tray 120 and shows the structure of the tray in greater detail. The tray 120 includes a surface 410 defining a surface plane. The surface plane may be a plane in the frame-width and frame-depth directions. A vertical member 420 may extend vertically from the surface in the frame-height direction, separating the first side 112 from the second side 114 of the tray 120. The vertical member 420 may span the entire or close to the entire width of the surface 410, and may include apertures 430 aligned in a single row across the width of the surface 410. Each aperture 430 may be occupied by a respective two-sided connection port 130, such that a first side of the connection port 130 is positioned on the first side 112 of the tray 120, and a second side of the connection port 130 is positioned on the second side of the tray 120. In the example of FIG. 4, the vertical member 420 extends upward and the connection ports 130 are positioned above the surface 410, although in other examples the vertical member may extend downward with the connection ports positioned below the surface.

In each of FIGS. 1-3, all of the trays 120 of the patch panel 100 are in a tray-in position. Each of the rows of cable connection terminals 140 are aligned vertically in the frame-height direction with one another. The tray-in position is generally suitable for storage of the trays, with each of the cable connection terminals 140 being made inaccessible such that the terminals are not readily disconnectable from the patch panel 100 in such position.

Figure 5:
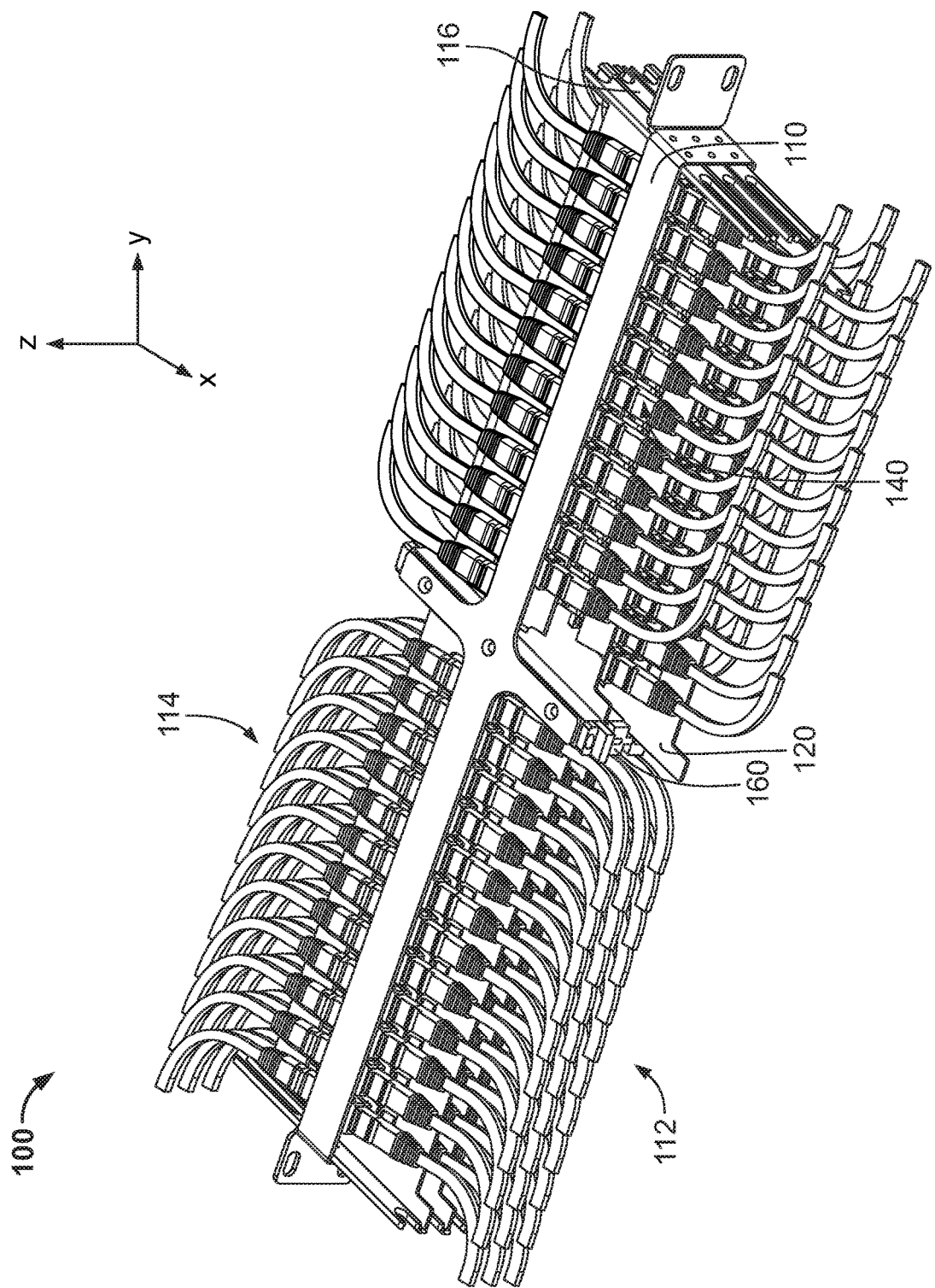
FIG. 5 is another perspective view of the patch panel of FIG. 1 in a tray-out position.
Figure 6:
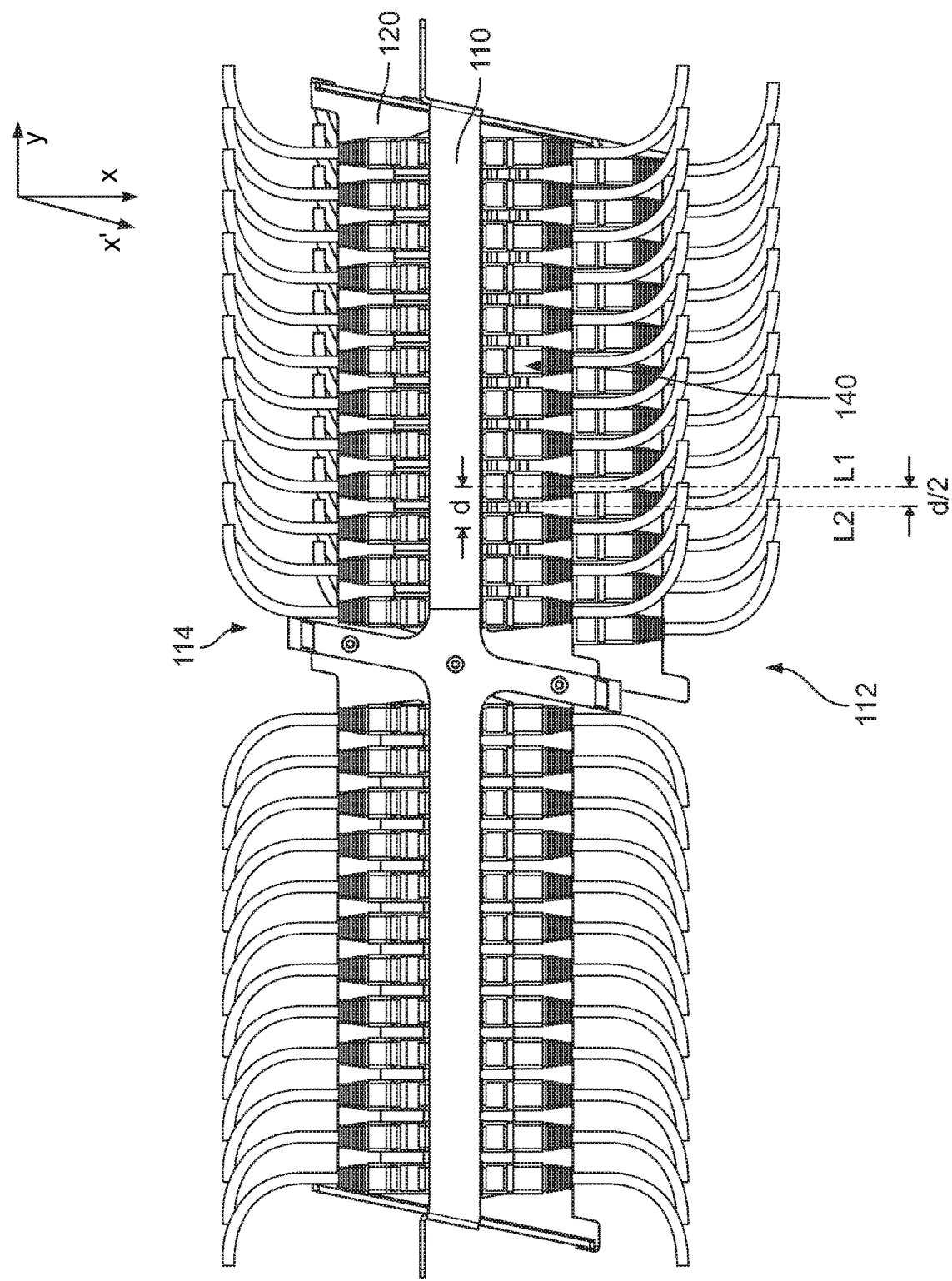
FIG. 6 is a top view of the of the patch panel of FIG. 1 in the tray-out position.
Figure 7:
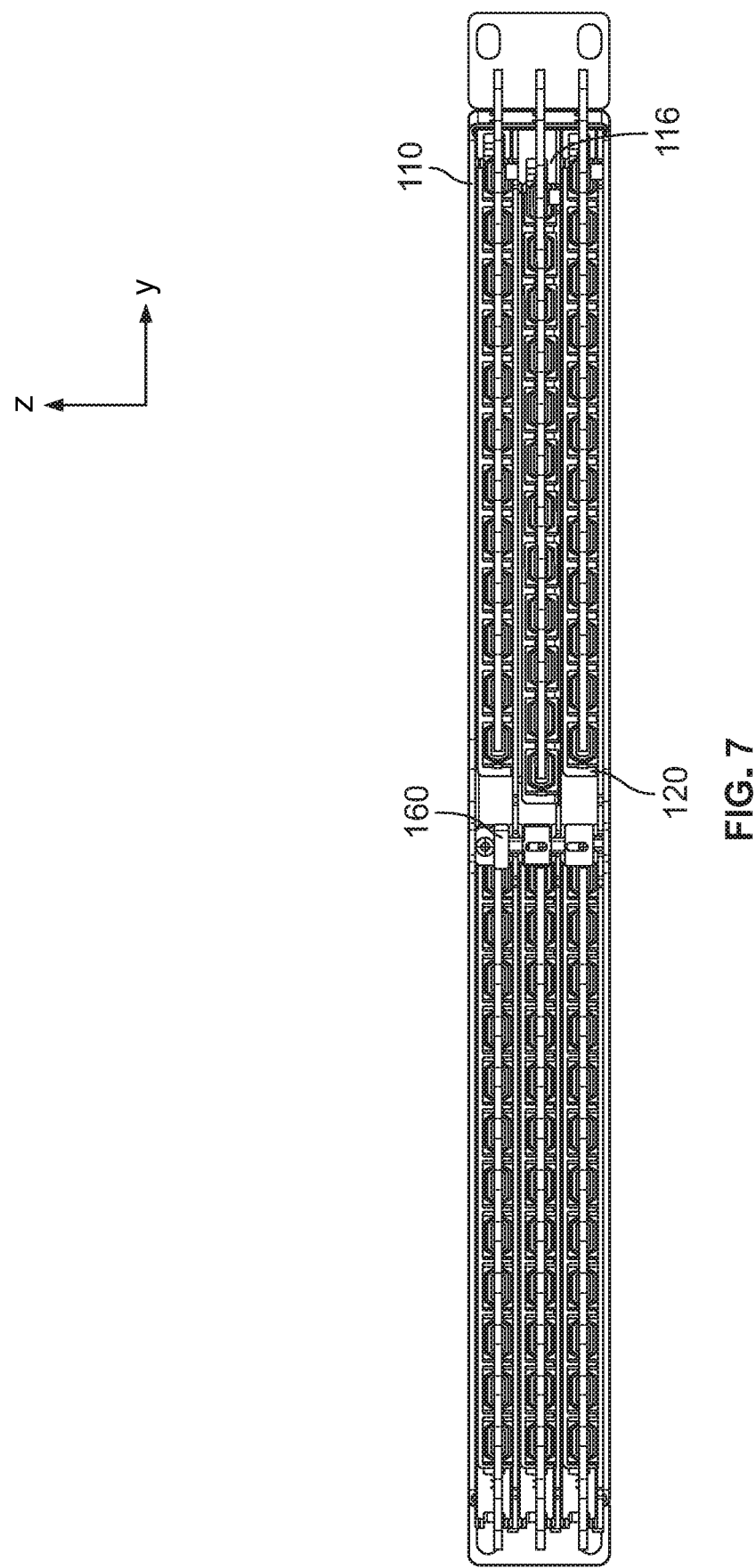
FIG. 7 is a front view of the patch panel of FIG. 1 in the tray-out position.

FIGS. 5, 6 and 7 show the patch panel 100 having a tray 120 in a tray-out position from various angles. FIG. 5 is a perspective view of the patch panel. FIG. 6 is a top view of the patch panel. FIG. 7 is a front view of the patch panel. Each of FIGS. 5-7 is provided with a coordinate space key [x,y,z] to clarify the relationships between the relative views.

As described below, the tray-out position is a position of the tray that is generally suitable for accessing the cable connection terminals 140 of the slid-out tray, provided that the trays immediately above and below the slid-out tray 120 are still in the tray-in position or otherwise not aligned vertically with the slid-out tray. Sliding out the tray 120 may involve pulling or pushing the tray 120 from the first side 112, or pulling or pushing the tray 120 from the second side 114. The tray 120 may be adapted to glide or roll or otherwise slide on the guides 116 to move between the tray-in and tray-out positions.

The tray 120 slides from the tray-in position to the tray-out position along an axis that is parallel with the second axis (e.g., x' in FIG. 6) along which the opposing side edges of the tray 120 extend and parallel with the surface of the tray 120, where the second axis is angularly offset from the first axis (e.g., x in FIG. 6). This results in the cable connection terminals of the slid-out tray being laterally displaced relative to their position in the tray-in position. Stated another way, any given cable connection terminal may be thought of as extending co-extensively with a first line in the direction of the first axis when in the tray-in position, and as extending co-extensively with a parallel but offset second line in the direction of the first axis when in the tray-out position. When the tray is in the tray-out position, the distance between the first line and the second line may be d/2, which is half the distance d between adjacent cable connection terminals.

In particular, in the example of FIGS. 5-7, the tray 120 is adapted to slide at an angle relative to the frame-depth direction. This results in the cable connection terminals becoming displaced in each of the frame-width direction and the frame-depth direction when the tray moves from the tray-in position to the tray-out position. Additionally, when the tray reaches the tray-out position, the cable connection terminals 140 of the slid-out tray 120 may become laterally offset in the frame-width direction relative to the cable connection terminals of the trays immediately above and below the slid-out tray 120. To obtain the tray at the tray-out position from the tray-in position, the tray is slid a minimum distance that the tray needs to be slid from the tray-in position in a direction along an axis parallel to the second axis, to provide that the tray is positioned to permit access to its cable connection terminals. Thus, at the tray-out position, the cable connection terminals of the tray may be accessed, such that there is no need to slide the tray a further distance along the guides out of the patch panel to provide for access to the cable connection terminals. At the tray-out position, the lateral offset may be half (d/2) the lateral distance between adjacent cable connection terminals (d).

Thus, as shown in each of FIGS. 6 and 7, when the tray 120 reaches the tray-out position, the cable connection terminals 140 of the slid-out tray 120 are laterally positioned above and beneath the gaps between cable connection terminals of the trays immediately above and below. This makes accessing the cable connection terminals 140 of the slid-out tray 120 possible.

Since the cable connection terminals 140 of the slid-out tray 120 at the tray-out position can be accessed through gaps immediately above and below, it is not necessary for the tray 120 to slide out very far. In particular, the displacement of the tray between the tray-in and tray-out positions may be less than the length of the cable connection terminals in the direction of the first axis. For example, if each cable connection terminal is 100 millimeters long, the displacement between the tray-in and tray-out positions may be less than 100 millimeters long, and in some examples, 50 millimeters or less.

In one example, the frame 110 shown in the example of FIGS. 1-7 may be between about 400 millimeters to about 500 millimeters wide, and each tray 120 may be about 200 to 250 millimeters wide. The twelve cable connection terminals 140 may be spaced apart by about 15 to about 25 millimeters (including the width of the cable connection terminals themselves). The spacing may be the same or similar for trays having a different number of cable connection terminals. The height of the frame may be between about 40 millimeters and about 45 millimeters, meaning that each tray is separated by a gap of less than 15 millimeters. This makes it difficult for a user to access the latches on the cable connection terminals 140 without moving the tray 120 to a tray-out position.

Generally, the tray 120 may have two tray-out positions, a first tray-out position in which the cable connection terminals on the first side 112 of the tray 120 are made accessible, and a second tray-out position in which the cable connection terminals on the second side 114 of the tray 120 are accessible. The tray may slide from the tray-in position to either one of the tray-out positions depending on the direction (e.g., forward vs. back) that the tray is slid. In either case, the position of the tray may be moved in a direction of the second axis angularly offset from the first axis (e.g., in the case of FIGS. 5-7, moved in both the frame-depth direction and the frame-width direction) in order to make the cable connection terminals at respective sides of the tray more accessible.

Figure 8:
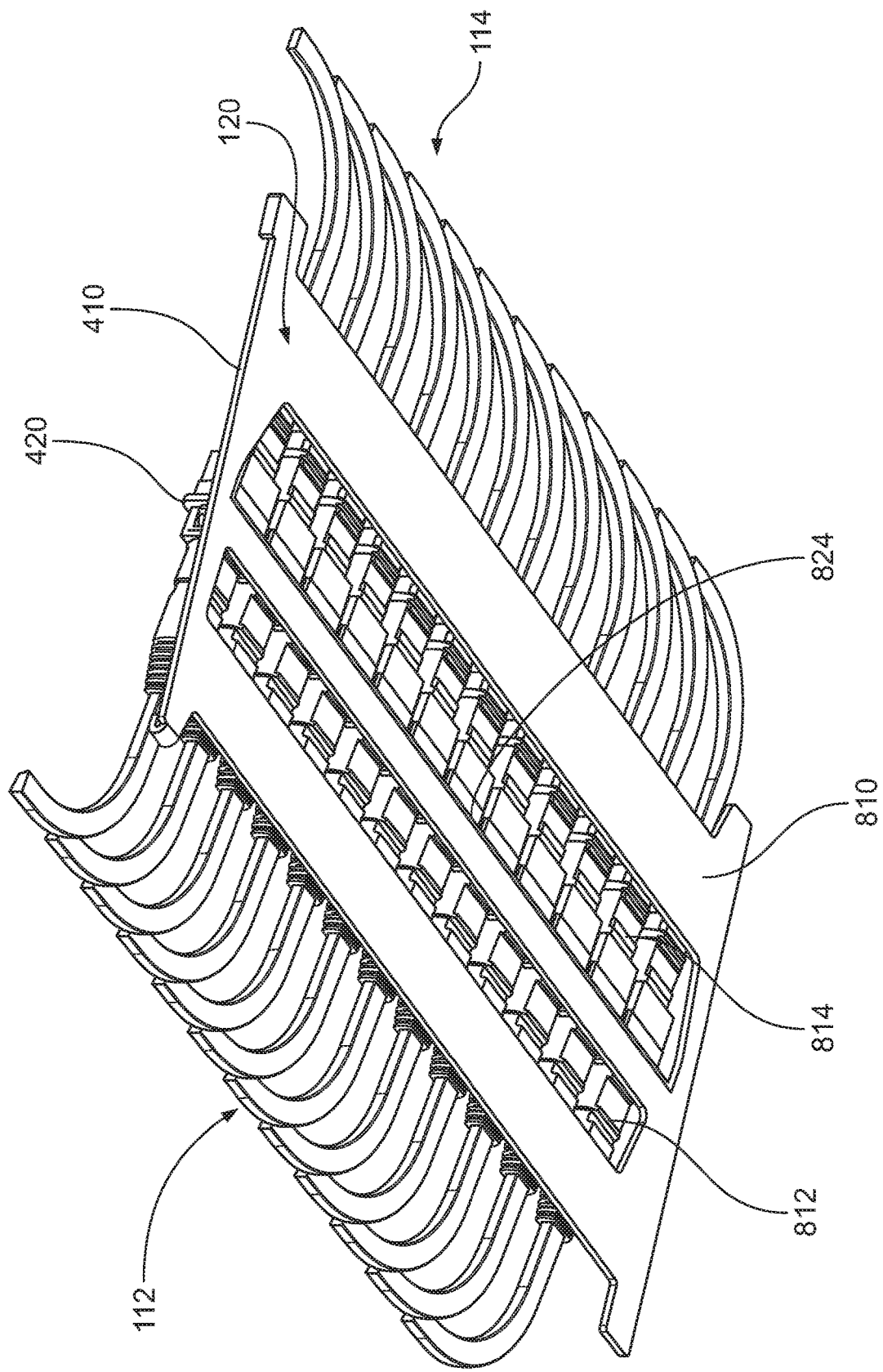
FIG. 8 is a bottom-up perspective view of a patch panel tray in accordance with an aspect of the present disclosure.

The patch panel may include additional features to improve its function and operation, as well as the accessibility of the cable connection terminals. FIG. 8 is a perspective view of an underside 810 of the tray 120 from FIG. 4. As can be seen from FIG. 8, the surface 410 of the tray 120 may include a pair of slot-shaped openings 812 and 814 extending in the frame-width direction. A first opening 812 may be positioned directly underneath the rigid housing of the cable connection terminal on the first side 112 of the tray 120. A second opening 814 may be positioned directly underneath the rigid housing of the cable connection terminal on the second side 114 of the tray 120.

In the example of FIG. 8, the second opening 814 is made large enough for the vertical member 420 to be vertically aligned in the frame height direction with an inside edge 824 of the second opening 814. However, in other examples, the second opening may be made smaller, so long as the opening remains large enough to permit access to the latch or other connection/disconnection mechanism on the rigid housing of the cable connection terminal.

Additionally, in the example of FIG. 8, the openings 812, 814 are positioned underneath the rigid housings of the cable connection terminals. However, in those examples where the connection/disconnection mechanisms are positioned elsewhere, such as on the connection port, the openings in the tray surface may be positioned differently in order to be properly aligned with the respective connection/disconnection mechanisms. In the example of FIG. 8, the opening 812 is purposely aligned with dis-latching mechanism 144 to allow for easy dis-latching of the cable connection terminal 140 from the connection port 130.

FIGS. 1, 3, 5 and 7 also show a mechanical stopper 160 configured to prevent the trays from accidentally sliding out of the frame. A close-up of the mechanical stopper is shown in each of FIGS. 9A and 9B.

The mechanical stopper 160 may be mounted to an outer surface of the frame 110 and extending from the frame in a frame-depth direction. The mechanical stopper 160 may include one or more notches 920 notched into the body of the stopper in the frame-width direction such that the width of the mechanical stopper 160 in the frame-width direction is shorter at the location of the notches 920 than at portions of the stopper 160 above and below the notches. In this regard, the mechanical stopper 160 may have an overall width that overlaps in the frame-width direction with at least a portion of the trays 120, but the width of the mechanical stopper 160 at the location of the notches does not overlap in the frame-width direction with the trays 120.

Figure 9A:
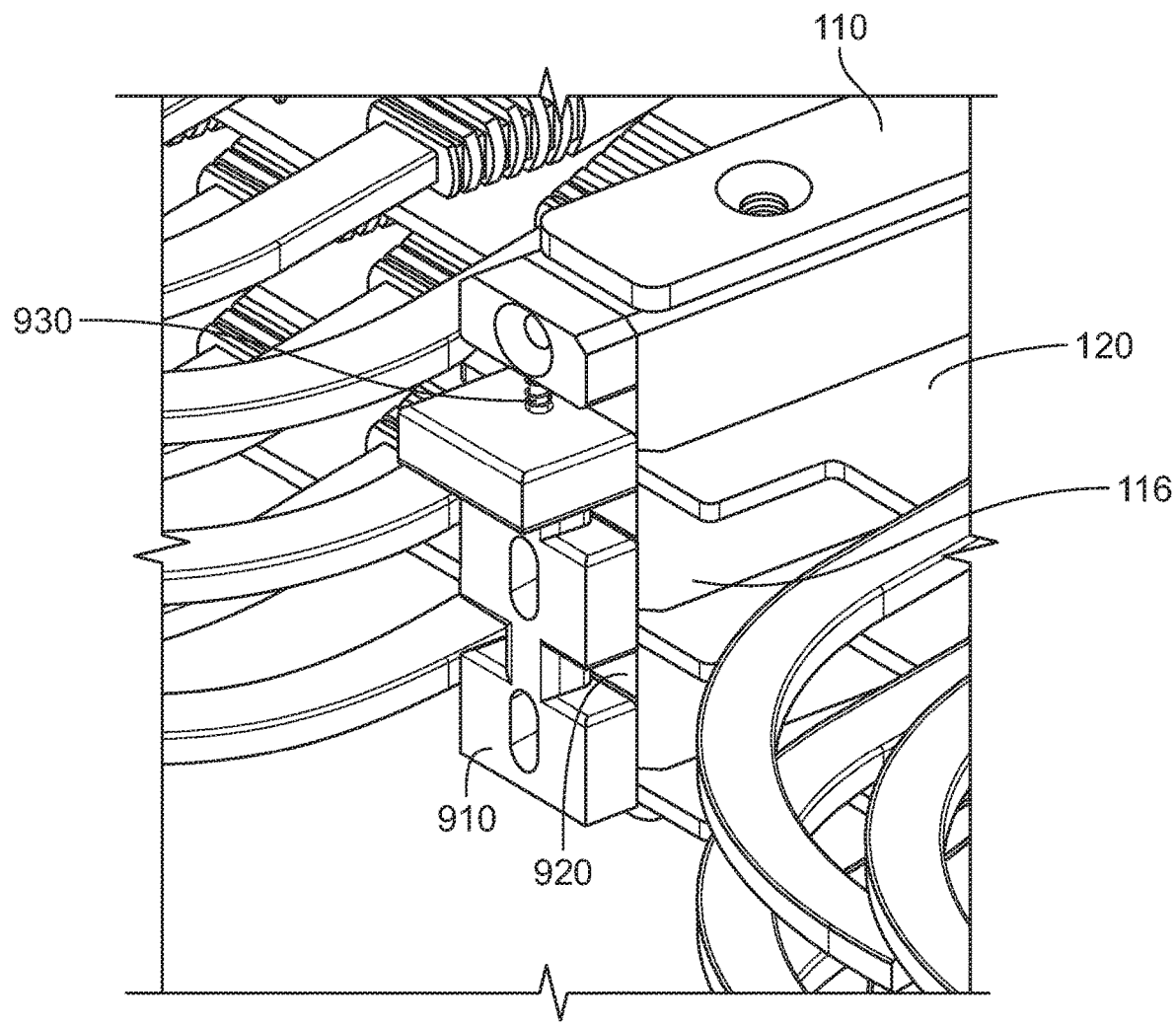
FIG. 9A is a perspective view of a patch panel tray lock in a locked state in accordance with an aspect of the present disclosure.
Figure 9B:
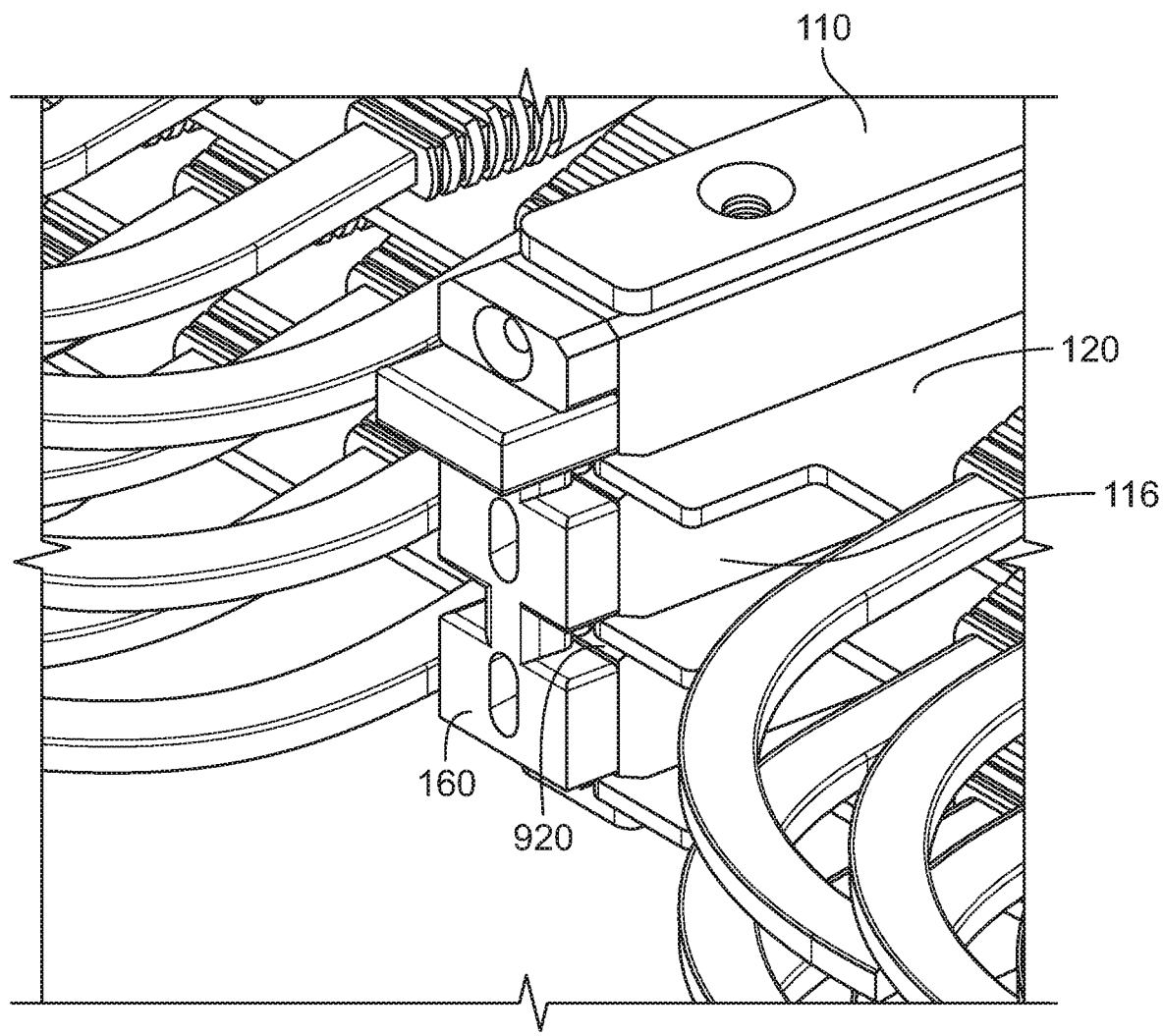
FIG. 9B is a perspective view of a patch panel tray lock in an unlocked state in accordance with an aspect of the present disclosure.

In FIG. 9A, the mechanical stopper 160 is in a locked position. The notches 920 are vertically out of alignment with the guides 116 of the frame 110, thus preventing each of the trays 120 from sliding between the tray-in position and a tray-out position. In FIG. 9B, the mechanical stopper 160 is in an unlocked position. The notches are vertically aligned in the frame-height direction with the guides 116 of the frame 110, leaving each of the trays 120 free to slide between the tray-in position and a tray-out position.

In the examples of FIGS. 9A and 9B, moving the mechanical stopper 160 between the locked and unlocked positioned may involve displacing the mechanical stopper 160 vertically in a frame-height direction. The mechanical stopper 160 may be biased to the locked position by a biasing element, such as a bias spring 930. The bias spring 930 may exert a force on the mechanical stopper 160 in the vertical frame-height direction. The bias spring 930 may be configured to be depressible, such that an opposing force (in the example of FIG. 9, an upward force) compresses the bias spring 930 and displaces the mechanical stopper 160 along the axis of the bias spring force until the notches 920 become aligned with one or more trays 120 in the frame 110.

Additionally, the trays 120 may be configured to overlap with the mechanical stopper 160 in the frame-height direction when slid to a tray-out position, but not in the tray-in position. Because of the overlap, a tray 120 in a tray-out position may block the mechanical stopper 160 from returning to its biased locking position. The mechanical stopper 160 would then return to the locking position only after the tray 120 has been returned to its tray-in position and no longer overlaps with the mechanical stopper in the frame-depth direction, leaving the bias spring 930 free to bias the mechanical stopper 160 into the locking position.

Figure 10:
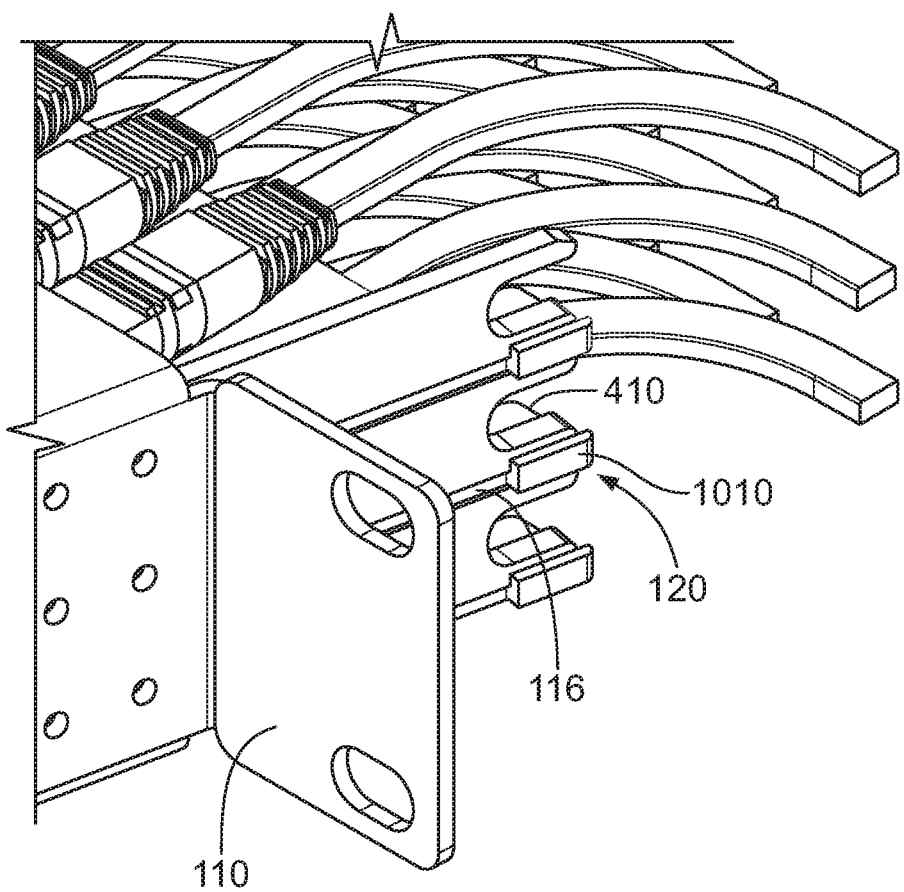
FIG. 10 is a perspective view of a patch panel tray anchor in accordance with an aspect of the present disclosure.

FIGS. 4 and 8 also show an anchor member configured to anchor the tray to the frame. A close-up of the anchor member is shown in FIG. 10. The anchor 1010 may be appended to an edge of the tray surface 410 extending from the tray surface 410 in a frame-width direction. The anchor 1010 may have a height in the frame-height direction that is greater than a thickness of the tray surface 410. Additionally, the guides 116 in the frame 110 may be slots, whereby each slot has a width equal or greater than the thickness of the tray surface 410 but less than the height of the anchor 1010. In this regard, the tray 120 may slide forward and back along the x' axis along the slot 116, but the anchor prevents from the tray 120 from rotating or otherwise sliding side-to-side in the frame-width direction out of the frame 110.

In the instance of a patch panel with two-sided connection ports and trays that may slide out both forward and back, the mechanical stoppers and anchors may be provided on both sides of the patch panel. For instance, a first mechanical stopper on a first side of the frame may prevent the trays from sliding out in the direction of the first side, and a second mechanical stopper on a first side of the frame may prevent the trays from sliding out in the direction of the second side. Likewise, each tray surface may be equipped with two anchors, one anchor on the first side to prevent side-to-side sliding when one side of the tray is pulled out, and the other anchor on the other side of the tray for when the other side of the tray is pulled out.

Figure 11:
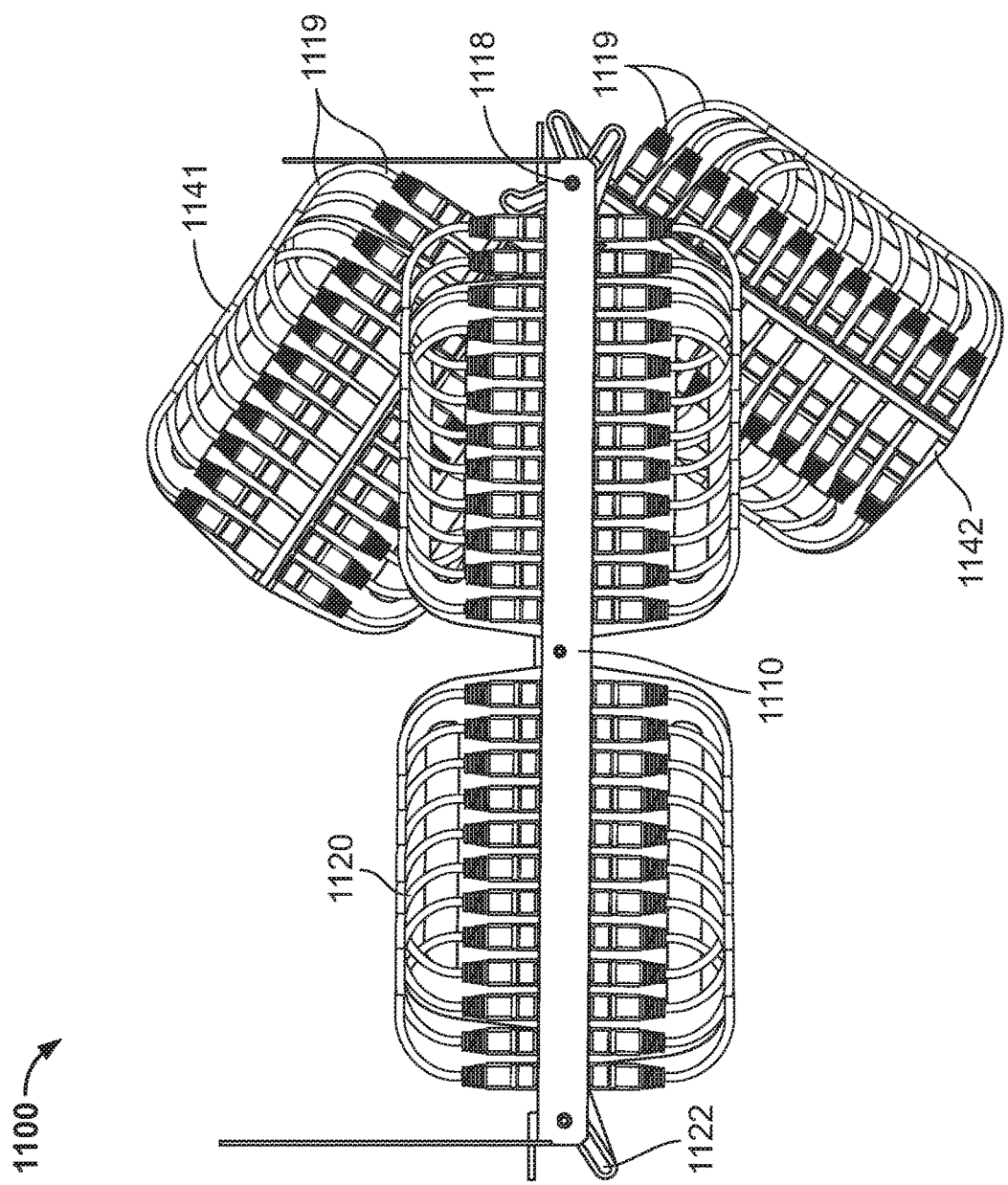
FIG. 11 is a top-down view of another patch panel in accordance with another aspect of the present disclosure.

FIG. 11 shows an alternative embodiment of a patch panel 1100 according to the present disclosure. Like the prior embodiment, the patch panel 1100 of FIG. 11 includes a frame, trays, connection ports (72 ports in the example of FIG. 11, just like the prior illustrated examples), and cable connection terminals for connecting cables to the connection ports. The patch panel 1100 in FIG. 11 differs in that each of the trays is configured to both rotate and slide out.

The frame 1110 may include a post 1118 extending vertically in the frame-height direction. In some instances, the post 1118 may be in proximity to a sidewall of the frame 1110. Each of the trays 1120 may also include an elongated slot 1122 etched into the surface of the tray 1120. The elongated slot 1122 may be adapted for the post 1118 to be inserted into the slot 1122, such that the tray 1120 may rotate about a pivot point in the slot 1122 (e.g., the post 1118) and may slide in the direction of the elongation of the slot. In this regard, the width of the slot 1122 may be about or only slightly wider than the width of the post 1118, in order that the tray 1120 neatly fits on and slides relative to the post 1118. In some instances, the slot 1122 may be L-shaped.

The post 1118 may further include a supporting feature such as a platform or spacer on which the weight of the tray may be supported and to provide that the trays 1120 received by the frame 1110 may be spaced apart vertically to avoid interference between adjacent ones of the trays.

The frame 1110 may further include a shaft (not shown) or other cable routing location in proximity to the post 1118. One or more cables 1119 from the patch panel 1100 may be routed through the shaft. In this manner, for a given cable 1119, the distance from the cable connection terminal to the shaft does not significantly change as the tray 1120 rotates about the post 1118. Additionally, since the tray 1120 slides in and out only a short distance (e.g., fewer than 100 millimeters, about 50 millimeters), the positional translation of the tray 1120 also does not significantly affect the distance from the cable connection terminal to the shaft.

In operation, moving a tray in the frame 1110 of FIG. 11 from the tray-in position to the tray-out position may involve both rotating the tray around the post 1118 and translating the tray in the direction of the slot 1122 elongation along a plane defined by the tray surface. The purpose of rotating the tray is to move the cable connection terminals of the rotated tray out of vertical alignment with the cable connection terminals of the trays immediately above and below. The purpose of translating the tray is to create additional clearance and accessibility for the cable connection terminals closest to the post 1118 (since rotating those terminals repositions them less than rotating the terminals farther from the post 1118).

The rotatable trays may be configured to rotate in opposing directions so that the cable connection terminals on either side of the corresponding connection ports may be made accessible. Each of the stacked trays may be configured to rotate about a pivot point (e.g., the post) and translate along an axis of a length of the elongated slot. For instance, as shown in FIG. 11, a first tray 1141 is shown rotated in one direction, and a second tray 1142 is shown rotated in an opposite second direction. It may also be noted that the first tray 1141 is also translated along the elongated slot, whereas the second tray 1142 has not been translated.

As can be seen from FIG. 11, the elongated slot 1120 in the tray 1120 may be formed in an extension of the tray surface that protrudes beyond the width of the frame 1110. This may allow for the post 1118 to be formed close to an edge of the frame 1110 in the frame-width direction, while maintaining only a small portion of the tray surface on an opposite side of the post 1118 in the frame-width direction, while also providing for the tray 1120 to be able to rotate about the post 1118.

Figure 12:
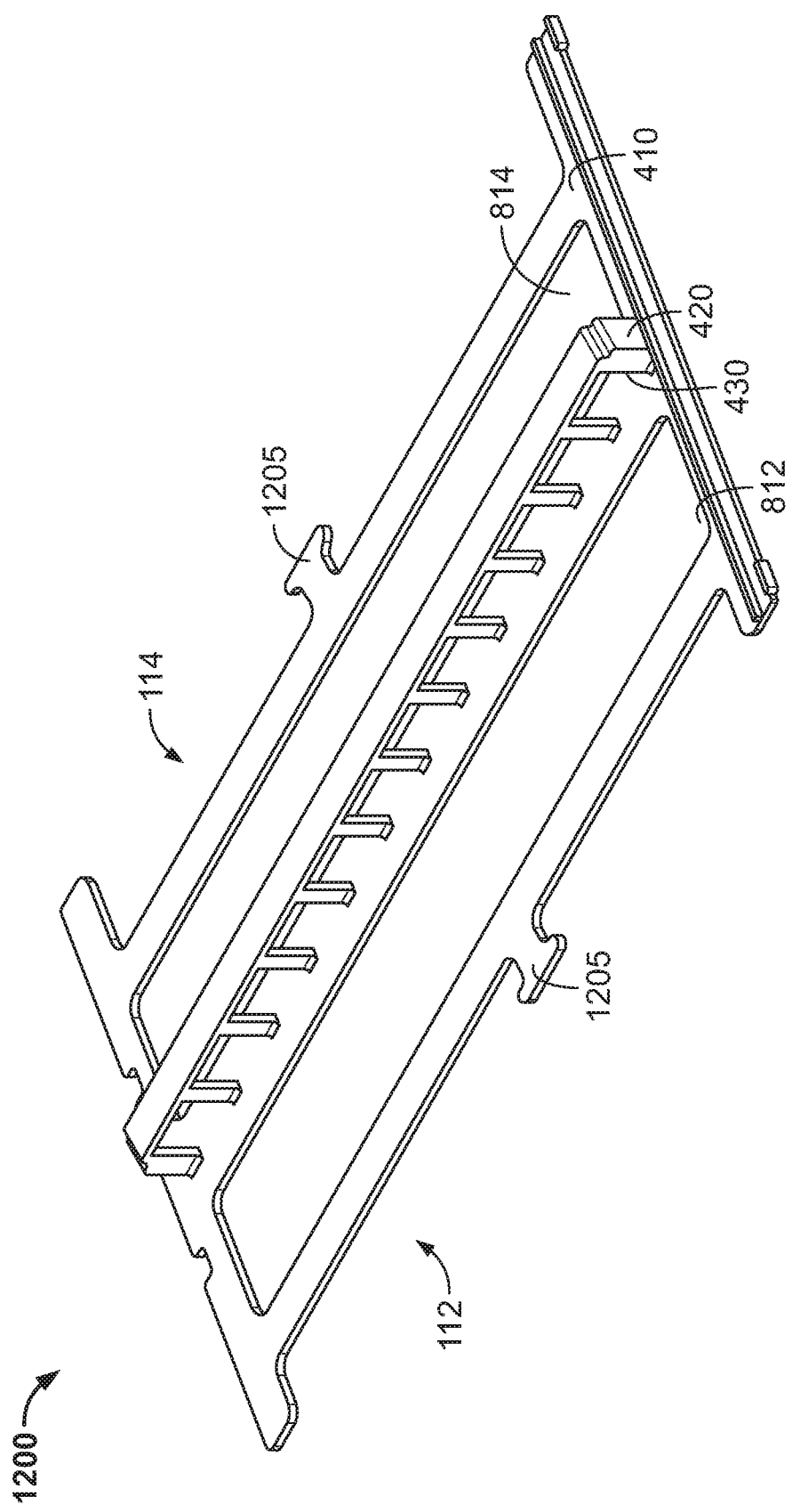
FIG. 12 is a perspective view of a patch panel tray in accordance with an aspect of the present disclosure.

Referring now to FIG. 12, there is shown a perspective view of a patch panel tray 1200 according to an embodiment. The patch panel tray 1200 is similar to each of the trays 120, with the exception that tray 1200 includes one or more handles 1205. In the figure, two handles 1205 are depicted, one on the first side 112 of the tray and one on the second side 114 of the tray. However, it should be noted that the tray 1200 may be configured to have a single handle on, for example, the first side 112 of the tray, or may be configured to have more than two handles. In any event, the handles facilitate positioning the tray 1200 in the tray-in and tray-out positions by providing a place for a user to grab the tray 1200. A multiple of trays each configured like tray 1200 may be substituted for each of the multiple of trays 120 in the embodiments of FIGS. 1-10, for example, to realize alternative embodiments. As in trays 120, in tray 1200 a vertical member 420 of may extend vertically from the surface in the frame-height direction, separating the first side 112 from the second side 114 of the tray 1200. The vertical member 420 may span the entire or close to the entire width of a surface 410, and may include apertures 430 aligned in a single row across the width of the surface 410. Each aperture 430 may be occupied by a respective two-sided connection port 130, such that a first side of the connection port 130 is positioned on the first side 112 of the tray 120, and a second side of the connection port 130 is positioned on the second side of the tray 120. In one configuration, the vertical member 420 extends upward and the connection ports 130 are positioned above the surface 410, although in other examples the vertical member may extend downward with the connection ports positioned below the surface.

Figure 13:
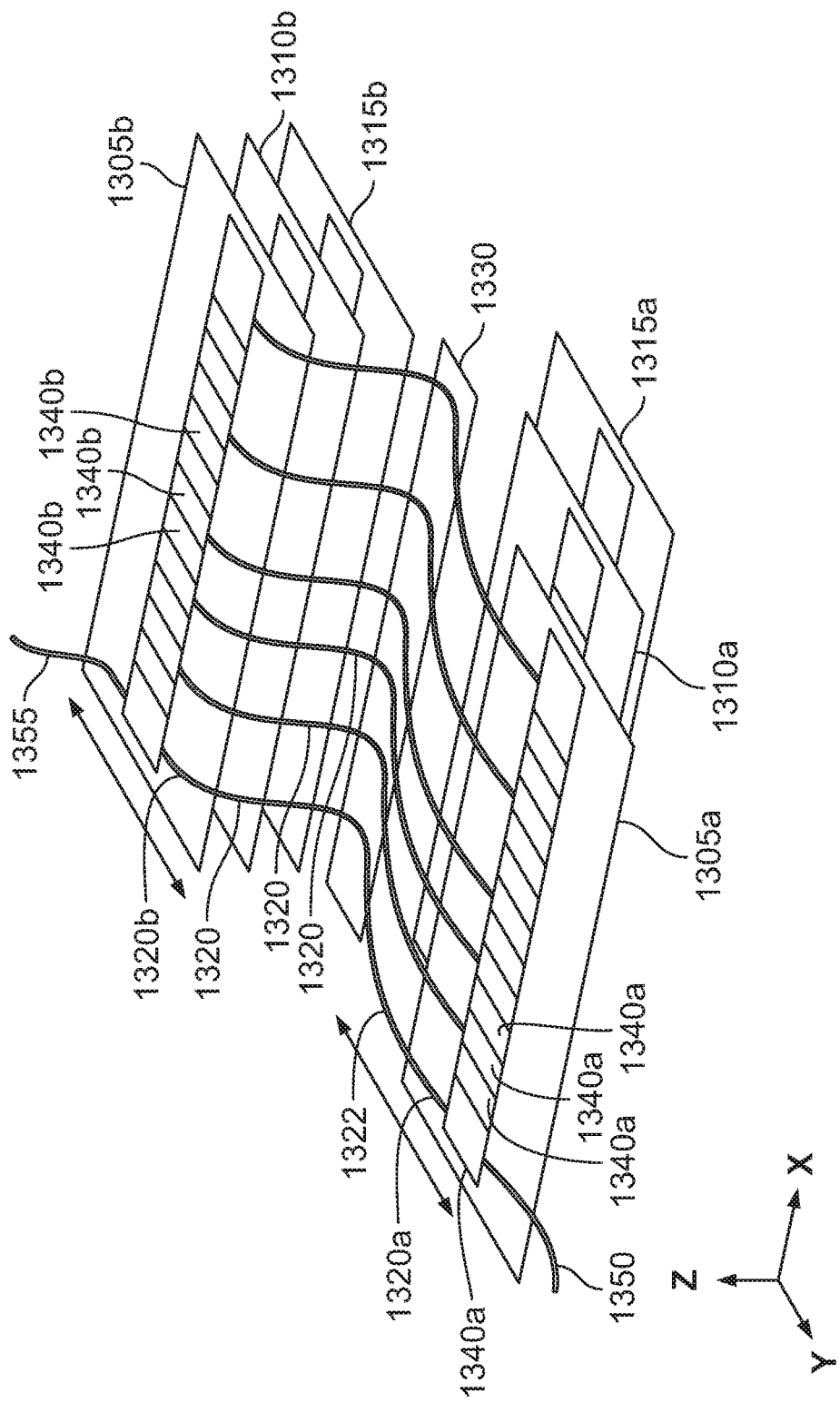
FIG. 13 is a perspective view of a patch panel configuration according to an embodiment having trays arranged in pairs connected by intermediate cables.

Turning to FIG. 13, there is shown a perspective view of a patch panel configuration according to an embodiment having trays 1305a, 1305b, 1310a, 1310b, 1315a, and 1315b arranged in pairs. For example, trays 1305a and 1305b make up a pair. Each pair of trays has an associated multiple of intermediate cables, or "jumper" cables, although for clarity of presentation FIG. 13 shows only intermediate cables 1320, which are associated with tray pair 1305a, 1305b. Further, each two trays that make up a pair may be coplanar, or substantially coplanar, and the cables connecting such trays may be maintained in the plane, or substantially in the plane, of the trays by a support. For example, trays 1305a and 1305b may be coplanar in a plane parallel to the XY plane, and the cables 130 may be maintained in the plane of trays 1305a and 1305b by a support 1330. The support 1330 may be mounted, for instance, on an enclosure that encloses the trays 1305*a*, 1305*b*, and cables 1320.

Each of the trays 1305*a*-1315*b* includes a respective multiple of ports. For example, tray 1305*a* includes ports 1340*a*, and tray 1305*b* includes ports 1340*b*. Each of the ports 1340*a* and 1340*b* may accept one or more connection terminals for coupling to respective external cables 1320. Moreover, cables 1320 may themselves be coupled to the ports by respective connection terminals. Thus, in one embodiment, each of cables 1320 has a connection terminal at a first end 1320*a* of the cable, e.g., cable 1322, and a connection terminal at a second end 1320*b* of the cable, e.g., cable 1322, and the connection terminal at first end 1320*a* is coupled to one of ports 1340*a* and the connection terminal at second end 1320*b* is coupled to a corresponding one of ports 1340*b*. Pairs of external cables, e.g., cables 1350 and 1355, may then be coupled to each other through a respective one of cables 1320, e.g. through the one of ports 1340*a* and the corresponding one of ports 1340*b*.

In the arrangement of FIG. 13, the connection terminal attached to cable 1350 may be easily accessed by moving tray 1305*a* along the Y direction to a tray-out position, without disturbing cable 1355. That is, the intermediate cables 1320 are provided in sufficient length to accommodate movement of tray 1305*a* without exposing cable 1355 or tray 1305*b* to any significant force resulting from such movement. Similarly, the connection terminal attached to cable 1355 may be easily accessed by moving tray 1305*b* along a direction opposite the Y direction to a tray-out position, without disturbing cable 1350 or tray 1305*a*.

Figure 14:
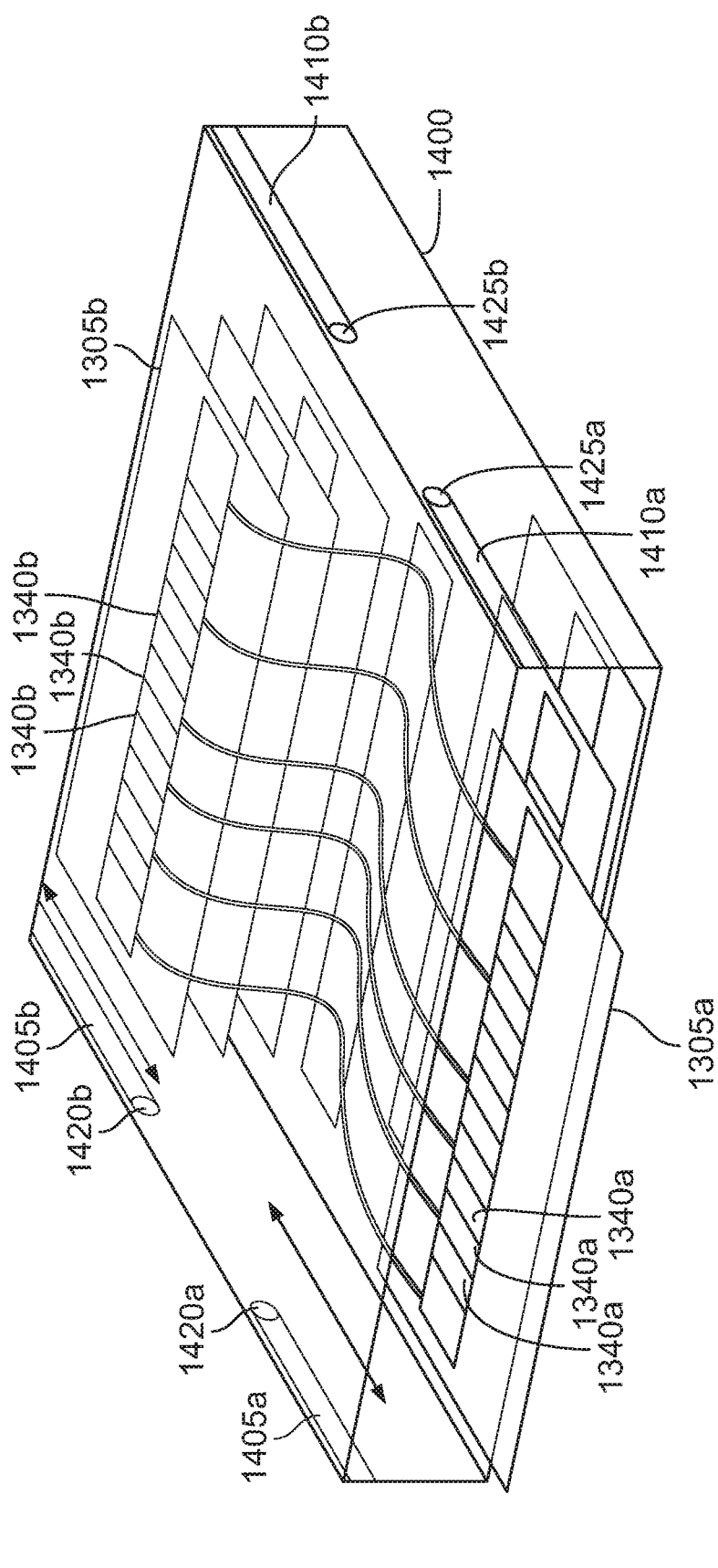
FIG. 14 is a perspective view of the patch panel configuration of FIG. 13 as arranged in an enclosure.

FIG. 14 is a perspective view of the patch panel configuration of FIG. 13 as arranged in an enclosure 1400. The enclosure may enclose all of trays 1305*a*-1315*b* and may include one or more guides, e.g., guides 1405*a*, 1405*b*, 1410*a*, and 1410*b*, for guiding the trays during movement between a tray-in position and a tray-out position. For example, tray 1305*a* may be guided between a tray-in position and a tray-out position by guides 1405*a* and 1410*a*. In addition, the guides may be associated with respective stops, e.g., stops 1420*a*, 1420*b*, 1425*a*, and 1425*b*. The stops are provided for limiting movement of the trays past a designated tray-in position. For example, stops 1420*a* and 1425*a* prevent tray 1305*a* from moving past a designated tray-in position.

FIGS. 15A and 15B show two paired tray patch panel arrangements 1500A and 1500B in a side by side configuration, with paired tray patch panel arrangement 1500A having both trays 1505*a* and 1505*b* in a tray-in position and paired tray patch panel arrangement 1500B having a tray 1510*a* in a tray-in position and a tray 1510*b* in a tray-out position. The two paired tray patch panel arrangements 1500A and 1500B may be included in a frame (not shown), which may be integral with a panel enclosure (not shown), attached to the panel enclosure, or separate from the panel enclosure. Each of arrangements 1500A and 1500B may be supported by the frame and stacked in a first direction, e.g., the Z direction, with other paired tray arrangements. Further, each of arrangements 1500A and 1500B are configured to receive respective pairs of cable connection terminals so that, for each pair of cable connection terminals received by the arrangement, one of the cable connection terminals is received by a first tray of the pair of trays, a second of the cable connection terminals is received by a second tray of the pair of trays, and the first cable connection terminal and the second cable connection terminal are configured to be communicatively coupled to each other by an intermediate cable such that the cable connection terminals extend outward from each other in a direction of a first axis. For example, arrangement 1500A is configured to receive a first cable connection terminal 1512*a* at a port of tray 1505*a* and receive a second cable connection terminal 1512*b* at a port of tray 1505*b*, and cable connection terminal 1512*a* and cable connection terminal 1512*b* are communicatively coupled to each other by an intermediate cable 1520 such that the cable connection terminals 1510*a* and 1510*b* extend outward from each other along the Y axis.

In the FIG. 15A, 15B embodiment, first cable connection terminals, e.g., first cable connection terminal 1512*a*, are coupled to respective ports of tray 1505*a*, e.g., port 1525*a*, and second cable connection terminals, e.g., second cable connection terminal 1512*b*, are coupled to respective ports of tray 1505*b*, e.g., port 1525*b*. Also, a first end of each intermediate cable, e.g., end 1520*a* of cable 1520, is coupled to a first intermediate cable connection terminal, e.g., first intermediate cable connection terminal 1530*a*, which is in turn coupled to a respective port of tray 1505*a*, e.g., port 1525*a*; and a second end of each intermediate cable, e.g., end 1520*b* of cable 1520, is coupled to a second intermediate cable connection terminal, e.g., first intermediate cable connection terminal 1530*b*, which is in turn coupled to a respective port of tray 1505*b*, e.g., port 1525*b*. In this manner a cable connected to one of the first cable connection terminals may be coupled to a cable connected to one of the second cable connection terminals by way of an intermediate cable. For example a cable coupled to first cable connection terminal 1510*a* may be coupled to a cable connected second cable connection terminals 1510*b* by first cable connection terminal 1510*a*, port 1525*a*, first intermediate cable connection terminal 1530*a*, intermediate cable 1520, second intermediate cable connection terminal 1530*b*, port 1525*b*, and second cable connection terminal 1510*b*.

Portions of the intermediate cables 1520 of the FIG. 15A, 15B embodiment are positioned within a cable jacket 1540. The jacket 1540 facilitates coordinated positioning of the intermediate cables 1520 in a space between trays 1505*a* and 1505*b*. Further, the jacket is held by a support 1550, which restrains the jacket and, in turn, the intermediate cables in at least one direction.

Referring now to FIG. 15B, paired tray patch panel arrangement 1500B is shown with tray 1510*a* in a tray-in position and tray 1510*b* in a tray-out position. Arrangement 1500B is the same as arrangement 1500A, except with respect to the X axis. Along the X axis, arrangement 1500B mirrors arrangement 1500A. As can be seen from FIG. 15B, movement of tray 1510*b* to the tray out position does not cause any significant force to be exerted on tray 1510*a* due to the slack in intermediate cables 1560. That is, as tray 1510*b* is moved in the Y direction, intermediate cables 1560 and associated jacket 1565 accommodate such movement. Moreover, a support 1570 support cables 1560 and jacket 1565 along the Z direction. The support 1570 holds the cables 1560 and jacket 1565 and is free to move in an XY plane but not along the Z axis such that cables 1560 and jacket 1565 are free to move in an XY plane but restrained from movement along the Z axis.

Arrangement 1500B may be stacked in a first direction, e.g., the Z direction, with other paired tray arrangements. In such configuration, tray 1510*b* may be adapted to slide between a first tray-in position and at least one first tray-out position by sliding parallel to, or substantially parallel, to trays in the other paired tray arrangements while the tray 1510*a* does not move.

Referring now to FIGS. 16A-16F are perspective views of a paired tray patch panel 1600 according to an embodiment.

Figure 16A:
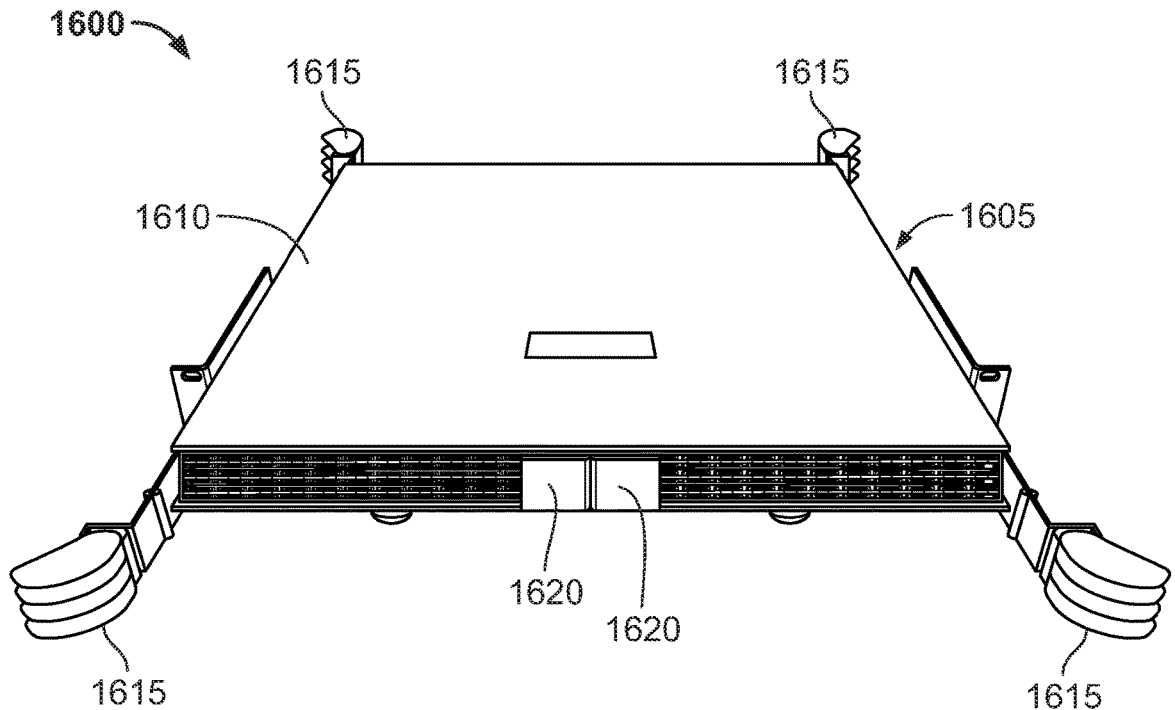
FIGS. 16A-16F are perspective views of a paired tray patch panel according to an embodiment.

FIG. 16A shows an enclosure 1605 of the patch panel 1600. The enclosure includes a top 1610, cable hangers 1615, and doors 1620. The cable hangers 1615 are provided for securing cables running to and from the patch panel. The doors 1620 are provided to secure slidable trays within the enclosure 1605, and may be opened to allow the trays to slide outward from the enclosure 1605.

Figure 16B:
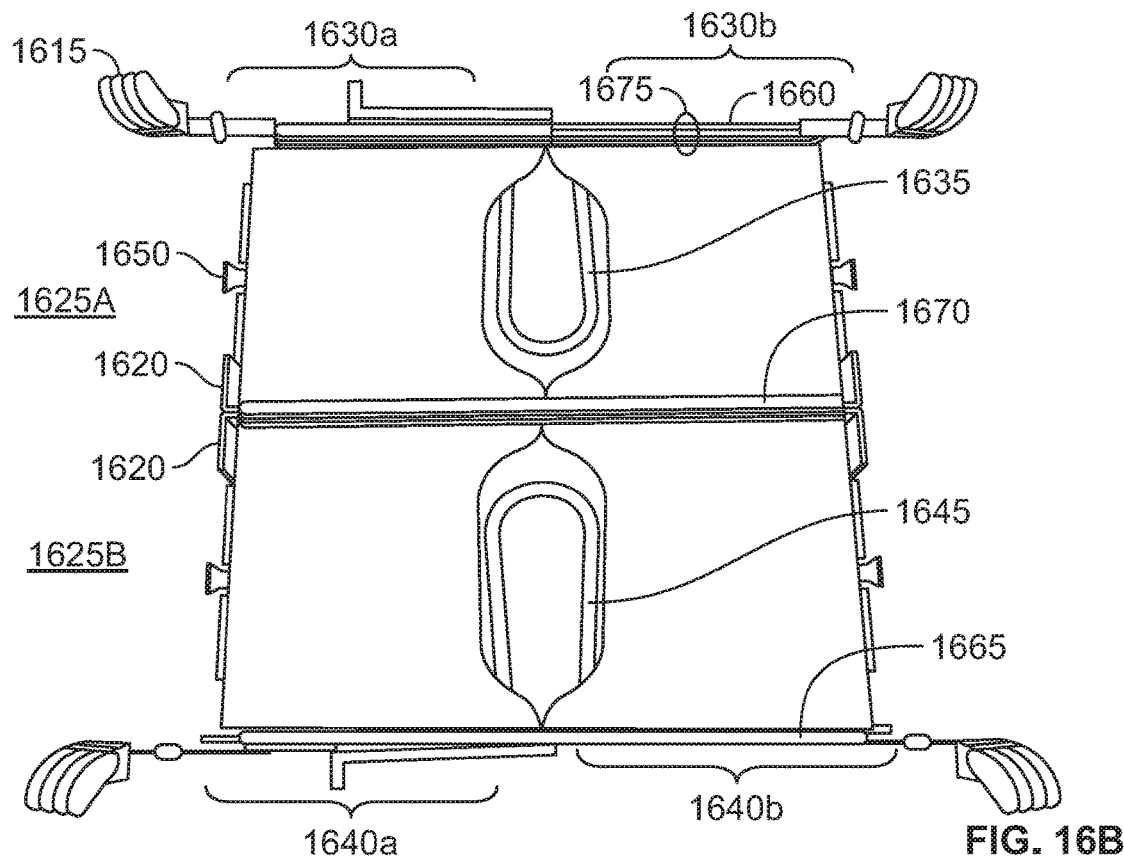

FIG. 16B shows the patch panel of FIG. 16A with portions, including top 1610, removed. The patch panel includes a first paired tray patch panel arrangement 1625A and a second paired tray patch panel arrangement 1625B. In one possible embodiment the arrangements 1625A and 1625B may respectively take the form of arrangements 1500A and 1500B (as shown in FIGS. 15A and 15B). In any event, arrangement 1625A includes a first tray 1630a, a second tray 1630b and intermediate cables (not shown) which run through a cable jacket 1635. Similarly, arrangement 1625B includes a first tray 1640a, a second tray 1640b and intermediate cables (not shown) which run through a cable jacket 1645. In addition, each of trays 1630a, 1630b, 1640a, and 1640b includes a handle, e.g., handle 1650, for easy manipulation of the tray. As can be seen in FIG. 16B, the patch panel includes sidewalls 1660 and 1665, and a middle wall 1670. The walls 1660, 1665, and 1670 have corresponding guides, e.g., multiple guides 1675 on sidewall 1660, which guide movement of the trays of the patch panel, e.g., trays 1630a and 1630b, between tray-in positions and tray-out positions. In FIG. 16B only two paired tray patch panel arrangements are shown, however the patch panel of the figure is configured to include six paired tray patch panel arrangements, stacked in three layers with two paired tray arrangements configured side by side in each layer. The layers proceed upwards from arrangements 1625A and 1625B toward the top of the enclosure such that each layer corresponds to one of guides 1675.

Figure 16C:
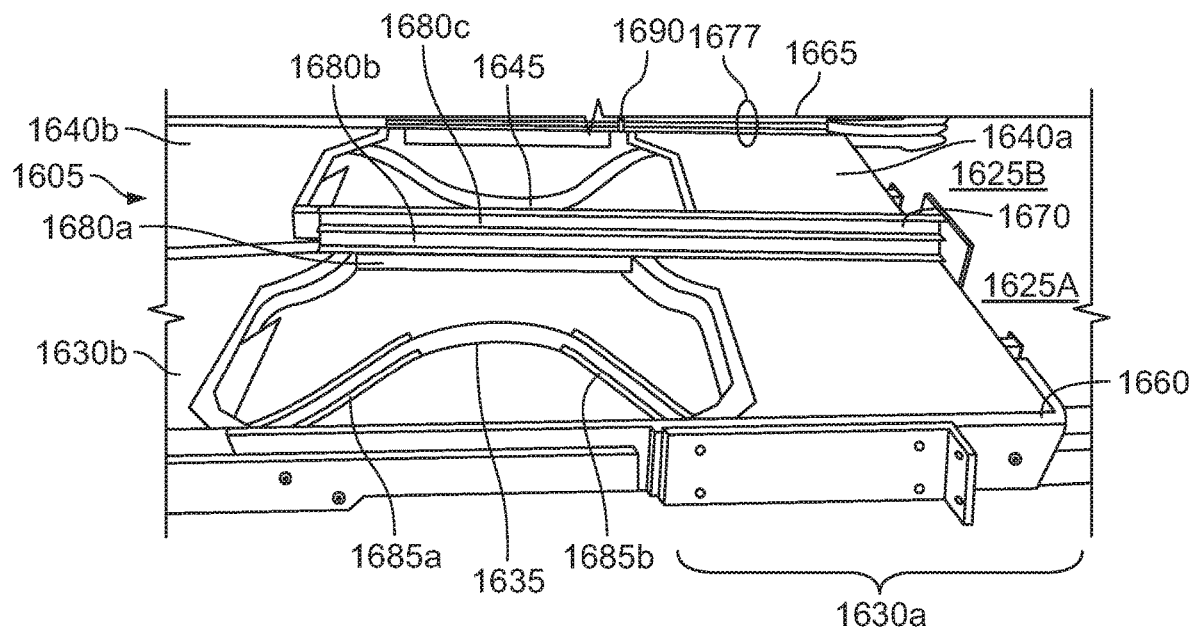
Figure 16D:
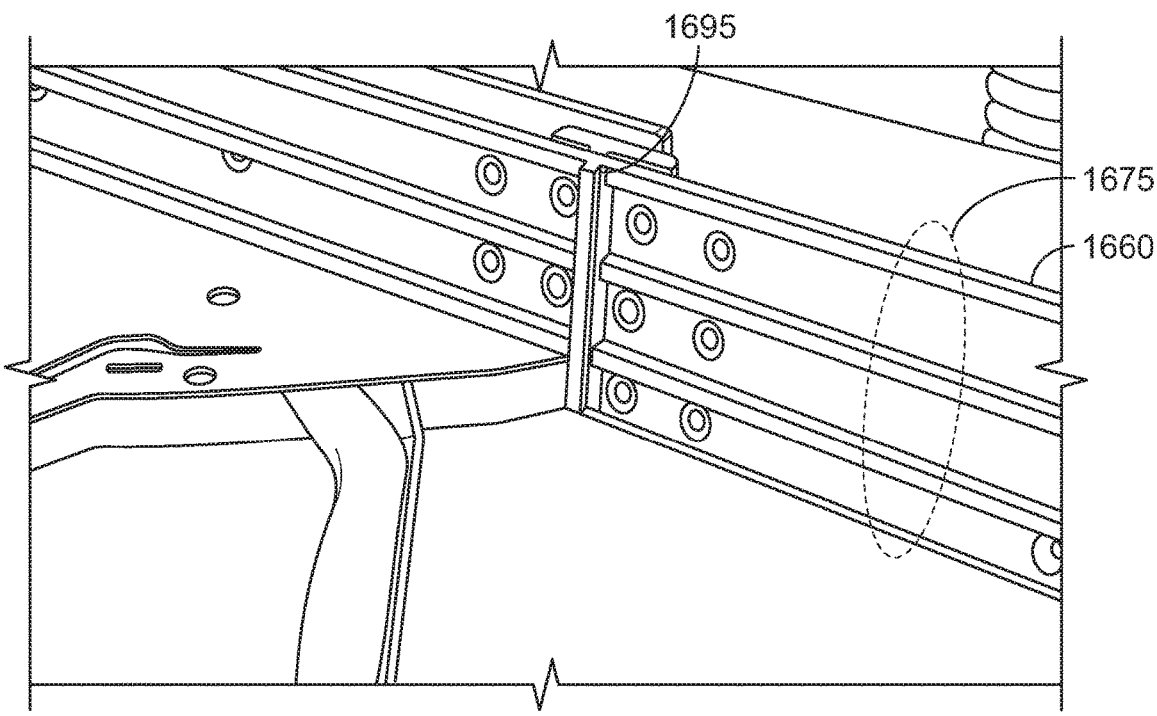

FIG. 16C shows an alternate view of the layout of FIG. 16B. As can be seen from FIG. 16C, middle wall 1670 includes guides 1680a, 1680b, and 1680c. Each of guides 1680a, 1680b, and 1680c each correspond to a layer of two paired tray arrangements. Thus, for example, guide 1680a corresponds provides guidance for trays 1630a and 1630b of arrangement 1625A. As can be further seen from FIG. 16C, each of the cable jackets, e.g., cable jacket 1635, are supported by respective pairs of supports, e.g., supports 1685a and 1685b, which restrain the cable jacket, and intermediate cables inside the jacket, from moving in a direction along the top to bottom direction of the enclosure 1605 while allowing the jacket and cables to move in a direction perpendicular to the top to bottom direction of the enclosure 1605. FIG. 16C also shows a center stopper 1690 on sidewall 1665. The center stopper 1690 is provided to limit movement of trays guided by guides 1677, e.g., tray 1640a, when the trays are moved toward the enclosure 1605. FIG. 16D provides a detail view of a center stopper 1695 on sidewall 1660.

Figure 16E:
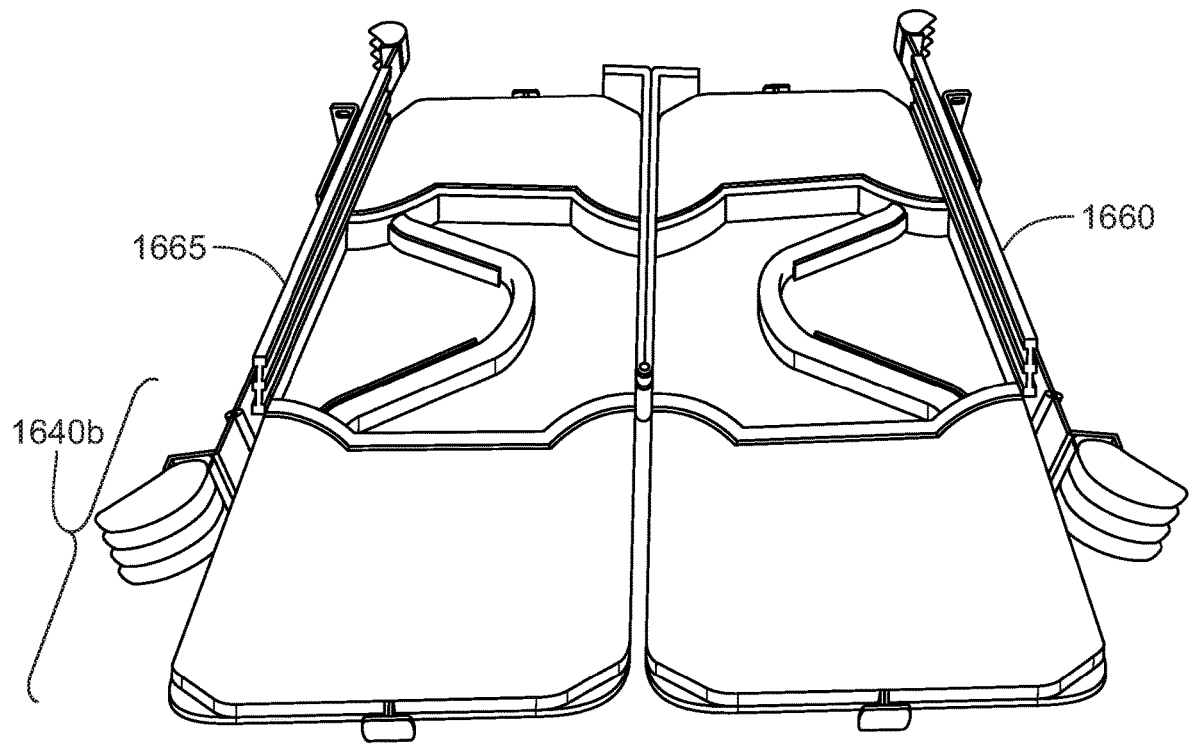
Figure 16F:
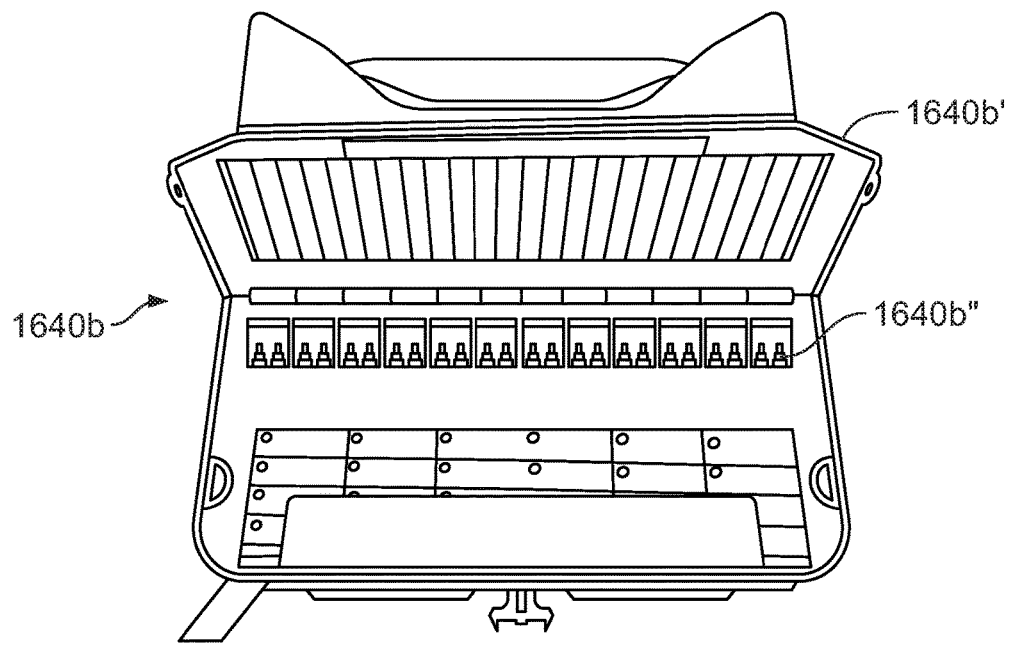

FIG. 16E shows an alternate view of the layout of FIGS. 16B and 16C. In FIG. 16E tray 1640b appears at the lower left portion of the figure. Tray 1640b is shown in isolation in FIG. 16F. As can be seen from FIG. 16F, tray 1640b includes a lid 1640b' which may be opened to expose a multiple of ports 1640b". In one embodiment, each of the ports 1640b" may be the same as port 1525a (shown in FIG. 15A).

Figure 17:
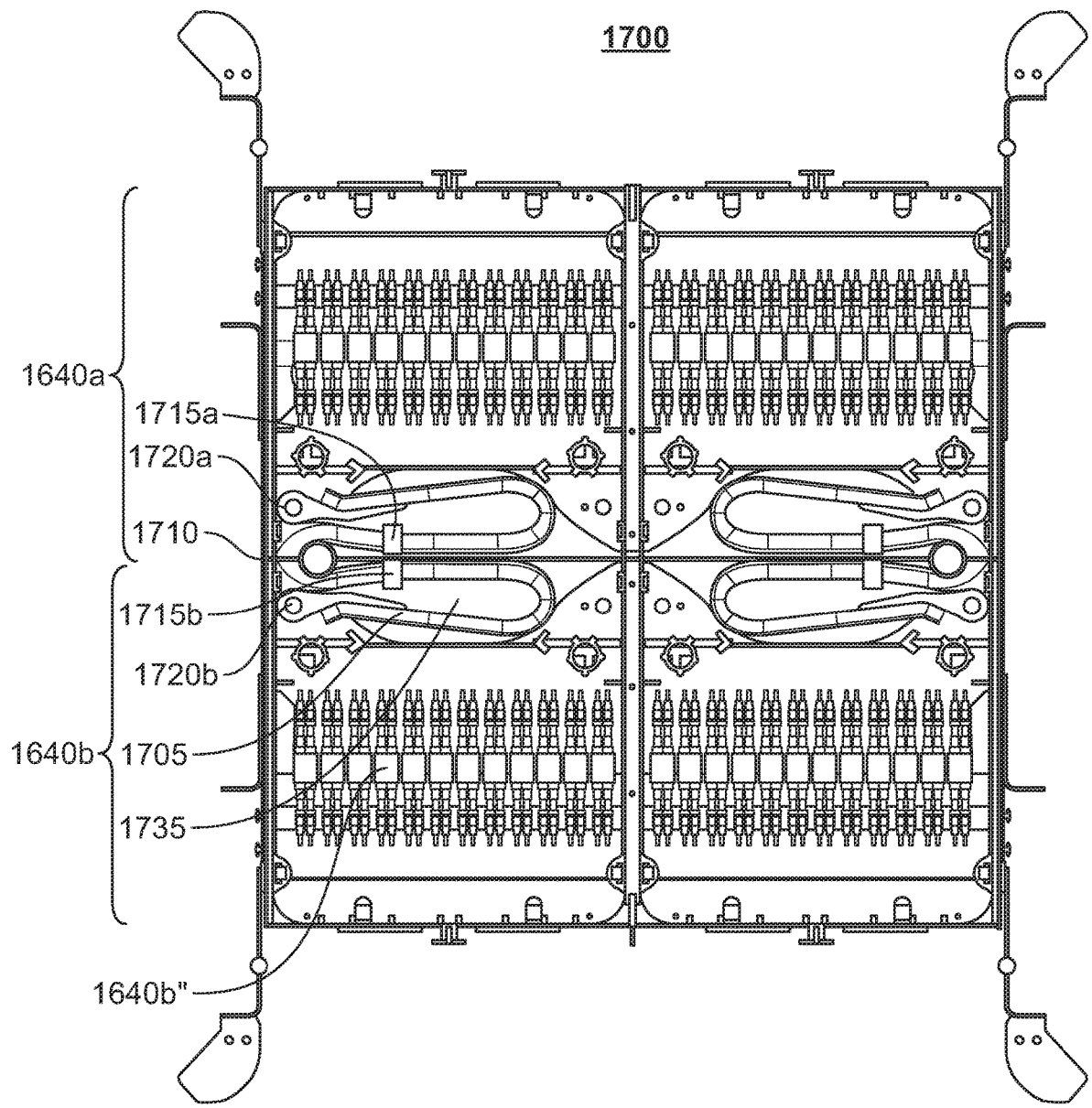
FIG. 17 is a top view of a paired-tray patch panel configuration according an embodiment.

FIG. 17 is a top view of a paired tray patch panel configuration 1700 according another embodiment. The FIG. 17 configuration is similar to the embodiment discussed in connection with FIGS. 16A-16F, except with regard to intermediate cable management. The embodiment of FIG. 17 further reduces the risk that movement of one tray in a pair will interfere with cable connections on the other tray in the pair. For example, the embodiment features cable management that further reduces the risk that movement of tray 1640b from its tray-in position (shown) to its tray-out position (not shown) will interfere with cable connections on tray 1640a. More specifically, intermediate cables that couple connection terminals on tray 1640b to connection terminals on 1640a are routed through a cable jacket 1705 which is secured to a wall 1710 of the patch panel configuration by a sleeves 1715a and 1715b. Thus, when either, or both, of trays 1640a and 1640b move the jacket and cable portions farthest from the trays 1640a and 1640b do not move, thereby insulating movement of the trays 1640a and 1640b from each other. In addition, the FIG. 17 embodiment includes pivoting supports 1720a and 1720b to support the cable jacket 1705 such that the jacket can move in a direction parallel, or substantially parallel, to a floor 1735 of the patch panel configuration 1700 but not in a direction perpendicular, or substantially perpendicular to the floor 1735.

Figure 18:
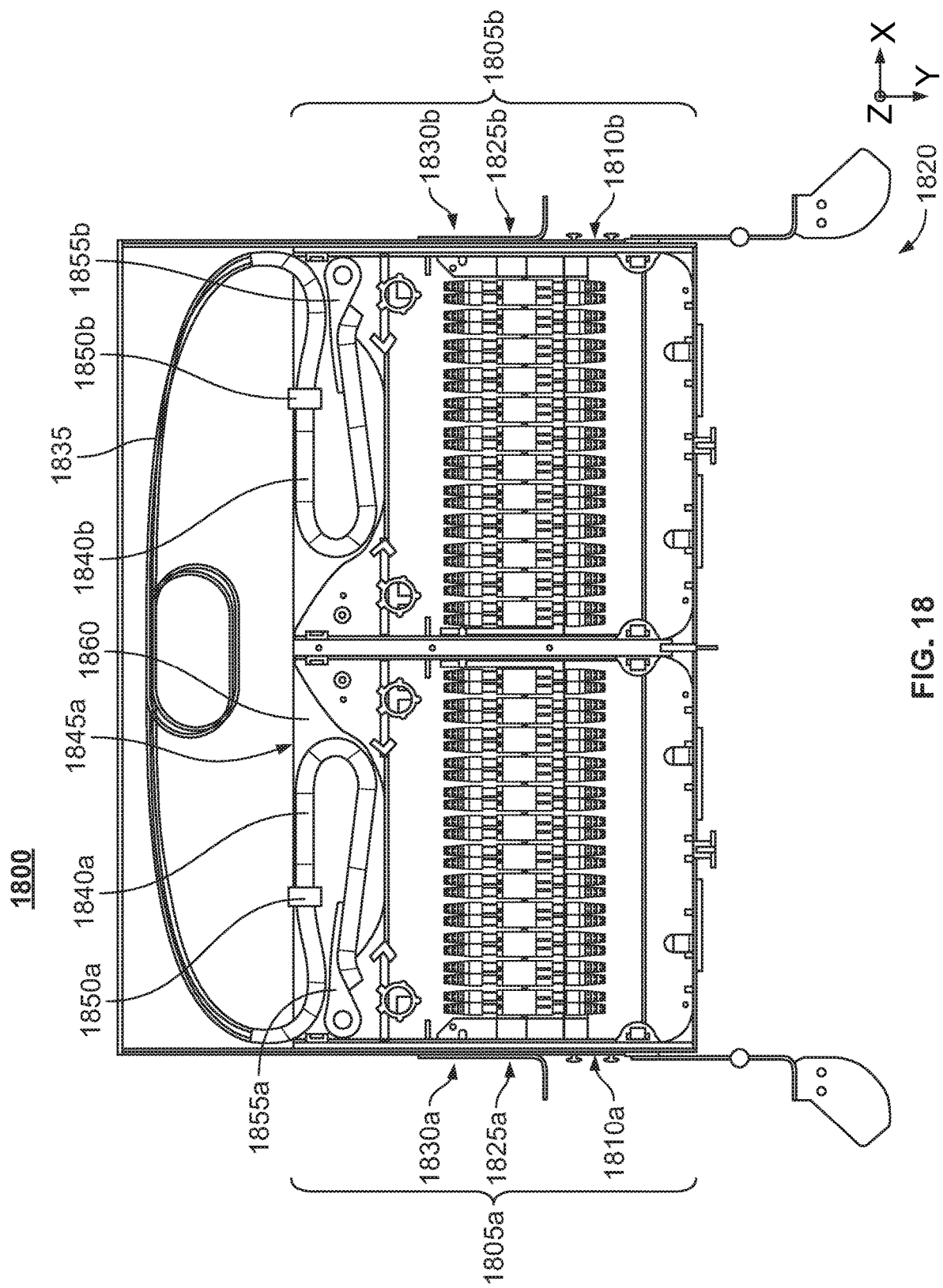
FIG. 18. is a top view of a paired tray patch panel configuration according to an embodiment in which all cable access is from the front of a patch panel.

FIG. 18. is a top view of a paired tray patch panel configuration 1800 according to an embodiment in which all cable access is from the front of the patch panel. The FIG. 18 configuration includes first tray 1805a having cable connection terminals 1810a and a second tray 1805b having cable connection terminals 1810b. The trays 1805a and 1805b are positioned such that both terminals 1810a and 1810b face a same side of the configuration 1800, e.g., a front side 1820 of the configuration 1800. Cables connected to respective ones of terminals 1810a are communicatively coupled to cables connected to respective ones of terminals 1810b via ports 1825a of tray 1805a, intermediate cable connection terminals 1830a, intermediate cables 1835, intermediate cable connection terminals 1830b, and ports 1825b of tray 1805b. The embodiment of FIG. 18 allows each of tray 1805a and 1805b to be moved from their tray-in position (shown) to a tray-out position without disturbing the other tray. In the embodiment as depicted, moving either of tray 1805a or 1805b to a tray-out position involves moving tray 1805a or 1805b along the Y direction.

To reduce risk that movement of tray 1805a or 1805b will interfere with cable connections on the other tray, the intermediate cables 1835 are routed through cable jackets 1840a and 1840b which are secured to a wall 1845 of the patch panel configuration 1800 by respective sleeves 1850a and 1850b. Thus, when either, or both, of trays 1805a and 1805b move the jackets 1840a and 1840b and cable portions farthest from the trays do not move, thereby insulating movement of the trays 1805a and 1805b from each other. In addition, the FIG. 18 embodiment includes pivoting supports 1855a and 1855b to respectively support the cable jackets 1840a and 1840b such that the jackets can move in a direction parallel, or substantially parallel, to a floor 1860 of the patch panel configuration 1800 but not in a direction perpendicular, or substantially perpendicular to the floor 1860.

Figure 19:
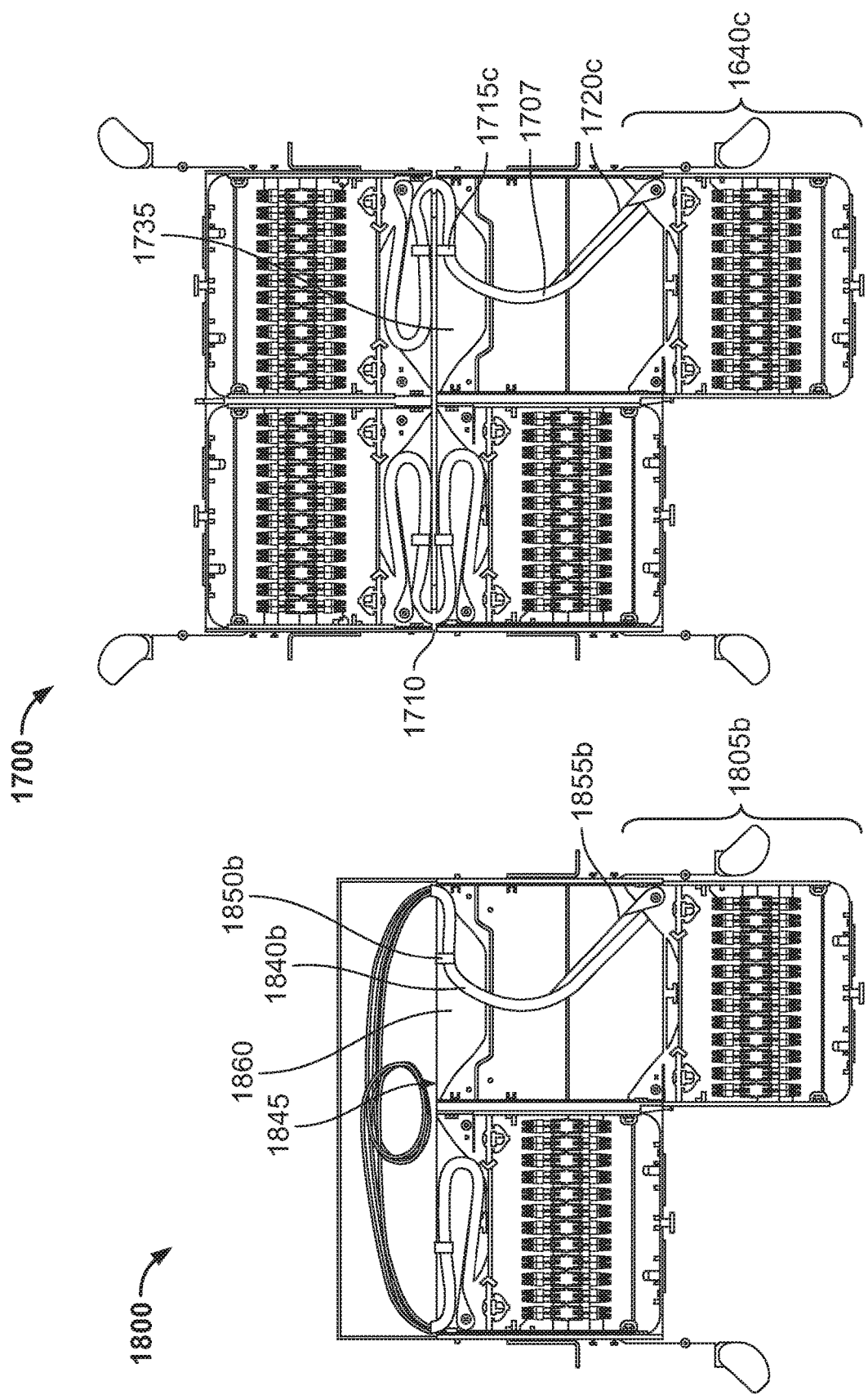
FIG. 19A is a top view of the paired tray patch panel of FIG. 18 with one tray in a tray-out position.
FIG. 19B is a top view of the paired tray patch panel of FIG. 17 with one tray in a tray-out position.

FIG. 19A is a top view of the paired tray patch panel of FIG. 18 with tray 1805b in a tray-out position. As can be seen by from the figure, pivoting support 1855b has pivoted to accommodate the tray-out position of tray 1805b and attendant position of cable jacket 1840b while supporting the cable jacket 1840b in a direction parallel, or substantially parallel, to floor 1860. As can be further seen from the figure, when tray 1805b is in the tray-out position the cable jacket 1840b remains secured to the wall 1845 by sleeve 1850b.

FIG. 19B is a top view of the paired tray patch panel of FIG. 17 with a tray 1640c in a tray-out position. As can be seen by from the figure, a pivoting support 1720c has pivoted to accommodate the tray-out position of tray 1640c and attendant position of cable jacket 1707 while supporting the cable jacket 1707 in a direction parallel, or substantially parallel, to a floor 1735 of the patch panel configuration 1700. As can be further seen from the figure, when tray 1640c is in the tray-out position the cable jacket 1707 remains secured to the wall 1710 by sleeve 1715c.

Figure 20:
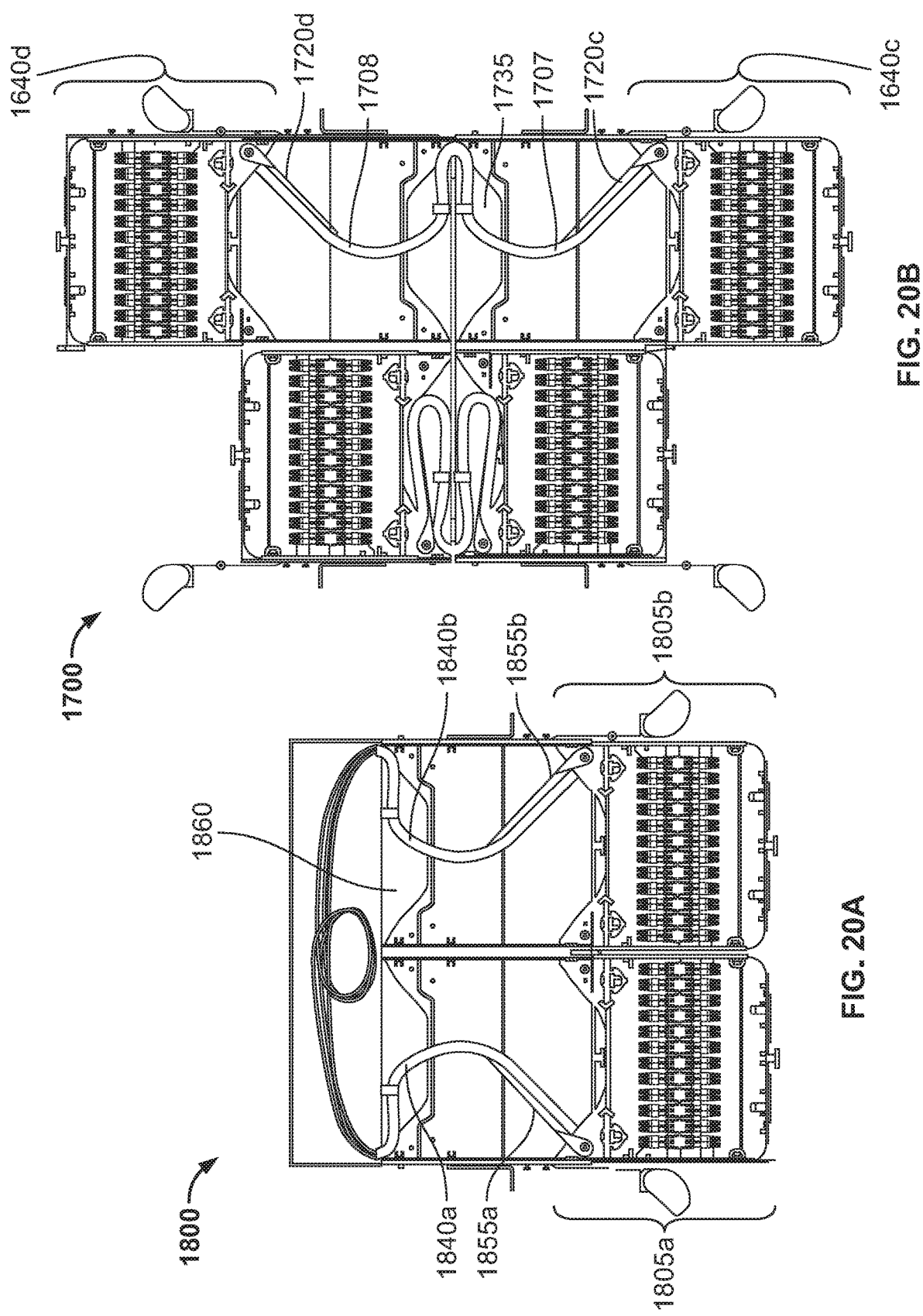
FIG. 20A is a top view of the paired tray patch panel of FIG. 18 with each of two trays in a tray-out position.
FIG. 20B is a top view of the paired tray patch panel of FIG. 17 with each of two trays in a tray-out position.

FIG. 20A is a top view of the paired tray patch panel of FIG. 18 with both tray 1805a and tray 1805b in tray-out positions. As can be seen, pivoting supports 1855a an 1855b have pivoted to respectively accommodate the tray-out positions of trays 1805a and 1805b while respectively supporting the cable jackets 1840a and 1840b in a direction parallel, or substantially parallel, to floor 1860.

FIG. 20B is a top view of the paired tray patch panel of FIG. 17 with both tray 1640c and a tray 1640d tray-out positions. As can be seen, pivoting supports 1720c and 1720d have pivoted to respectively accommodate the tray-out positions of trays 1640c and 1640d while respectively supporting cable jackets 1707 and 1708 in a direction parallel, or substantially parallel, to floor 1735.

Figure 21:
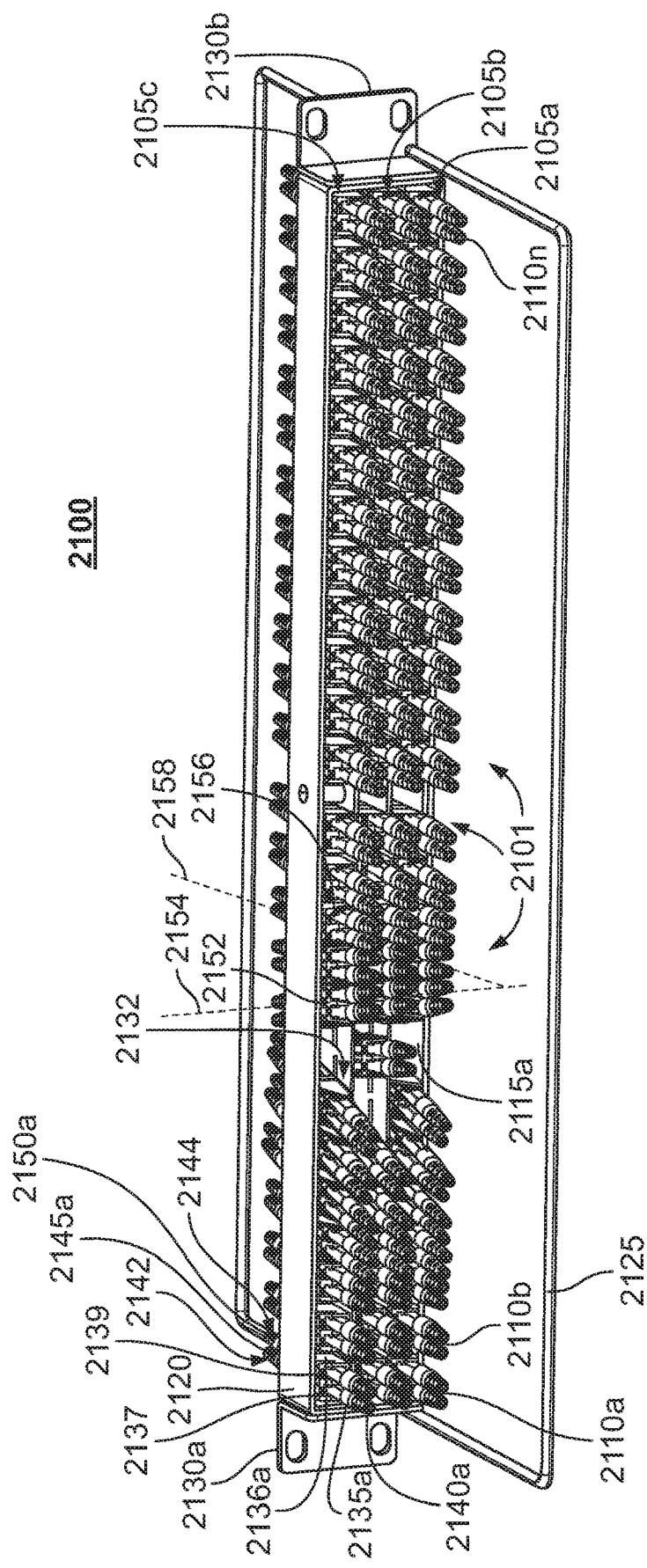
FIG. 21 is a perspective view of a rack mount patch panel unit according to an embodiment.

FIG. 21 is a perspective view of a rack mount patch panel unit 2100 according to an embodiment. The unit 2100 includes three patch panel subassemblies 2105a, 2105b, and 2105c, stacked in a first direction, the Z direction in the figure. Each patch panel subassembly includes at least one mounting plate, which is a type of mounting means of this disclosure, and a plurality of port assemblies. For example, subassembly 2105a includes a plurality of port assemblies 2110a, 2110b . . . 2110n, and mounting plate 2115a. The mounting plate 2115a is configured to accommodate the port assemblies 2110a-2110n so that each port assembly can individually translate along a direction parallel to a surface of the mounting plate, parallel to the direction X in the figure, and can rotate about an axis perpendicular to the surface of the mounting plate, about an axis in the direction Z in the figure. The port assemblies, e.g., port assemblies 2110a-2110n, are translatable and rotatable while keeping in contact with the mounting plates, e.g., mounting plate 2115a.

The rack mount patch panel unit 2100 also includes a frame 2120 and a cable support 2125. The frame 2120 may be used to secure the mounting plates, e.g., mounting plate 2115a, within the unit 2100, and to secure the unit 2100 to a rack (not shown) via mounts 2130a and 2130b. The cable support 2125 may be used to provide support in the Z direction for cables connected to the port assemblies, e.g. port assemblies 2110a to 2110n.

In the FIG. 21 configuration the port assembles, e.g. port assemblies 2110a to 2110n, have a common depth dimension 2132, shown by way of example in the figure. The depth dimension 2132 defines one dimension of space 2101 in which the port assemblies are arranged, The Y dimension of the space with reference to the figure. Accordingly, the Y dimension of the space is equal to depth dimension 2132 when all the port assemblies are aligned with their depths extending in the Y direction. Nevertheless, regardless of the port assemblies' orientations, the depth of the space 2101 (the Y extent of the space) is less than two times the depth dimension 2132 of the port assemblies.

The elements of the rack unit 2100 will be described in more detail below. In any event, it should be noted that the unit 2100 is not limited to three subassemblies, and that the unit 2100 may employee one subassembly, two subassemblies, or more than three subassemblies. Moreover, the unit 2100 may not include cable support 2125 or may include a cable support of a different configuration. Further, the unit 2100 may include a frame having a configuration different from frame 2120.

It should be further noted that for clarity of presentation the port assemblies, e.g., port assembly 2130a, are depicted with cable connection terminals, e.g., cable connection terminals 2135a, 2140a, 2145a, and 2150a, inserted in the assemblies. The cable connection terminals are associated with respective cables (not shown) and each port assembly communicatively couples a cable connection terminal on one side of the assembly with a cable connection terminal on the other side of the assembly such that the cables corresponding to the two cable connection terminals are communicatively coupled. For example, port assembly 2130a communicatively couples cable connection terminal 2135a to cable connection terminal 2145a. Moreover, it is noted that while the port assemblies are depicted as accommodating two cable connection terminals on each side, the embodiments are not limited to such assemblies. For instance, the port assemblies may accommodate one cable connection terminal on each side, or more than two cable connection terminals on each side.

The port assemblies may be secured in an elongated space. For example, the port assemblies in FIG. 21 are secured in space 2101, which is elongated in the X direction (the longitudinal direction). The longitudinal direction may be referred to as a first direction. Each port assembly at least one pair of front and rear ports, or interfaces, for accepting cable termination assemblies. For example, port assembly 2130a includes front ports 2137 and 2139 for accepting cable connection terminals 2135a and 2140a, respectively, and includes rear ports 2142 and 2144 for accepting cable connection terminals 2145a and 2150a, respectively. The ports 2137 and 2142 make an energy conveying connection between cable connection terminals 2135a and 2145a, and the ports 2139 and 2144 make an energy conveying connection between cable connection terminals 2140a and 2150a. Further, the relative position of the front port 2137 to rear port 2142, and from front port 2139 to rear port 2144, defines a second direction. The angle between the first direction and the second direction may be between 30 degrees and 90 degrees, depending on how port assembly 2130a is rotated. Moreover, the port assembly 2130a may be translated at least along the first direction. Notably, the angle between the first direction and the second direction of between 30 degrees and 90 degrees is applicable to all the port assemblies in FIG. 21, as is the capability of being translated at least along the first direction.

In addition, it is noted that for any one of the patch panel subassemblies in FIG. 21, e.g., subassembly 2105a, the port assemblies, e.g., port assemblies 2110a to 2110n, are individually translatable along a direction parallel to a surface of the mounting means, e.g., mounting plate 2115a. Further, since the port assemblies are individually translatable, a distance between a port of one of the port assemblies and a port of another one of the port assemblies is changeable by moving one or both of the one of the port assemblies and the another one of the port assemblies. Still further, it is noted that the port assemblies in FIG. 21 are individually rotatable such that for any one of the port assemblies, e.g. port assembly 2152, an axis, e.g., axis 2154, passing through the center of a front port of the one of the port assemblies and through the center of a corresponding rear port of the one of the port assemblies is positionable to be non-parallel with an axis, e.g., axis 2158, passing through the center of a front port of another one of the port assemblies, e.g., port assembly 2156, and through the center of a corresponding rear port of the another one of the port assemblies.

Turning now to FIG. 22A, there is shown a perspective view of a portion of the rack mount patch panel unit 2100 of FIG. 21 with the depicted port assemblies in neutral positions. For example, ports 2160a to 2160l of subassembly 2105b are evenly spaced along a mounting plate 2115b with their longitudinal axes parallel to one another. FIG. 22B shows how selected ones of the port assemblies depicted in FIG. 22A may be moved from their neutral positions to allow easy access to port assembly 2160f. As can be seen from FIG. 22B, port assembly 2160e has been translated in the −X direction and rotated clockwise when viewed from the +Z direction, and port assembly 2160g has been translated in the +X direction and rotated counterclockwise when viewed from the +Z direction.

FIG. 23A is a plan view of the port assemblies 2160a to 2160l of FIG. 22A. The figure shows uniform spacing of the port assemblies 2160a to 2160l along a longitudinal direction of the mounting plate 2115b when in the port assemblies 2160a to 2160l are in their neutral positions.

FIG. 23B is a plan view of port assemblies 2160e, 2160f, and 2160g of FIG. 23A. The figure shows a width dimension A of port assembly 2160g, although each of port assemblies 2160a to 2160l has the same width, and thus the width dimension A is a common to the port assemblies 2160a to 2160l. Further, FIG. 2B shows a spacing distance B between port assemblies 2160e and 23160f, although the spacing distance between any two adjacent port assemblies of port assemblies 2160a to 2160l is B, when the port assemblies 2160a to 2160l are in their neutral positions. In some embodiments, the spacing distance B is in the range of approximately two percent of the width dimension A and approximately twenty percent of the width dimension A.

FIG. 23C is a plan view of the middle row of FIG. 22B. The figure shows how the port assemblies 2160a to 2160l may be arranged to allow easy access to port assembly 2160f. As can be seen from the figure, port assemblies 2160a to 2160e and 2160g to 2160l have been moved from their neutral positions, and the port assemblies 2160a to 2160l are no longer spaced from each other by a spacing distance B.

Referring now to FIGS. 24A-24F, there are shown perspective views of mounting plates 2400a to 2400f for use in patch panel subassemblies in accordance with embodiments. Each of the mounting plates 2400 to 2425 includes a multiple of openings for accommodating respective port assemblies. For example, mounting plate 2420 includes a multiple of openings 2420a to 2420l. Mounting plates like mounting plate 2420 are used in the configuration of FIGS. 21-23C, although in light of this description it is apparent how any of mounting plates 2400, 2405, 2410, 2415, or 2425 may be employed in the context of the configuration of FIGS. 21-23C.

Regarding the port assemblies in general, should be noted that the possible configurations include an integrated assembly in which a port assembly takes the form of single part and a two-piece assembly in which a port assembly takes the form of a port secured within a port holder. An example of a two-piece assembly is shown in FIG. 25A.

FIGS. 25A-25C are partial perspective views showing detailed examples of a port assembly 2500 and port holders 2505a and 2505b secured to a mounting plate 2510. As shown in the figures, the port assembly 2500 is a two-piece assembly including a port 2503 and the port holder 2505a. The port assembly 2500 is secured to the mounting plate 2510 through an engagement member 2515a that engages with an opening 2520a that is one of a multiple of openings in the mounting plate 2510. The engagement member 2515a may translate along the opening 2520 and rotate within the opening 2520, thereby allowing the entire port assembly 2500 to translate along the opening 2520 and rotate within the opening 2520.

FIGS. 25D and 25E show port holder 2505a secured to a mounting plate 2530. The mounting plate 2530 differs from the mounting plate 2510 in that mounting plate 2530 includes a multiple of openings intersect and edge of mounting plate 2530 to facilitate insertion of port holders. For example, mounting plate 2530 includes an opening 2530a having a thinned portion 2535a that connects the opening 2530a to an edge 2540 of the mounting plate 2530. The port holder 2505a is easily secured to mounting plate 2530 by moving a neck 2545a of the port holder 2515a through thinned portion 2535a.

Referring now to FIGS. 26A-26E, there are shown perspective views of port holders 2600a to 2600e in accordance with embodiments. For each of port holders 2600a to 2600e, the holder is shown both in isolation and in engagement a port to form a port assembly. Moreover, for each of port holders 2600a to 2600e two views are provided a view from an upper side and a view from a lower side. For instance, port holder 2600a is shown in isolation and in engagement with a port 2605a to form a port assembly 2610a.

Figure 26F:
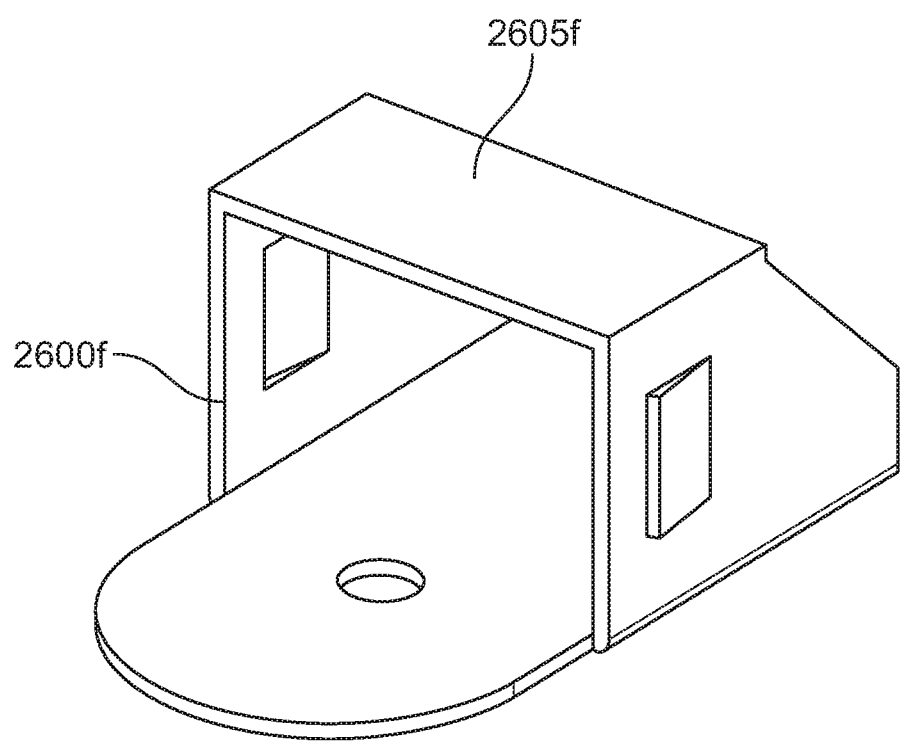
FIG. 26F is a perspective view of a port holder embodiment.

FIG. 26F is a perspective view of a port holder 2600f of embodiment. The port holder 2600f is configured to surround a corresponding port to provide more a more robust coupling of the port holder 2600f to the port. In the illustrated embodiment, port holder 2600f takes a form similar to port holder 2600d of FIG. 26D but including a top portion 2605f.

Figure 27C:
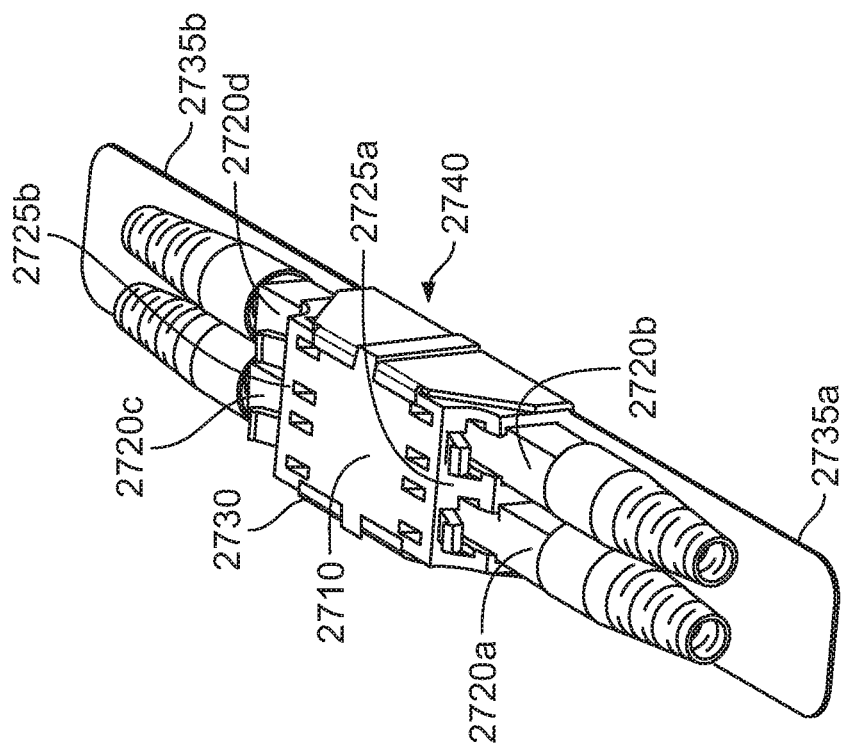
FIGS. 27A-27C are perspective views of port holders including a label tabs according to embodiments.
Figure 27B:
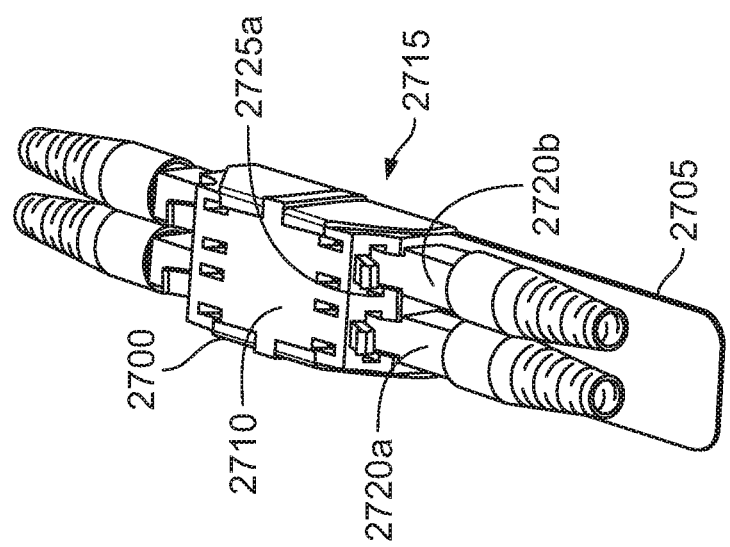
Figure 27A:
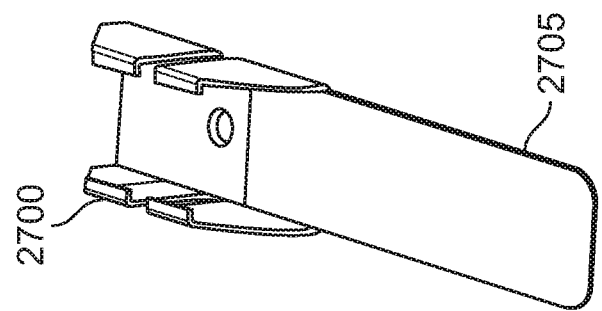

In some embodiments the port assemblies may include label tabs. FIGS. 27A-27C are perspective views of port holders and port assemblies including a label tabs according to embodiments. In the embodiments of FIGS. 27A-27C the label tabs may be part of a single part port assembly or a two-piece port assembly. Nevertheless, for conciseness of description only the two-piece configuration will be described. FIG. 27A shows a port holder 2700 having a label tab 2705. FIG. 27B shows the port holder 2700 with a port 2710 secured with in the port holder 2700 to form a port assembly 2715. The tab 2705 provides a space that may be used to identify cable connection terminals 2720a and 2720b received at a first interface 2725a of the port 2710 by, for example, writing on the tab 2705 with ink. FIG. 27C shows a port holder 2730 having two label tabs 2735a and 2735b, with port 2710 secured within the port holder 2730 to form a port assembly 2740. The tab 2735a provides a space that may be used to identify cable connection terminals 2720a and 2720b received at the first interface 2725a of the port 2710 by, for example, writing on the tab 2735a with ink, and the tab 2735b provides a space that may be used to identify cable connection terminals 2720c and 2720d received at a second interface 2725b of the port 2710 by, for example, writing on the tab 2735b with ink.

Figure 28A:
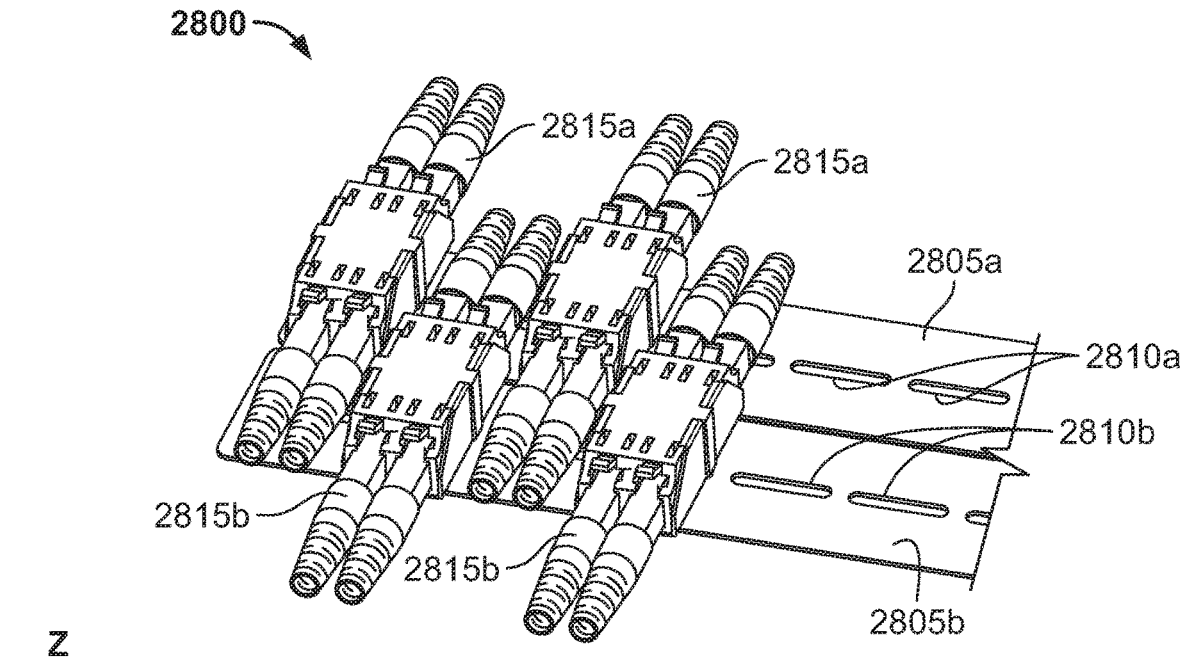
FIGS. 28A, 28B, and 29 are perspective views of arrangements port assemblies and mounting plates according to embodiments.
Figure 28B:
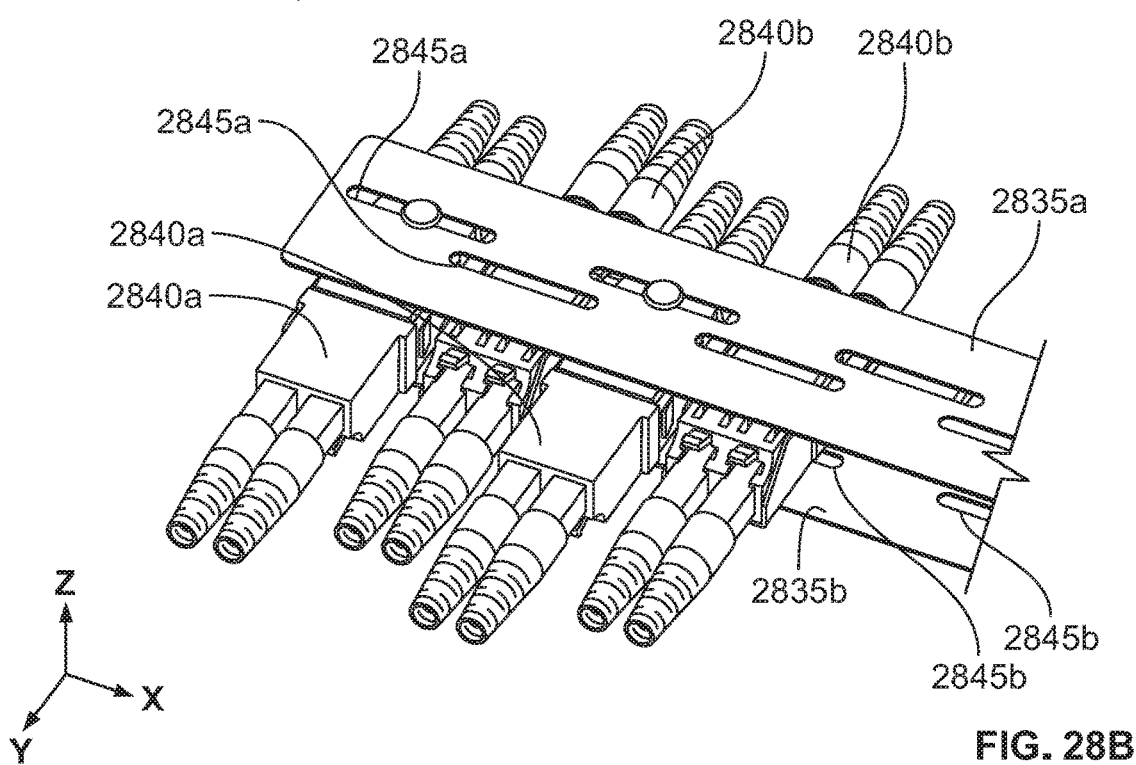
Figure 29:
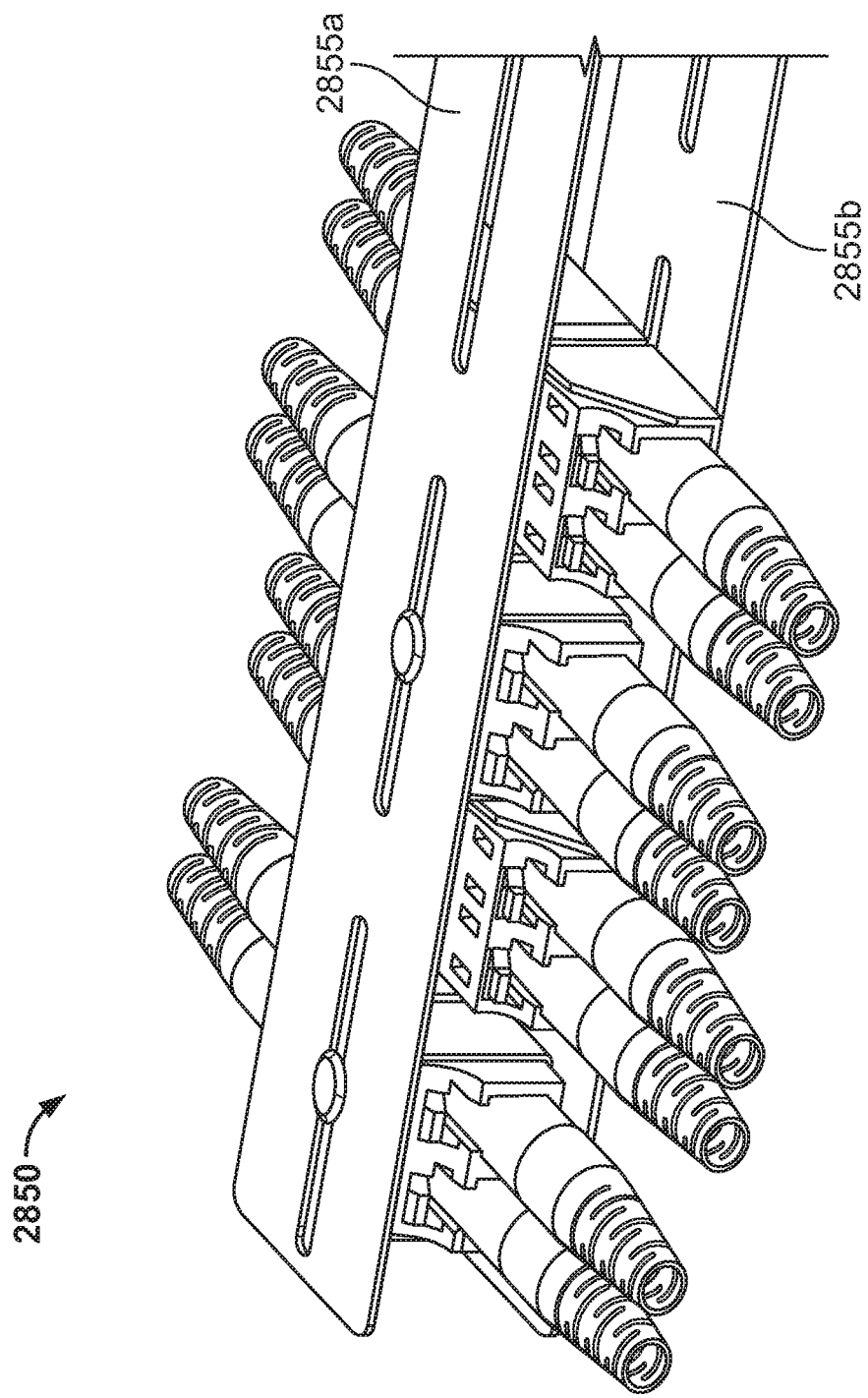

Turning now to FIGS. 28A, 28B, and 29, there are shown perspective views of arrangements port assemblies and mounting plates according to embodiments. FIG. 28A shows a portion 2800 of a patch panel subassembly. The subassembly includes two mounting plates 2805a and 2805b placed next to each other such that they are coplanar. Mounting plate 2805a includes a multiple of openings 2810a, and mounting plate 2805b includes a multiple of openings 2810b. The mounting plate 2805a is used to secure port assemblies 2815a via every other opening 2810a beginning with the first opening along the X direction of the mounting plate 2805a, and the mounting plate 2805b is used to secure port assemblies 2815b via every other opening 2810b beginning with the second opening along the X direction of the mounting plate 2805b. Thereby, the port assemblies 2815a and 2815b are arrayed in a staggered formation with respect to the Y direction. Also, each of the port assemblies 2815a and 2815b are translatable and rotatable as mounted.

FIG. 28B shows a portion 2830 of a patch panel subassembly. The subassembly includes two mounting plates 2835a and 2835b placed one above the other in the Z direction, with a multiple of port assemblies 2840a an 2840b between the mounting plates 2835a and 2835b. Mounting plate 2835a includes a multiple of openings 2845a for securing port assemblies 2840a via every other opening 2845a beginning with the first opening along the X direction of the mounting plate 2835a, and mounting plate 2835b includes a multiple of openings 2845b for securing port assemblies 2840b via every other opening 2845b beginning with the second opening along the X direction of the mounting plate 2835b. The arrangement of the openings 2845 and 2845b provide for a staggered formation of the subassemblies 2840a and 2840b with respect to the Y direction. Also, each of the port assemblies 2840a and 2840b are translatable and rotatable as mounted.

FIG. 29 shows a portion 2850 of a patch panel subassembly. The configuration of FIG. 29 is like that of FIG. 28B with the exception that mounting plates 2855a and 2855b are used instead of mounting plates 2835a and 2845b of the FIG. 28B configuration.

Figure 30:
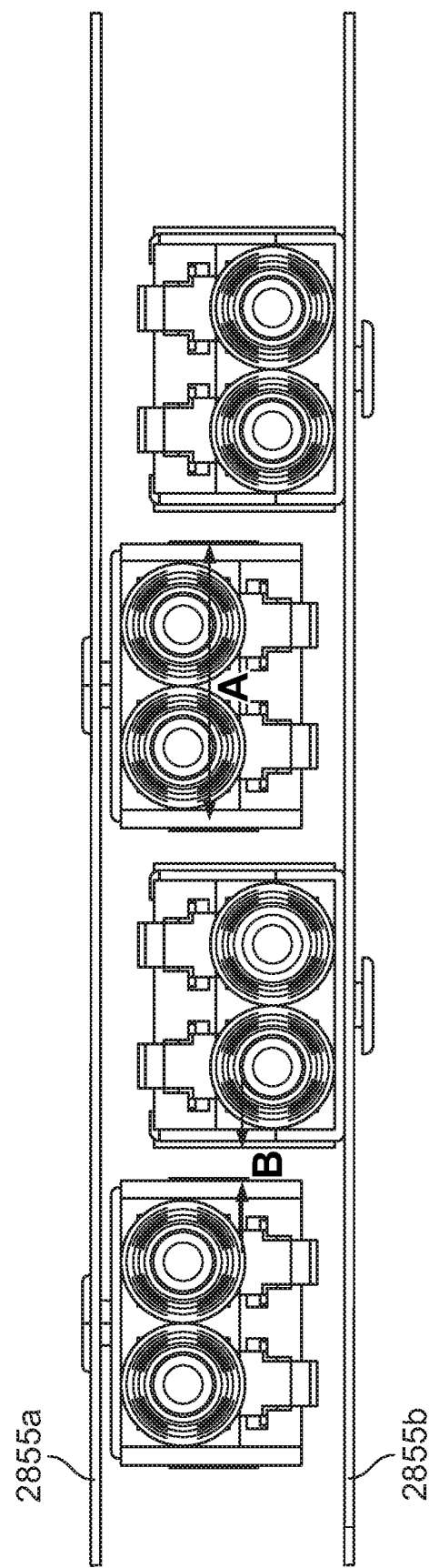
FIG. 30 is a profile view of the arrangement of FIG. 29.

FIG. 30 is a profile view of the arrangement of FIG. 29. As can be seen from the figure, the port assemblies have a width dimension A and a spacing distance B when in their neutral positions.

Figure 31A:
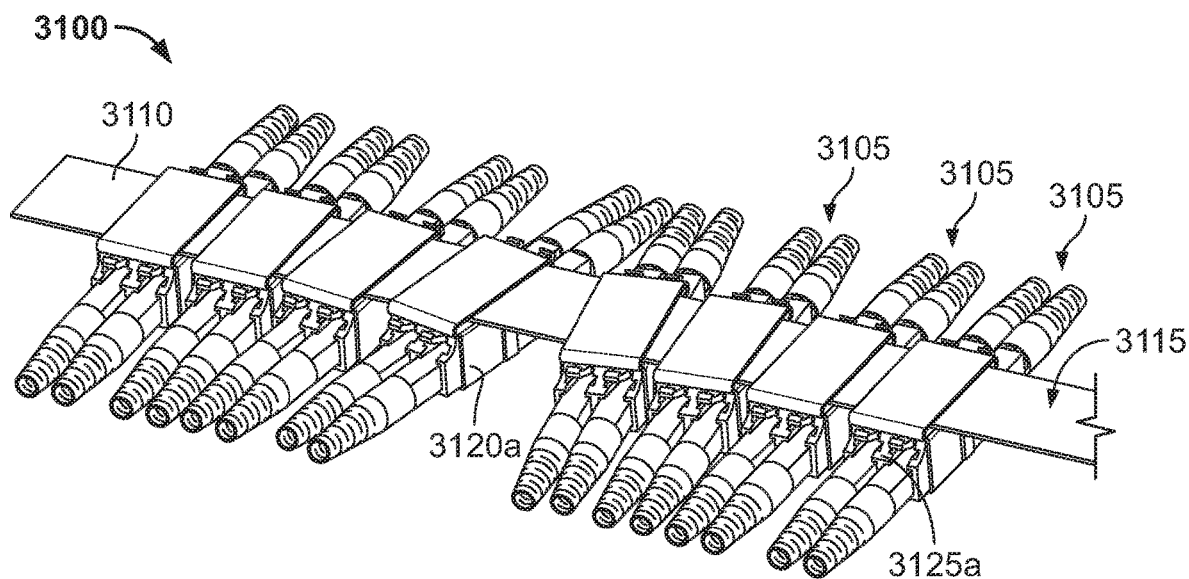
FIG. 31A is a perspective view of an arrangement of port assemblies and mounting plate according to an embodiment.

Turning now to FIG. 31A, there is shown is a perspective view of an arrangement 3100 of port assemblies 3105 and a mounting plate 3110 according to an embodiment. The arrangement 3100 may be used as port of a patch panel subassembly. The port assemblies 3105 of the arrangement 3100 are mounted such that they can translate along a surface 3115 of the mounting plate 3110, while being able to rotate in a direction perpendicular to the surface 3115 of the mounting plate 3110. The port assemblies 3105 are two-piece port assemblies. For example, port assembly 3105a includes a port holder 3120a and a port 3125a. Nevertheless, it should be noted that the embodiment of FIG. 31A is not limited to a two-piece assembly.

Figure 31B:
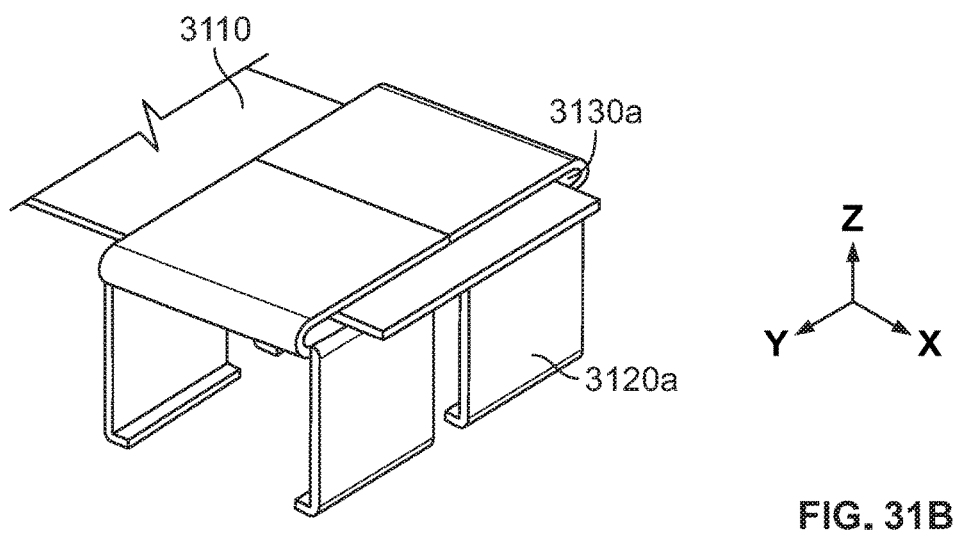
FIG. 31B is a perspective view of a port holder of the FIG. 31A embodiment.

FIG. 31B is a perspective view of the port holder 3120a of the FIG. 31A embodiment. As can be seen from FIG. 31B, the port holder 3120a includes an opening 3130a for securing the port holder 3120a to the mounting plate 3110 in a translatable and rotatable fashion. In order to allow the port holder 3120a to translate and rotate when mounted, the opening 3130a is larger than the mounting plate in at least one dimension, the Y dimension in the FIG. 31B embodiment.

Figure 31C:
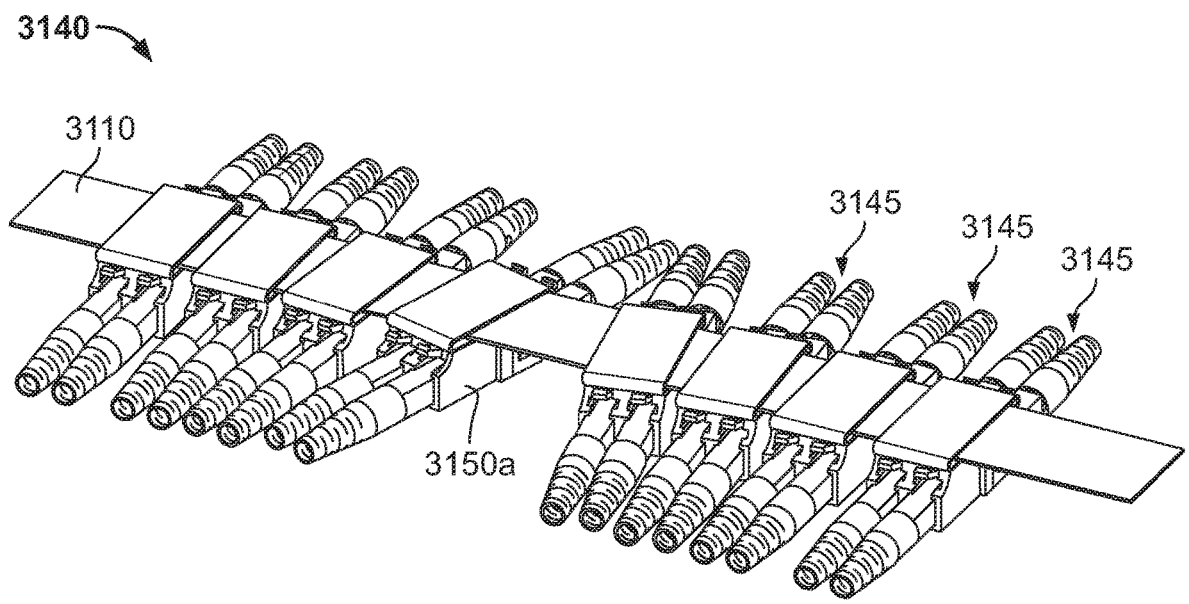
FIG. 31C is a perspective view of an arrangement of port assemblies and mounting plate according to an embodiment.

FIG. 31C is a perspective view of an arrangement 3140 of port assemblies 3145 and mounting plate 3110 according to an embodiment. The arrangement 3140 of FIG. 31C is like the arrangement 3100 of FIG. 31A with the exception that the arrangement 3140 includes a different type of port holder. For example, the arrangement 3140 includes a port holder 3150a instead of port holder 3120a.

Figure 31D:
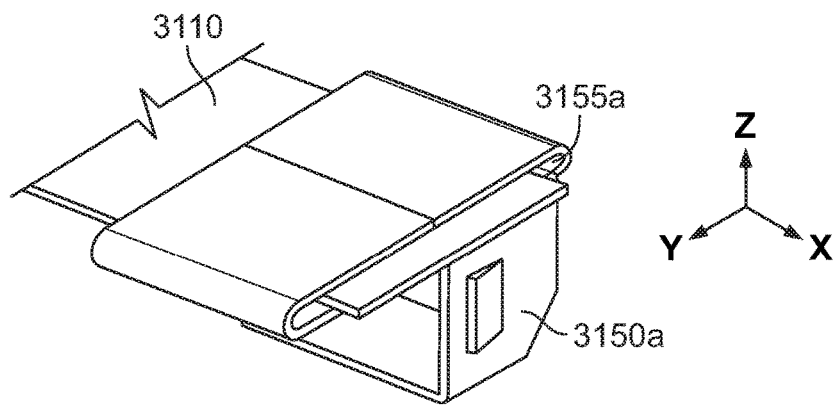
FIG. 31D is a perspective view of a port holder of the FIG. 31C embodiment.

FIG. 31D shows a perspective view of the port holder 3150a of the FIG. 31C embodiment. The port holder 3150a includes an opening 3155a for securing the port holder 3150a to the mounting plate 3110 in a translatable and rotatable fashion. In order to allow the port holder 3150a to translate and rotate when mounted, the opening 3155a is larger than the mounting plate in at least one dimension, the Y dimension in the FIG. 31D embodiment.

Figure 32A:
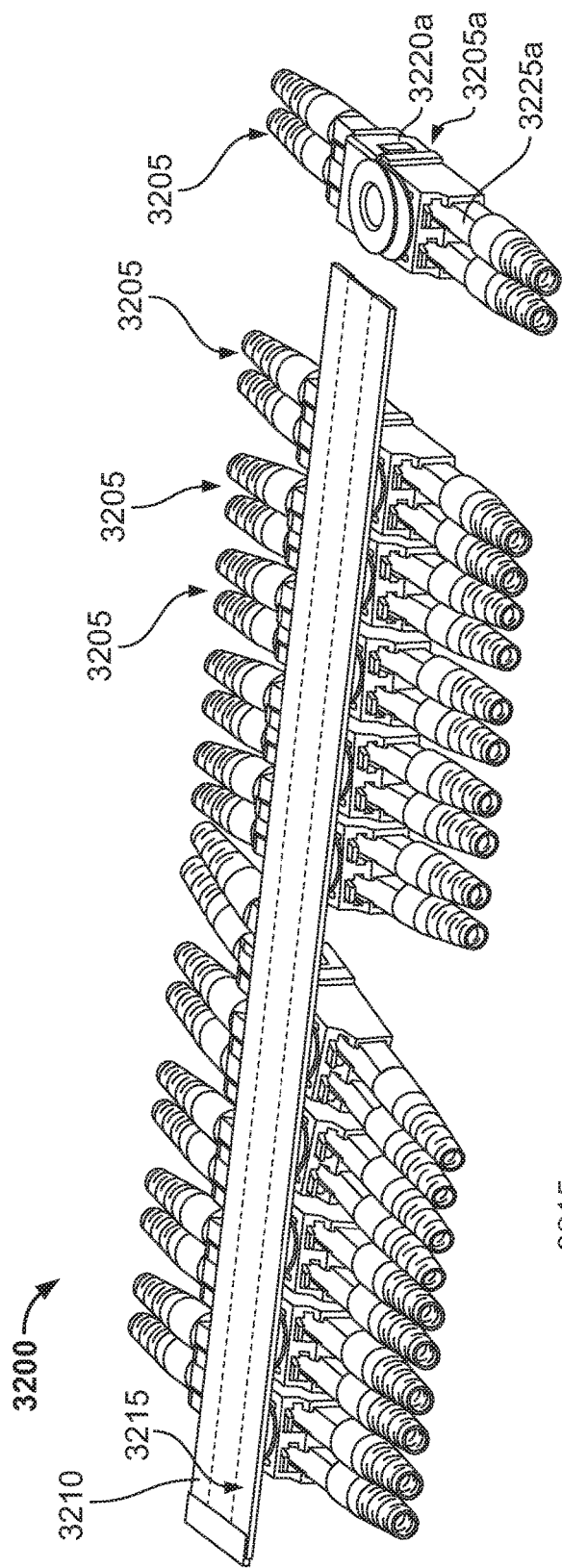
FIG. 32A is a perspective view of an arrangement of port assemblies and mounting plate according to an embodiment.

FIG. 32A is a perspective view of an arrangement 3200 of port assemblies 3205 and mounting plate 3210 according to an embodiment. The arrangement 3200 may be used as port of a patch panel subassembly. The port assemblies 3205 of the arrangement 3200 are mounted such that they can translate along a surface 3215 of the mounting plate 3210, while being able to rotate in a direction perpendicular to the surface 3215 of the mounting plate 3210. In the depicted configuration the port assemblies 3205 may translate in a direction parallel to the longitudinal axis of the mounting plate 3210. Also, the port assemblies 3205 are two-piece port assemblies. For example, port assembly 3205a includes a port holder 3220a and a port 3225a. Nevertheless, it should be noted that the embodiment of FIG. 32A is not limited to a two-piece assembly.

Figure 32B:
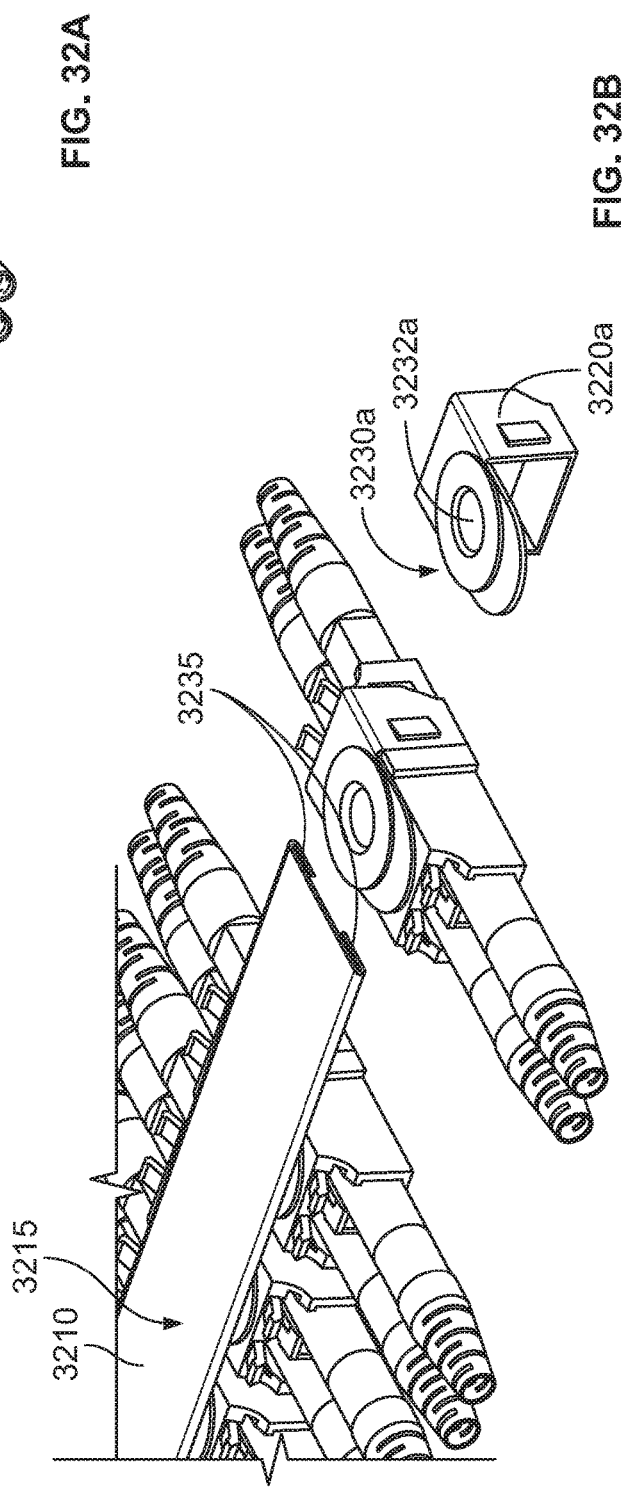
FIG. 32B is a detail view of a portion of the FIG. 32A embodiment and includes a view of a port holder of the embodiment in isolation.

FIG. 32B is a detail view of a portion of the FIG. 32A embodiment and includes a view of port holder 3220a of the embodiment in isolation. As can be seen from FIG. 32B, the port holder 3220a includes a circular engagement member 3230a, including a narrow portion 3232a, for securing the port holder 3220a within mounting plate 3210 in a translatable and rotatable fashion. As can be further seen from FIG. 32B, the mounting plate 3210 is formed to include constraining portions 3235 for engaging the port assemblies 3205 via engagement members, e.g., engagement member 3230a, while allowing the port assemblies to translate and rotate when mounted. The constraining portions 3235 engage the engagement members, e.g., engagement member 3230a, to constrain translation of the port assemblies to translation along one direction, along the longitudinal axis of mounting plate 3210 in the FIG. 32B configuration.

FIG. 32C is a perspective view of an arrangement 3240 of port assemblies 3245 and mounting plate 3210 according to an embodiment. The arrangement 3240 of FIG. 32C is similar to the arrangement 3200 of FIG. 32A with the exception that the arrangement 3240 includes a different type of port holder. For example, the arrangement 3240 includes a port holder 3250a instead of port holder 3220a.

FIG. 32D is a detail view of a portion of the FIG. 32C embodiment and includes a view of port holder 3240a of the embodiment in isolation. The port holder 3240a includes a includes a circular engagement member 3250a, including a narrow portion 3252a, for securing the port holder 3240a within mounting plate 3210 in a translatable and rotatable fashion circular opening 3155a for securing the port holder 3150a to the mounting plate 3110 in a translatable and rotatable fashion.

Figure 32E:
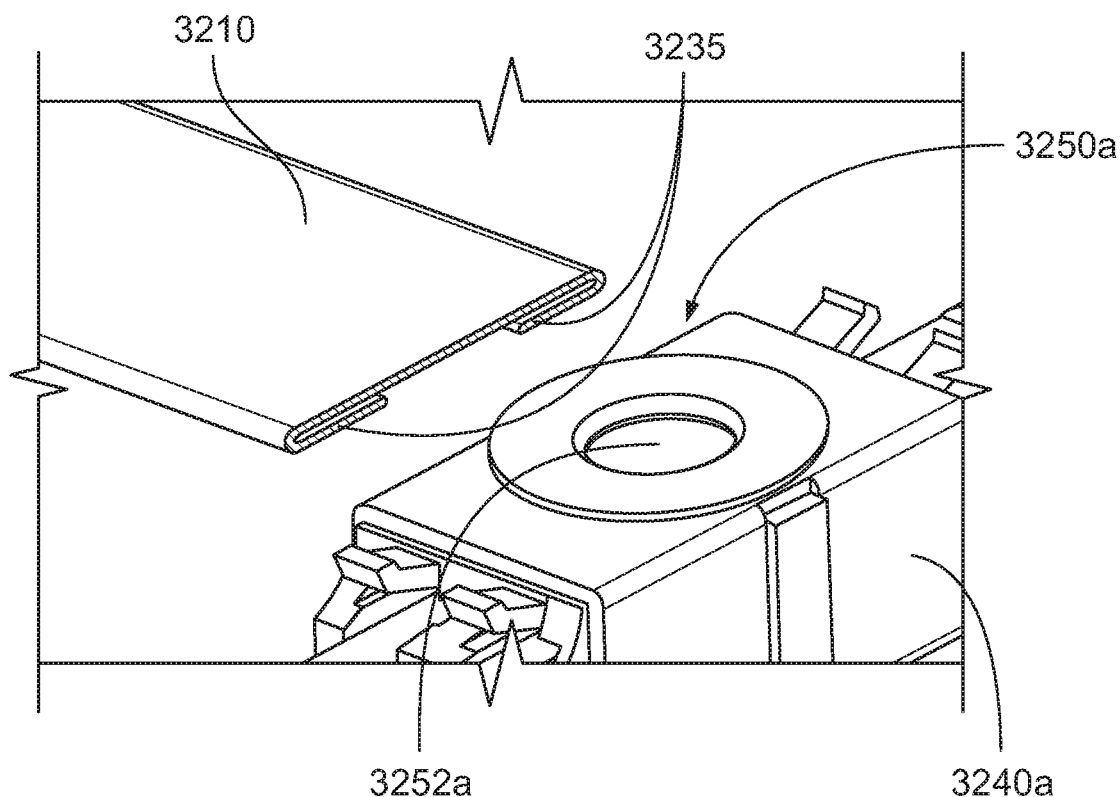
FIG. 32E is an enlarged view of a portion of FIG. 32D.

FIG. 32E is an enlarged view of a portion of FIG. 32D.

Figure 32F:
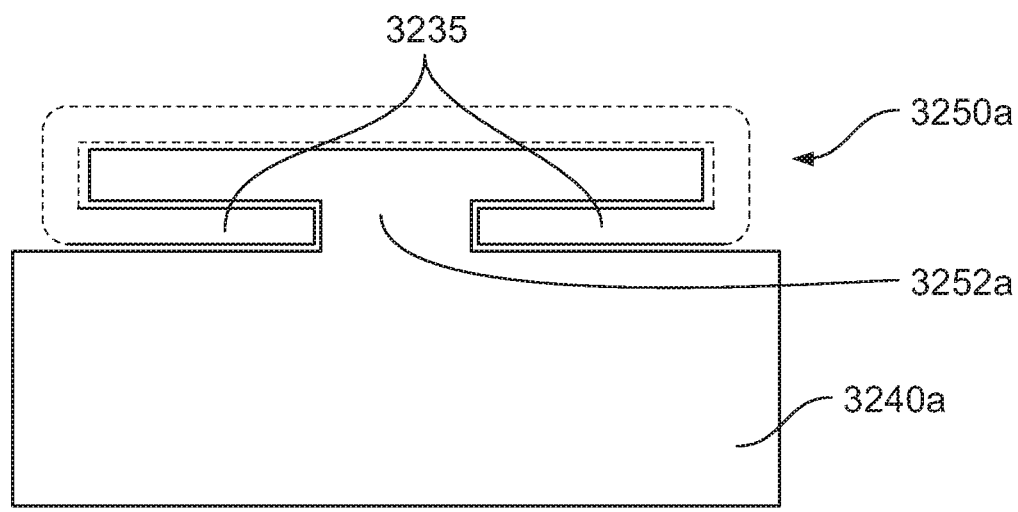
FIG. 32F is a profile view of the port holder of FIG. 32E engaged with the mounting plate of FIG. 32E.

FIG. 32F is a profile view of the port holder 3240a FIG. 32E engaged with the mounting plate 3210 of FIG. 32E.

Figure 33A:
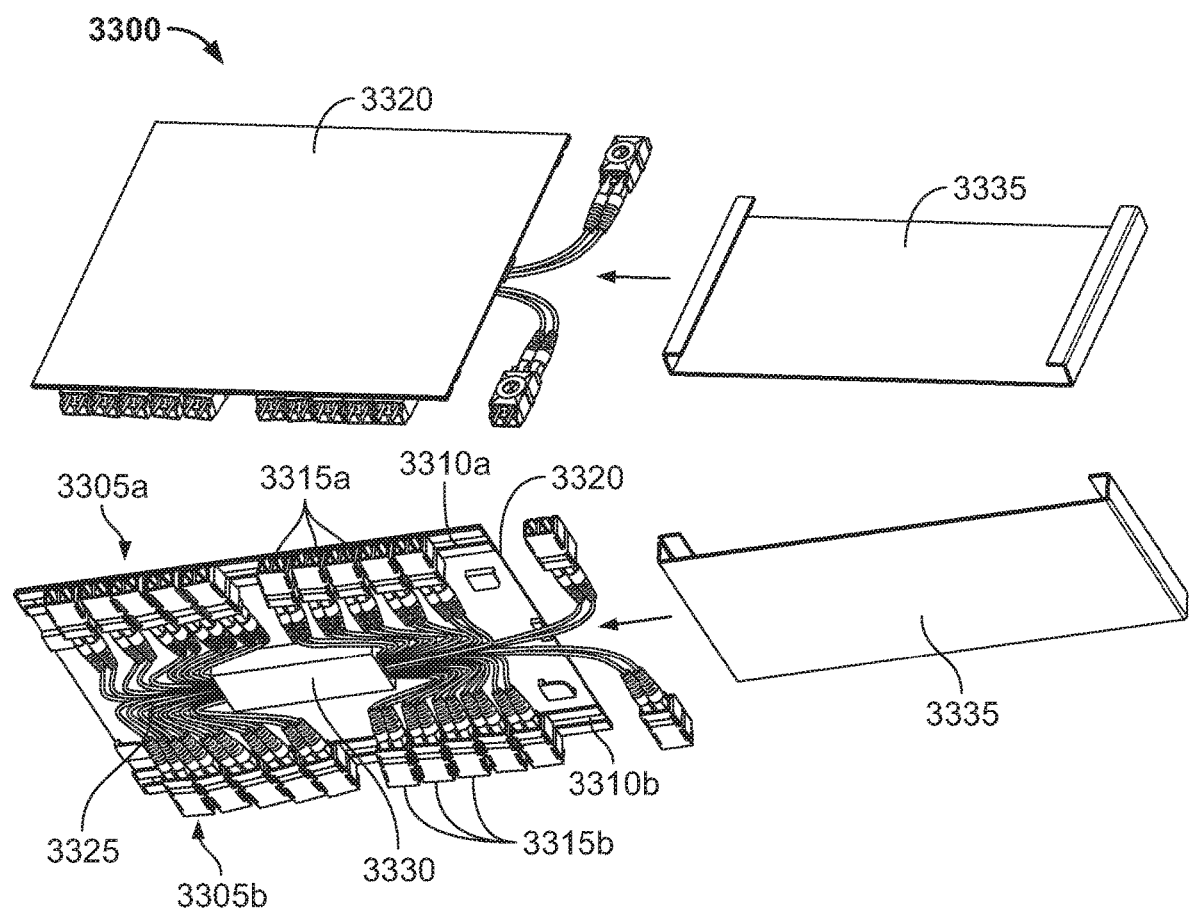
FIGS. 33A-34C are perspective views of patch panel assemblies including arrangements like that shown in FIG. 32C.

FIGS. 33A-34C are perspective views of patch panel assemblies including arrangements like that shown in FIG. 32C. FIG. 33A shows two views of a patch panel assembly 3300 including two patch panel subassemblies 3305a and 3305b. Subassembly 3305a includes a mounting plate 3310a and port assemblies 3315a. Subassembly 3305b includes a mounting plate 3310b and port assemblies 3315b. The panel assembly 3300 may be realized by attaching the patch panel subassemblies 3305a and 3305b to a first enclosure portion 3320, or by including mounting plates 3310a and 3310b as integral parts of the first enclosure portion 3320. In either case, the port assemblies 3315a may be coupled to port assemblies 3315b by intermediate cables 3325. Further, optical circuits, electronic circuits, or both may be included in a circuit section 3330 of the assembly 3300 to process signals passing through the intermediate cables 3325. In addition, a second enclosure portion 3335 may be attached to the first enclosure portion 3320 to help protect the intermediate cables 3325 and circuit section 3330.

Figure 33B:
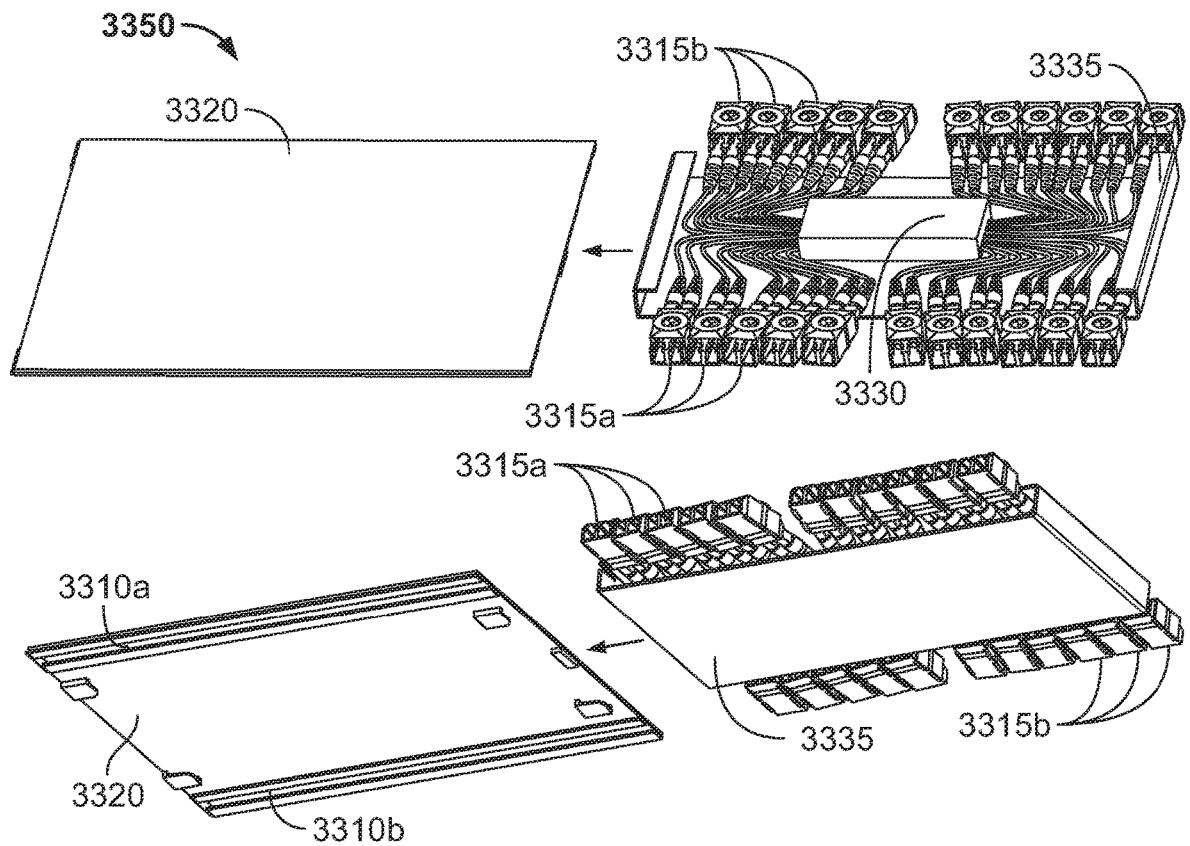

FIG. 33B shows two views of a patch panel assembly 3350. The assembly 3350 is similar to the assembly 3300 of FIG. 33A with the exception of how the two assemblies are put together. For assembly 3350 the port assemblies 3315a and 3315b and the circuit section 3330 are fixed on the second enclosure portion 3335, and then the first enclosure portion 3320 with mounting plates 3310a and 3310b are slid over the port assemblies 3315a and 3315b to engage port assemblies 3315a and 3315b.

Figure 33C:
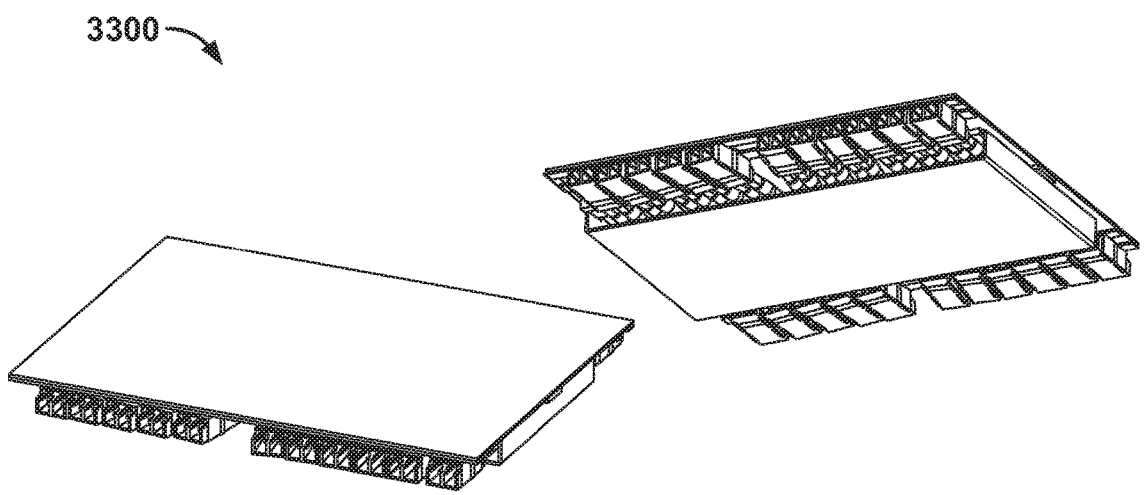

FIG. 33C shows two views of the patch panel assembly 3300 in completed form. It should be noted that patch panel assembly 3350 in completed form would appear the same as patch panel assembly 3300.

Figure 34A:
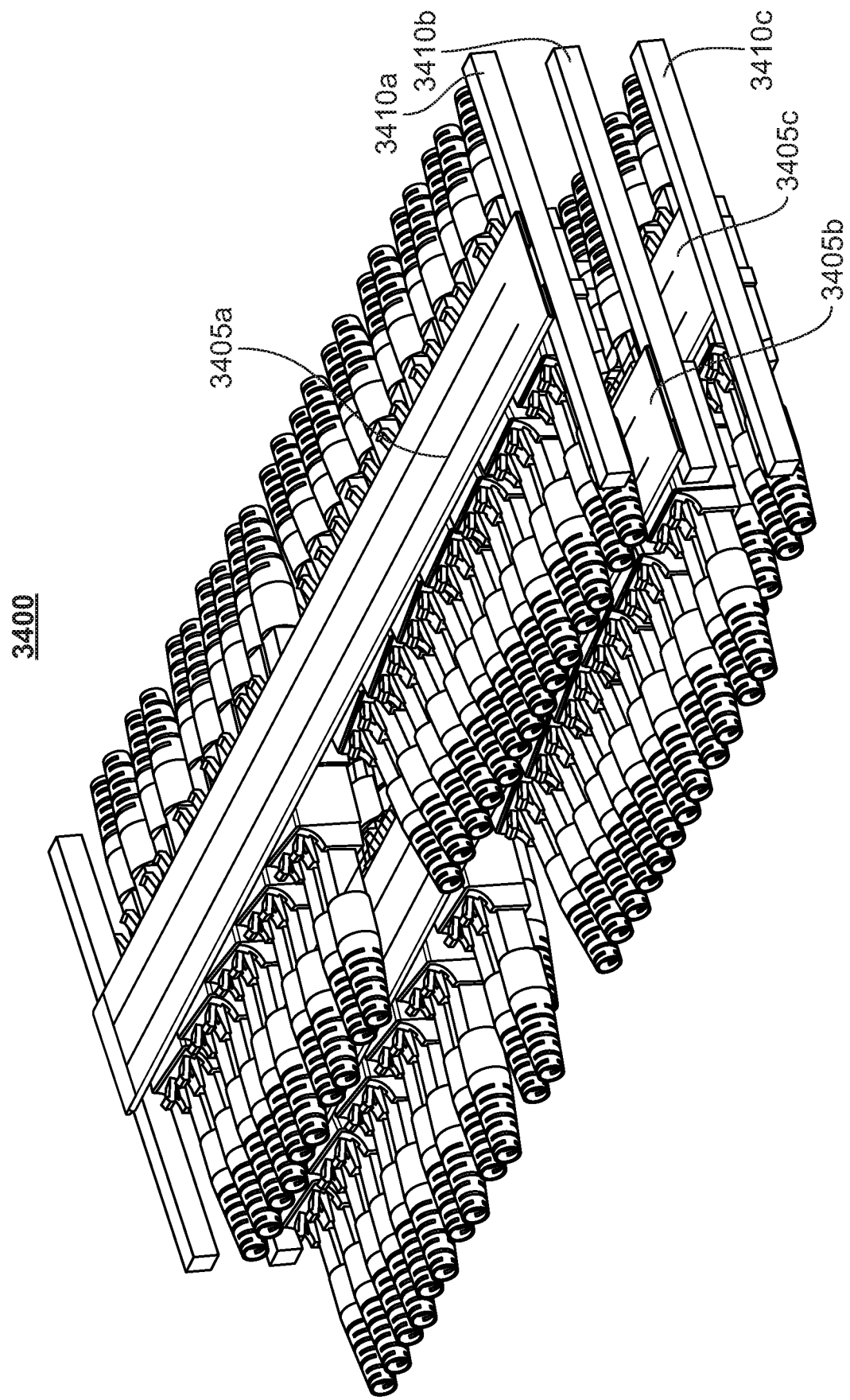

FIG. 34A shows a patch panel assembly 3400 in which patch panel arrangements 3405a, 3405b, and 3405c are mounted on respective patch panel frame portions 3510a, 3510b, and 3510c. Each of patch panel arrangements 3405a, 3405b, and 3405c is similar to the patch panel arrangement shown in FIG. 32C. The frame portions 3410a, 3410b, and 3410c may be portions of a single fame. In any event, the patch panel arrangements 3405a, 3405b, and 3405c are configured to slide on frame portions 3410a, 3410b, and 3410c, respectively. In FIG. 34A patch panel arrangement 3405b is depicted in a slid-forward position, while patch panel arrangements 3405a and 3405c are depicted in neutral positions.

Figure 34B:
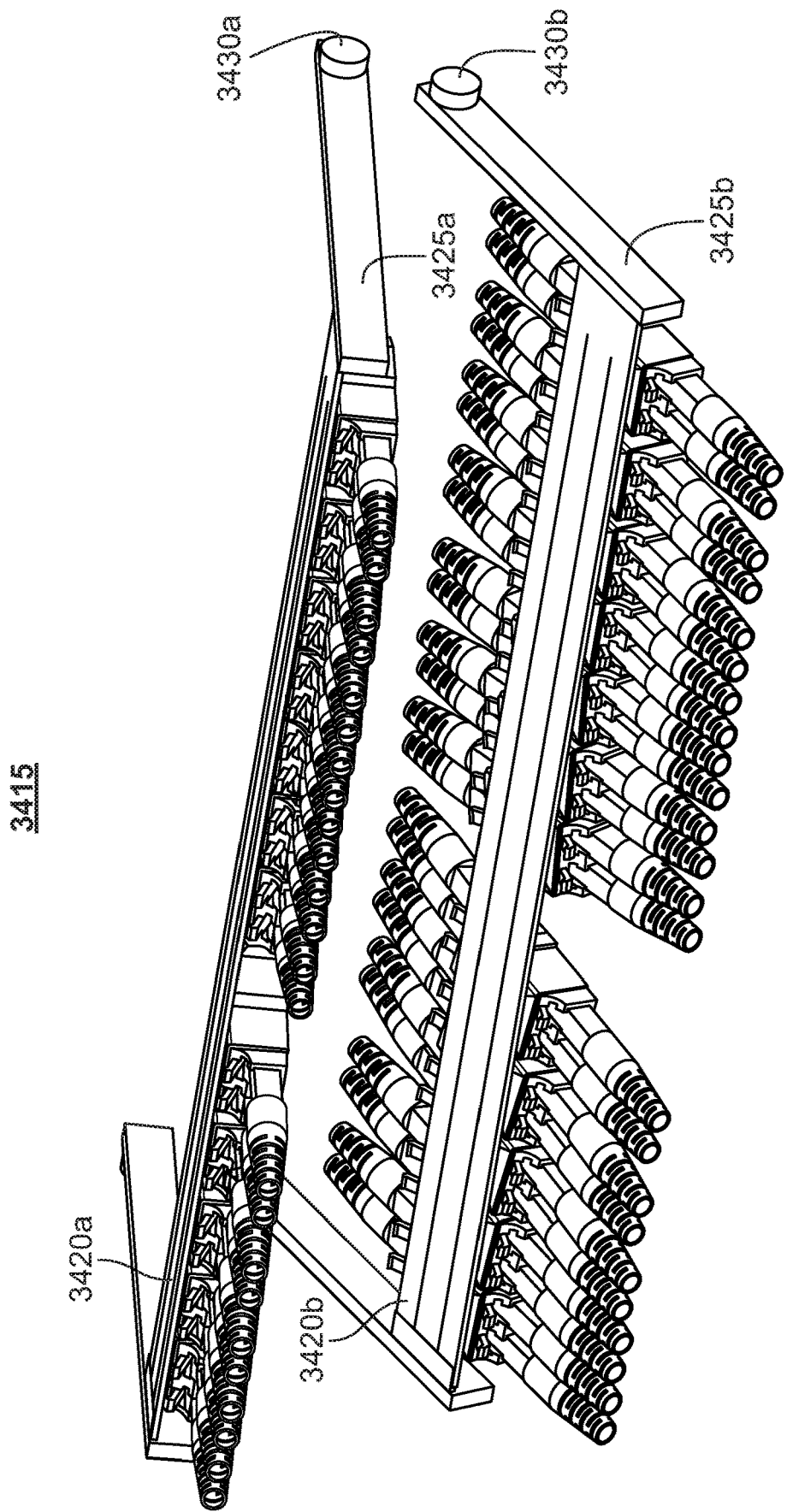

FIG. 34B shows a patch panel assembly 3415 in which patch panel arrangements 3420a and 3420b are mounted on respective patch panel frame portions 3425a and 3425b. The frame portions are configured to rotate about pivots 3430a and 3430b, respectively. The frame portions 3425a and 3425b may be portions of a single fame.

Figure 34C:
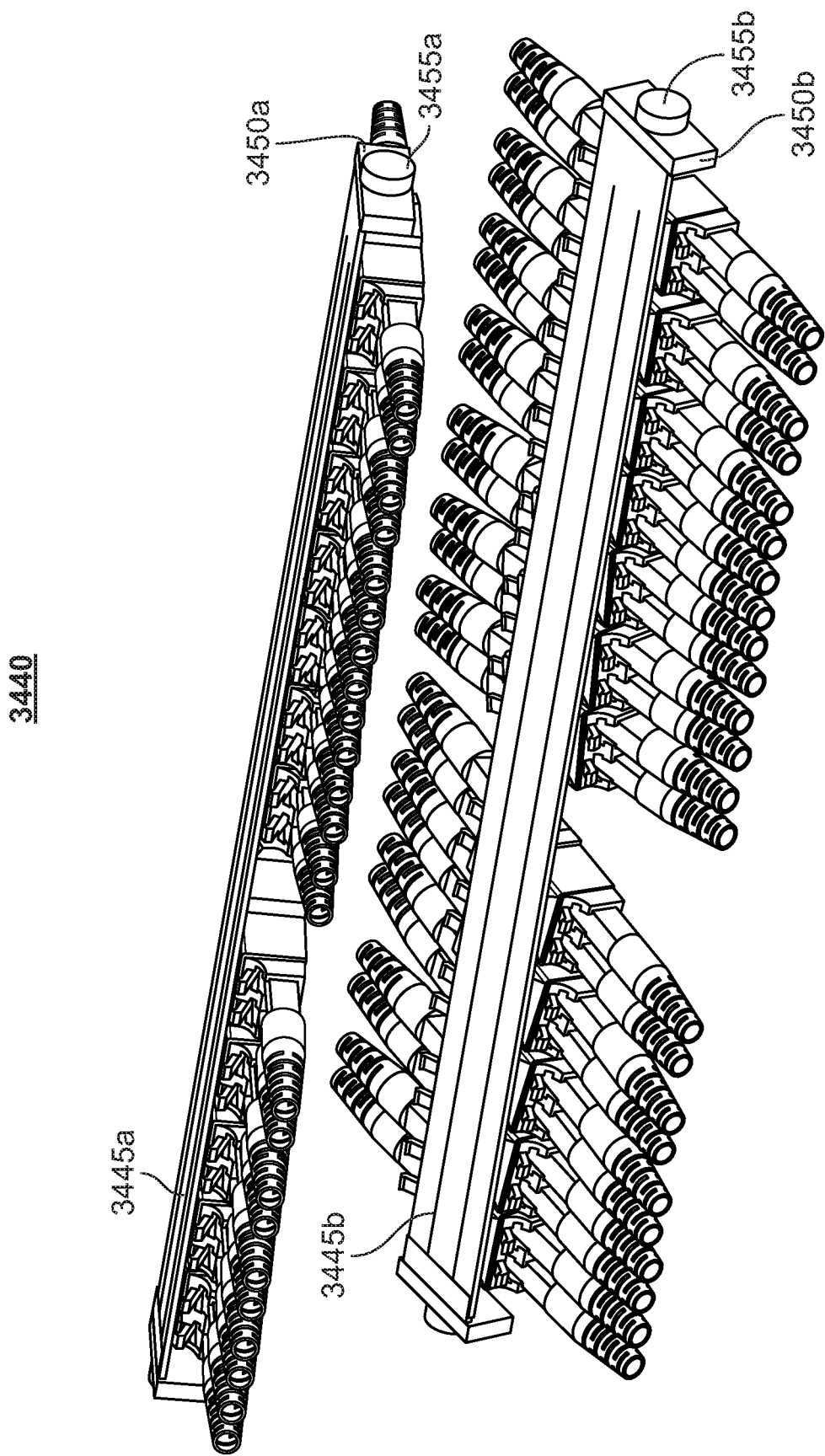

FIG. 34C shows a patch panel assembly 3440 in which patch panel arrangements 3445a and 3445b are mounted on respective patch panel frame portions 3450a and 3450b. The frame portions are configured to rotate about pivots 3455a and 3455b, respectively. The frame portions 3450a and 3450b may be portions of a single fame.

Regarding the configurations of FIGS. 34A to 34C, it should be noted that in view of this description it will be apparent that patch panel arrangements of this disclosure, other than arrangement of FIG. 32C, may be used in the configurations of FIGS. 34A to 34C.

Figure 35A:
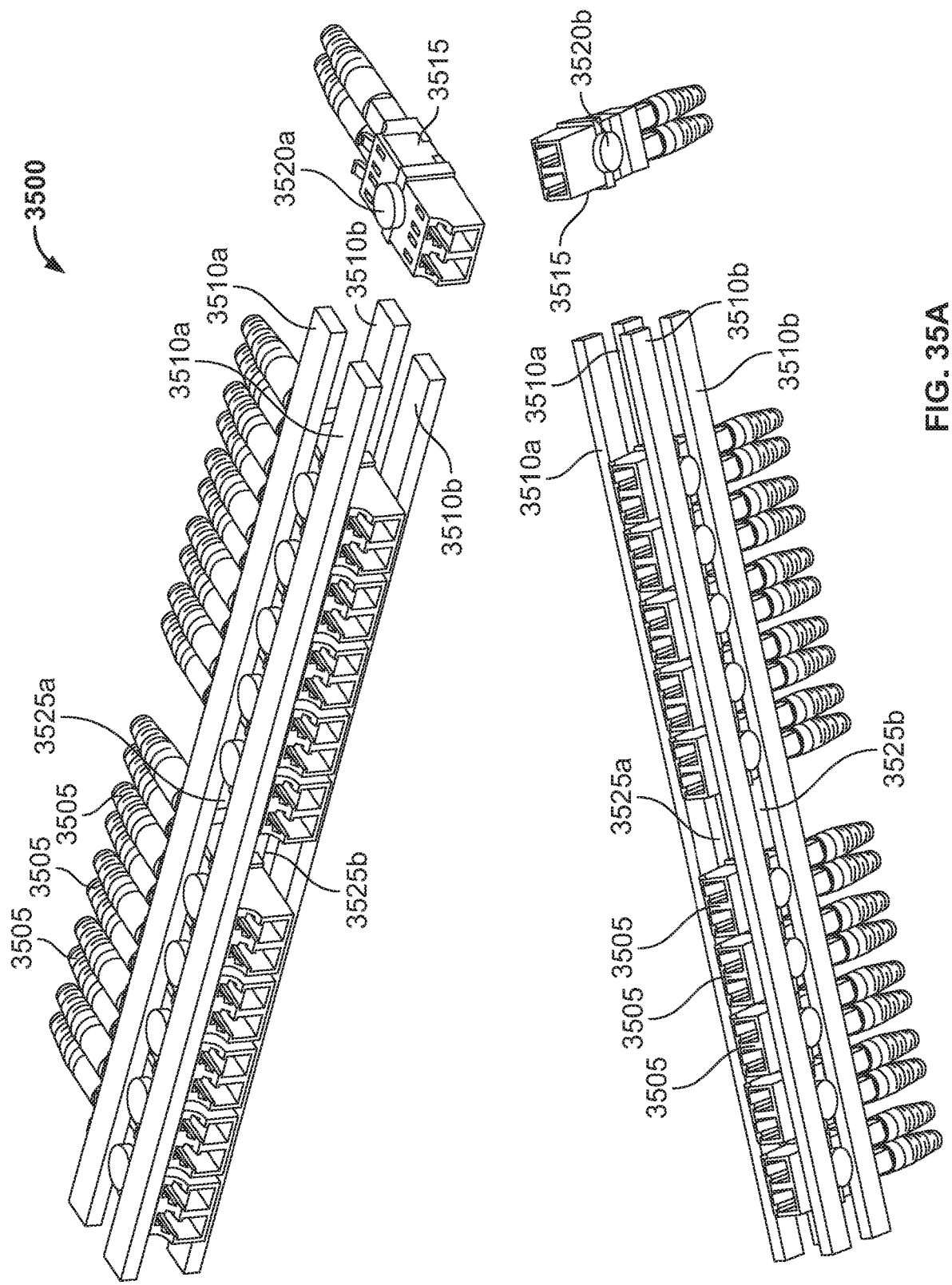
FIG. 35A shows perspective views of an arrangement of port assemblies and mounting plates according to an embodiment.

FIG. 35A shows perspective views of an arrangement 3500 of port assemblies 3505 and mounting plates 3510a and 3510b according to an embodiment. The port assemblies 3505 each include two engagement portions and are each engaged by both mounting plates 3510a and 3510b, and may be translated along a surface of the mounting plates 3510a and 3510b, e.g., surface 3512b, and rotated about an axis perpendicular to the surface, e.g., surface 3512b, when mounted. For example, port assembly 3515 includes engagement portion 3520a and engagement portion 3520b for respectively engaging mounting plates 3510a and 3510b. As seen in the figure, mounting plate 3510a may be formed to have a slot 3525a extending along its longitudinal axis for engaging with the port assemblies 3505, and mounting plate 3510b may be formed to have a slot 3525b extending along its longitudinal axis for engaging with port assemblies 3505.

Figure 35B:
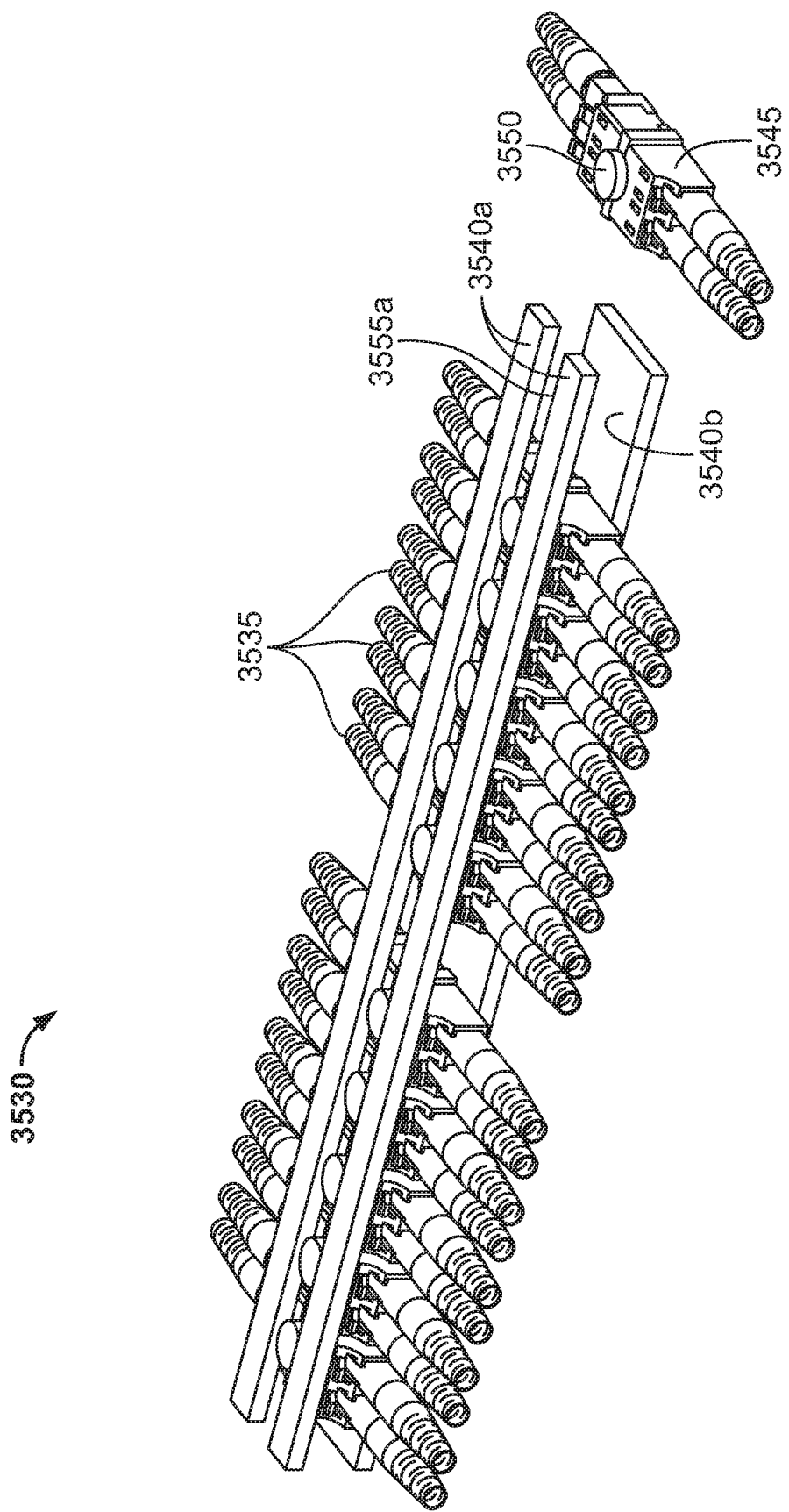
FIG. 35B is a perspective view of an arrangement of port assemblies and mounting plates according to an embodiment.

FIG. 35B is a perspective view of an arrangement 3530 of port assemblies 3535 and mounting plates 3540a and 3540b according to an embodiment. The port assemblies 3535 each include an engagement portion and are each engaged by both mounting plates 3540a and 3540b, and may be translated along a surface of the mounting plates 3510a and 3510b, e.g., surface 3512b, and rotated about an axis perpendicular to the surface, e.g., surface 3512b, when mounted. For example, port assembly 3545 engages mounting plate 3540a via an engagement portion 3550 and engages mounting plate 3540b by abutting mounting plate 3540b. As seen in the figure, mounting plate 3540a may be formed to have a slot 3555a extending along its longitudinal axis for engaging with the port assemblies 3535.

Figure 35C:
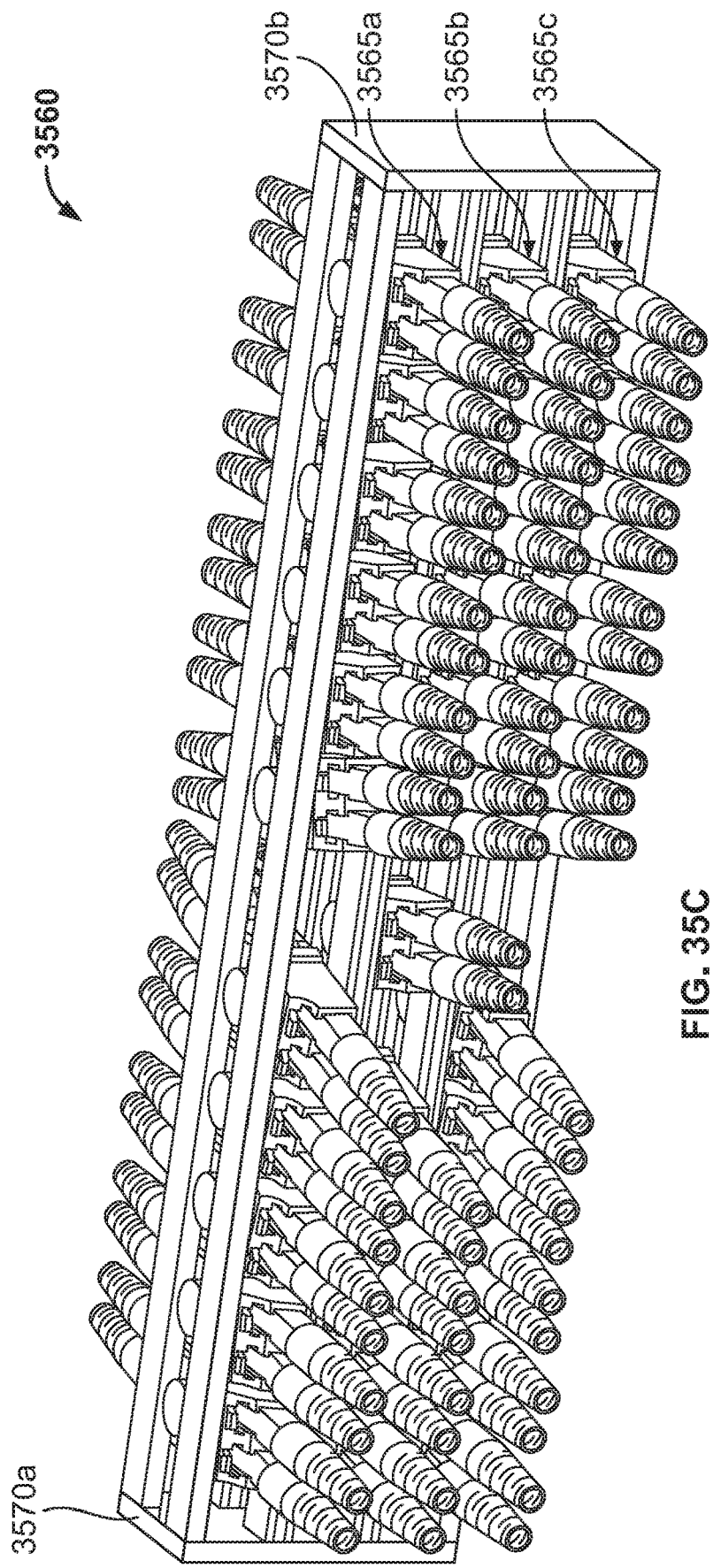
FIG. 35C is a perspective view of a patch panel assembly including arrangements like that shown in FIG. 35A.

FIG. 35C is a perspective view of a patch panel assembly 3560 including three arrangements 3565a, 3565b, and 3565c like that shown in FIG. 35A. The arrangements are stacked one above the other. The assembly 3560 includes frame pieces 3570a and 3570b which hold the arrangements 3565a, 3565b, and 3565c in place and serve to complete each of the mounting plates of the arrangements 3565a, 3565b, and 3565c.

Figure 35D:
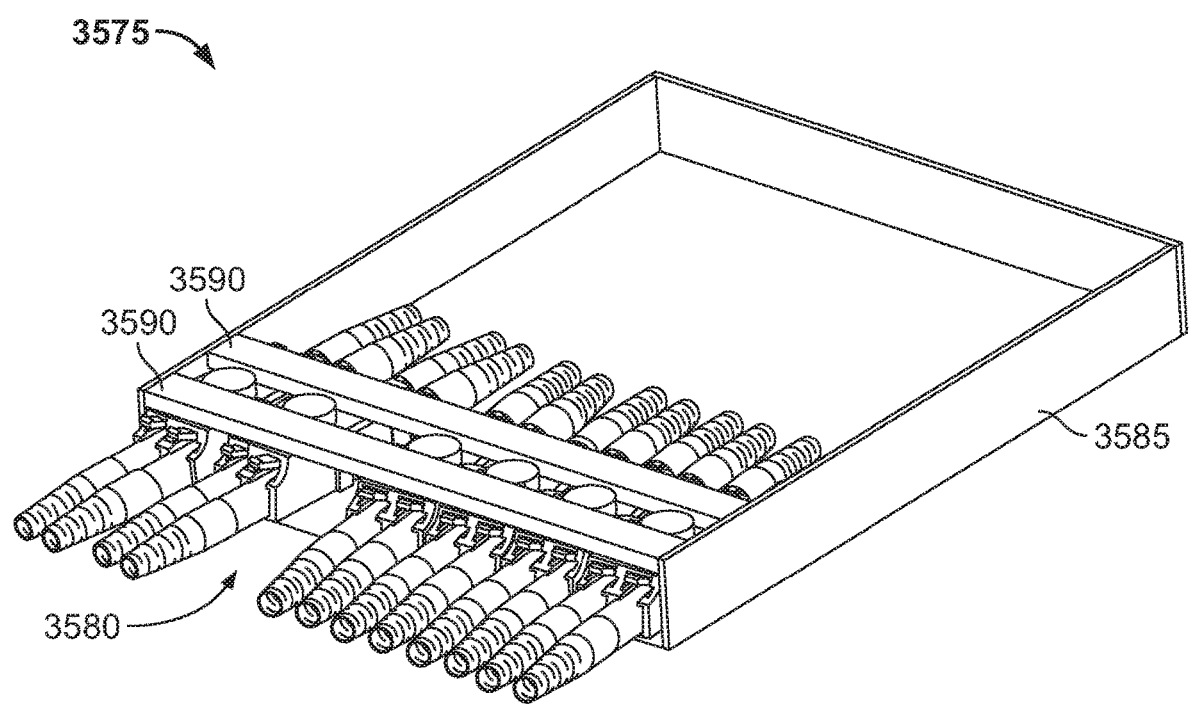
FIG. 35D is a perspective view of a patch panel assembly including an arrangement like that shown in FIG. 35B.

FIG. 35D is a perspective view of a patch panel assembly 3575 including an arrangement 3580 like that shown in FIG. 35B. The assembly 3575 includes a frame 3585 which holds the arrangement 3580 and serves to complete the mounting plate 3590.

Figure 36:
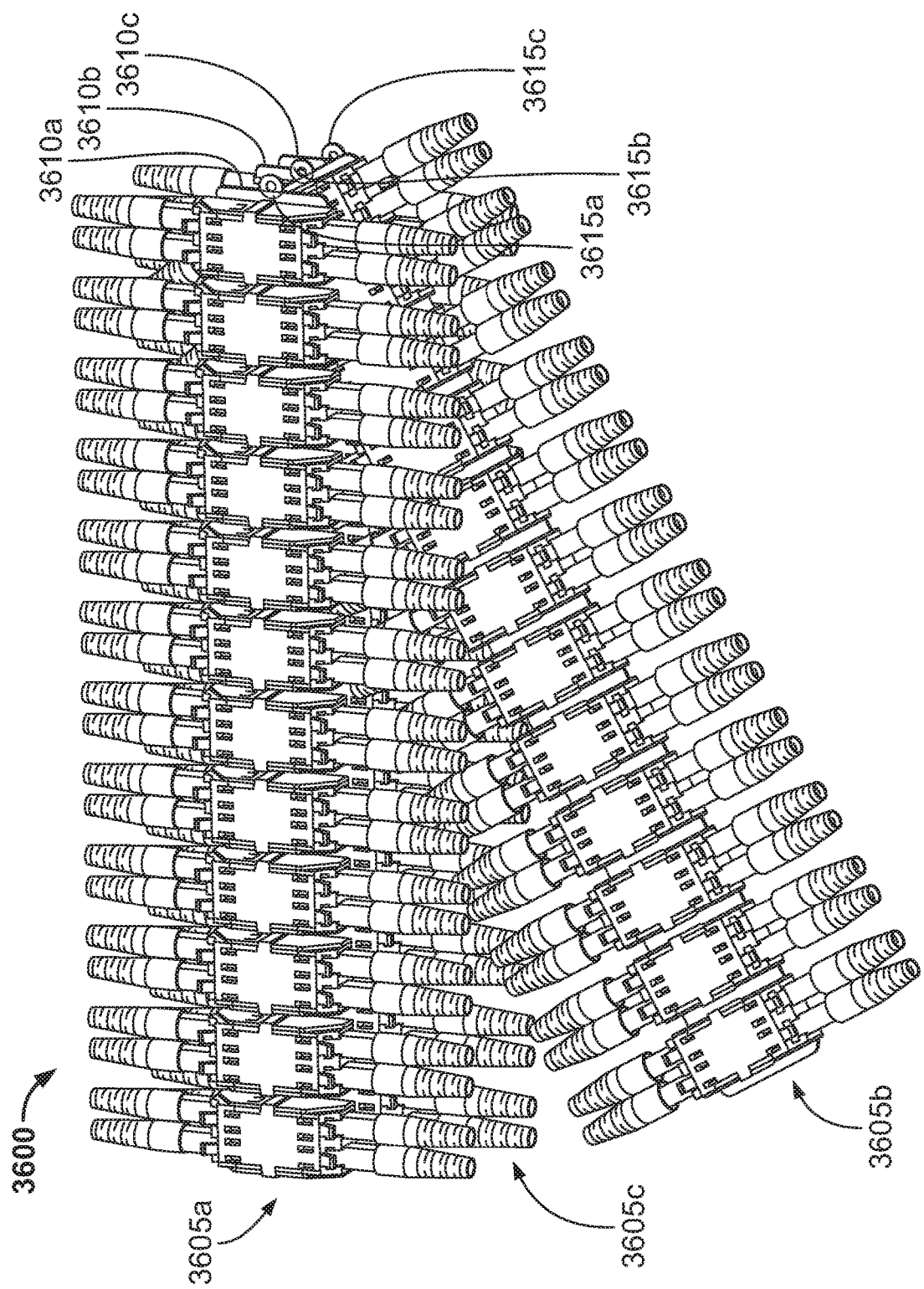
FIG. 36 is a perspective view of a portion of a rack mount patch panel unit according to an embodiment.

FIG. 36 is a perspective view of a portion of a rack mount patch panel unit 3600 according to an embodiment. The configuration of FIG. 36 includes three patch panel subassemblies 3605a, 3605b, and 3605c. The subassemblies 3605a, 3605b, and 3605c include respective mounting plates 3610a 3610b, and 3610c, and the mounting plates include respective pivot holes 3615a, 3615b, and 3615c. The subassemblies 3605a, 3605b, and 3605c are mounted in a frame (not shown) such that an axial member (not shown) passes through pivot holes 3615a, 3615b, and 3615c. In this manner, the subassemblies 3605a, 3605b, and 3605c may be individually rotated about the axial member. In the figure subassembly 3605b has been rotated counter clockwise by about 30 degrees relative to subassemblies 3605a and 3605c.

FIG. 37A is a perspective view of a patch panel 3700 and enclosure 3705 according to an embodiment, in a fully closed state.

FIG. 37B is a perspective view of a patch panel 3700 and enclosure 3705 according to an embodiment, in a fully opened state. As can be seen from the figure, the patch panel 3700 includes a multiple of port assemblies 3710 that may be arranged in a manner similar to that shown in FIG. 21, although upon review of this description it will be apparent that patch panel arrangements of this disclosure, other than arrangement of FIG. 21, may be used in the configurations of FIG. 37B. In any event, in the configuration of FIG. 37B the patch panel 3700 is formed as a multiple of patch panel subassemblies 3730 stacked one above the other in a first direction, the Z direction.

As can be further seen from the figure, the enclosure 3705 includes a first hinged portion 3715a and a second hinged portion 3715b. The hinged portion 3715a includes a multiple of cable hangers 3720a and is openable to expose a first side 3725a of the port assemblies 3710. The hinged portion 3715b includes a multiple of cable hangers (not shown) and is openable to expose a second side 3725b of the port assemblies 3710. A first hinge 3735a for the first hinged portion 3715a has an axis of rotation that is parallel, or substantially parallel, to the first direction, and a second hinge 3735*b* for the second hinged portion 3715*b* has an axis of rotation that is parallel, or substantially parallel, to the first direction. The first hinge 3715*a* and second hinge 3715*b* are positioned at a same side of the patch panel 3700, with respect to the X direction.

It should be noted that in some embodiments the enclosure 3705 may include a single hinged portion, or more than two hinged portions, instead of two hinge portions. It should also be noted that cable hangers may not be included on any hinged portions or may be included on less than all hinged portions. Still further, it should be noted that any hinged portion may be openable to expose only a portion of a side of the port assemblies rather than expose the entire side of the port assemblies.

FIG. 37C is a perspective view of the patch panel 3700 and enclosure 3705 according to an embodiment, in a fully opened state. The FIG. 37C embodiment includes a first hinged portion 3740*a* and a second hinged portion 3740*b*. A first hinge 3745*a* for the first hinged portion 3740*a* has an axis of rotation that is parallel, or substantially parallel, to the first direction, and a second hinge 3745*b* for the second hinged portion 3715*b* has an axis of rotation that is parallel, or substantially parallel, to the first direction. The first hinge 3745*a* and second hinge 3745*b* are positioned at opposite sides of the patch panel 3700, with respect to the X direction.

Figure 38:
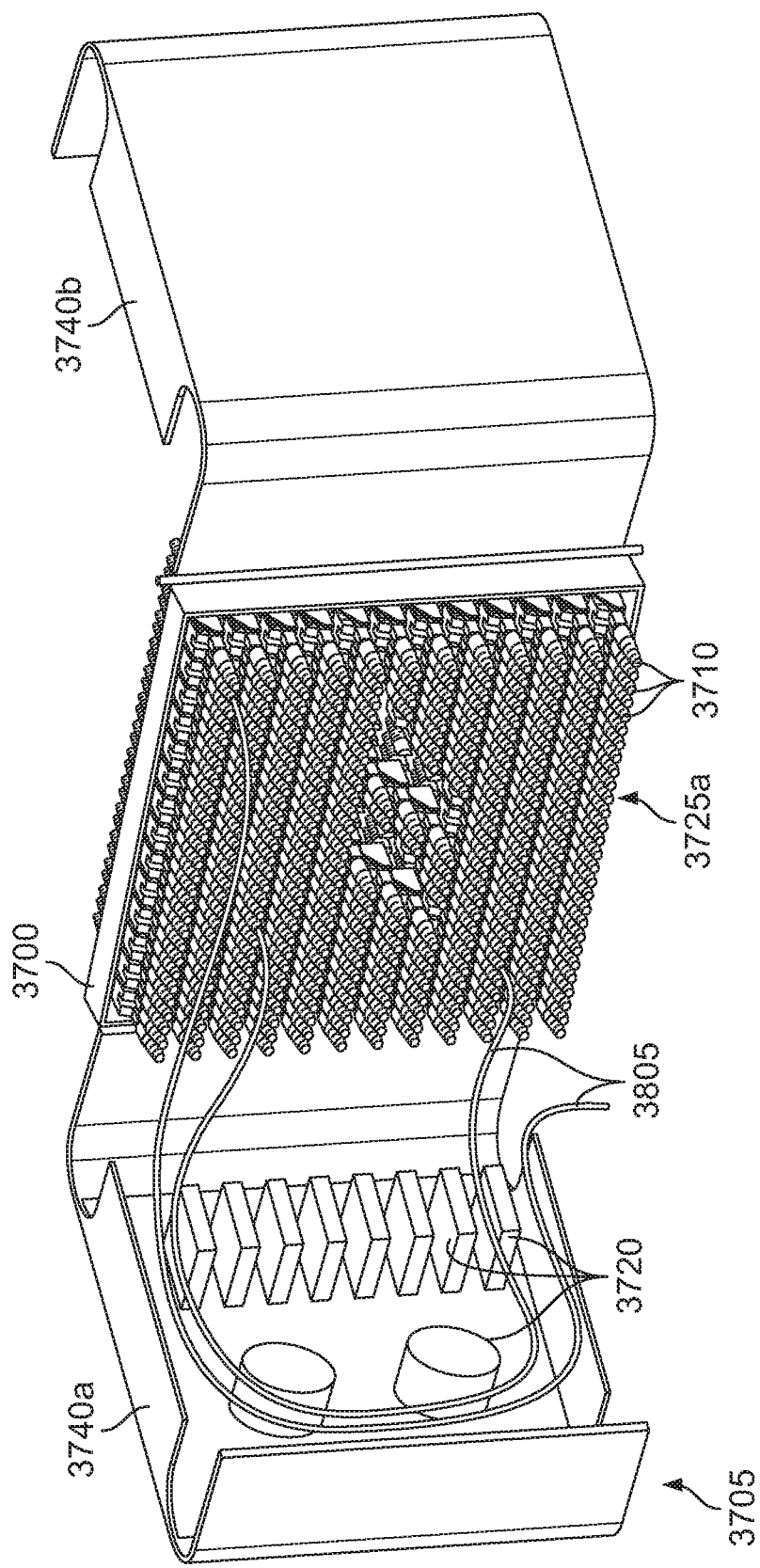
FIG. 38 is a perspective view of the patch panel and enclosure of FIG. 37C in a fully opened state and depicting examples of cable routing.

FIG. 38 is a perspective view of the patch panel 3700 and enclosure 3705 of FIG. 37C in a fully opened state and depicting examples of cable routing. As can be seen, cables 3805 coupled to the first side 3725*a* of port assemblies 3710 may be routed by cable hangers 3720 on hinged portion 3740*a*.

Figure 39:
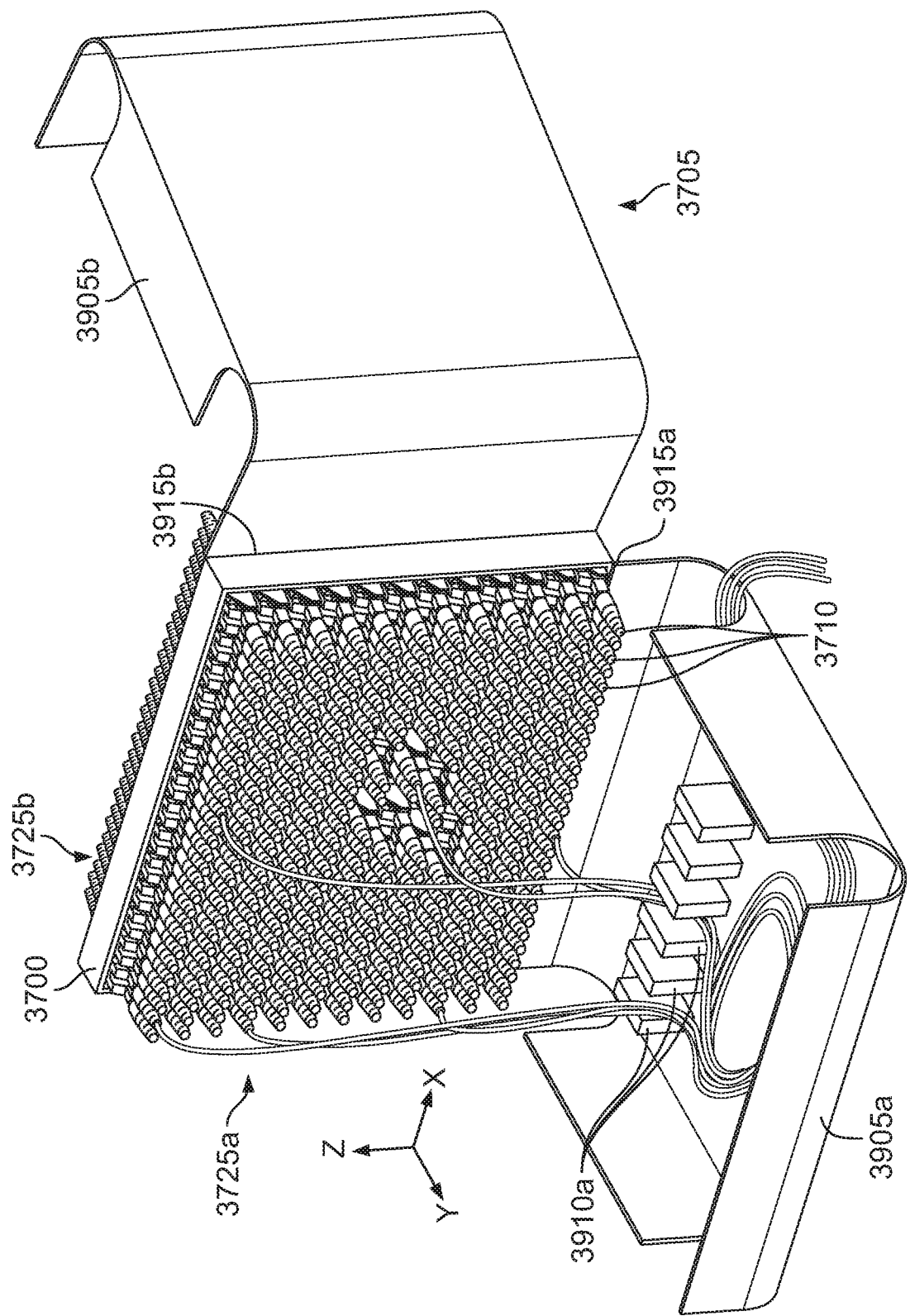
FIG. 39 is a perspective view of a patch panel and enclosure according to an embodiment, in a fully opened state and depicting examples of cable routing.

FIG. 39 is a perspective view of the patch panel 3700 and enclosure 3705 according to an embodiment, in a fully opened state and depicting examples of cable routing. In the FIG. 39 embodiment, the enclosure 3705 includes a first hinged portion 3905*a* and a second hinged portion 3905*b*. The hinged portion 3905*a* includes a multiple of cable hangers 3910*a* and is openable to expose the first side 3725*a* of the port assemblies 3710. The hinged portion 3905*b* includes a multiple of cable hangers (not shown) and is openable to expose the second side 3725*b* of the port assemblies 3710. A first hinge 3915*a* for the first hinged portion 3905*a* has an axis of rotation that is perpendicular, or substantially perpendicular, to the first direction (the Z direction), and in the FIG. 39 embodiment, is parallel with the Y direction. A second hinge 3915*b* for the second hinged portion 3905*b* has an axis of rotation that is parallel, or substantially parallel, to the first direction. As can be seen, cables 3750 coupled to the first side 3725*a* of port assemblies 3710 may be routed by the cable hangers 3910 on hinged portion 3905*a*.

Figure 40A:
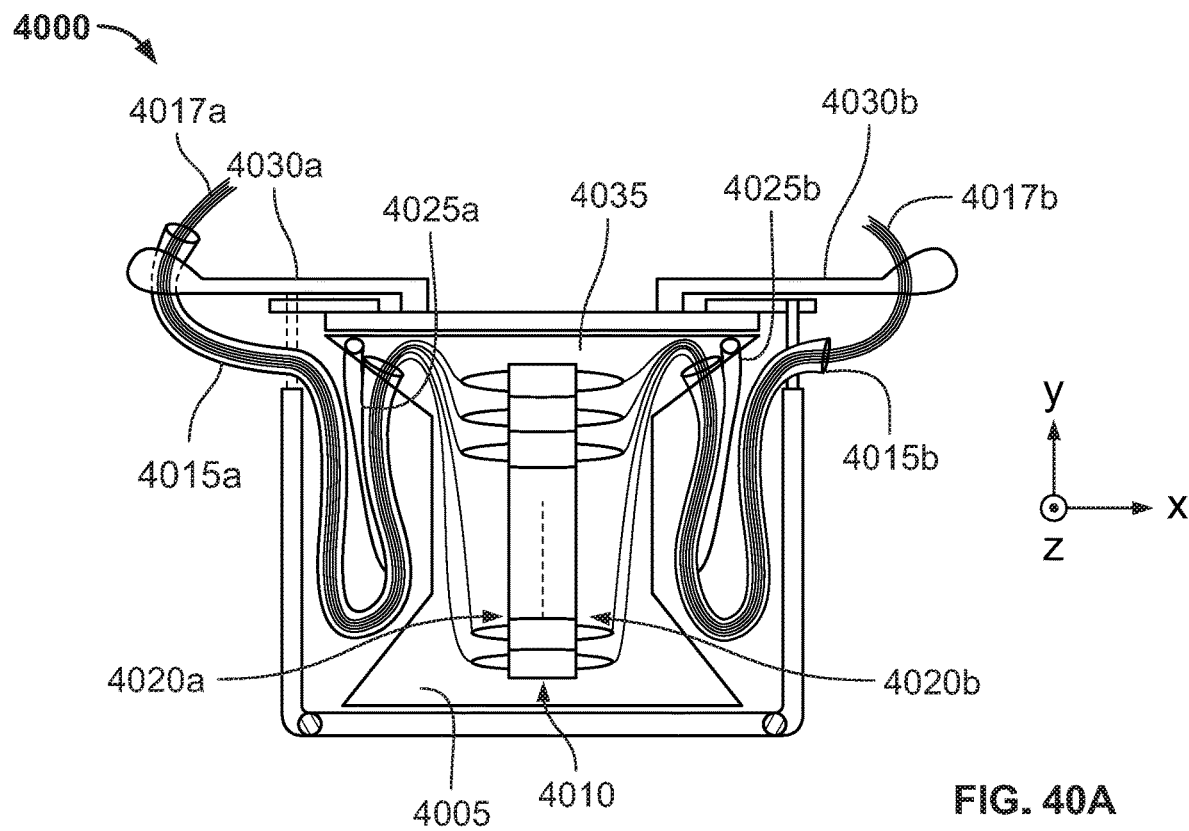
FIG. 40A is a plan view of a patch panel configuration having a bi-directionally sliding tray with the tray in a neutral position.

FIG. 40A is a plan view of a patch panel configuration 4000 having a bi-directionally sliding tray 4005 with the tray 4005 in a neutral position. The tray 4005 is operable to slide parallel to the X direction, and on the tray, one or more patch panel subassemblies 4010 are mounted. One of the types of patch panel subassemblies that could be mounted on the tray 4005 is a patch panel subassembly of the type shown in FIG. 32C, although configuration 4000 is not limited to a subassembly of the type shown in FIG. 32C.

The patch panel configuration 400 further includes a first cable jacket 4015*a* for enclosing one or more cables 4017*a* extending from a first side 4020*a* of the patch panel subassemblies 4010, a first support 4025*a* for supporting the first cable jacket 4015*a* in a direction perpendicular to a sliding direction of the sliding tray 4005 (the Z direction in the FIG. 40A) and allowing the first cable jacket 4015*a* to move in a plane parallel, or substantially parallel, to a plane in which the sliding tray slides (the XY plane in FIG. 40A), a first cable hanger 4030*a* for positioning one end of the first cable jacket 4015*a*, a second cable jacket 4105*b* for enclosing one or more cables 4017*b* extending from a second side 4020*b* of the patch panel assemblies 4010, a second support 4025*b* for supporting the second cable jacket 4015*b* in a direction perpendicular to a sliding direction of the sliding tray (the Z direction in the FIG. 40A) and allowing the second cable jacket 4015*b* to move in a plane parallel, or substantially parallel, to a plane in which the sliding tray slides (the XY plane in FIG. 40A), and a second cable hanger 4030*b* for positioning one end of the second cable jacket 4015*b*.

Figure 40B:
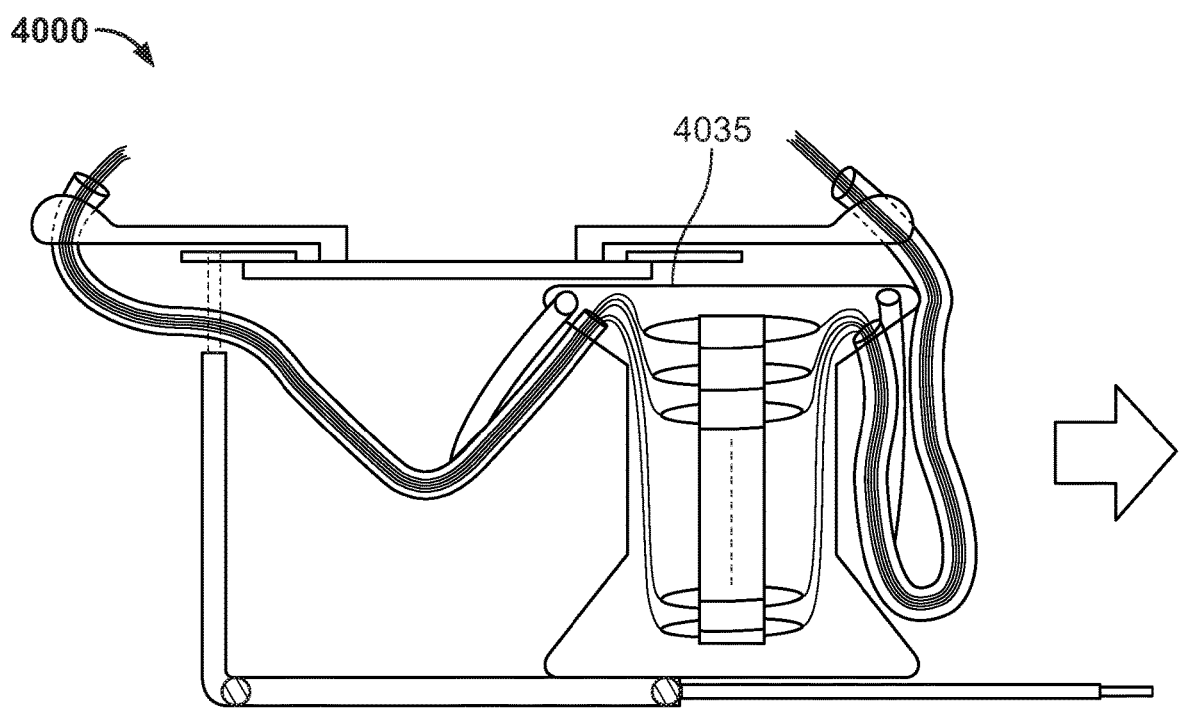
FIG. 40B is a plan view of the patch panel configuration of FIG. 40A with the tray in a tray-out position.

FIG. 40B is a plan view of the patch panel configuration 4000 of FIG. 40A with the tray 4035 in a tray-out position.

FIG. 41A shows an arrangement of port assemblies and mounting plates in two different positions 4100*a* and 4100*b* in accordance with an embodiment. The arrangement includes a first multiple of port assemblies 4105*a* attached to a first mounting plate 4110*a*, a second multiple of port assemblies 4105*b* attached to a second mounting plate 4110*b*. The first mounting plate 4110*a* may be moved with the direction of movement guided by a first guide pin 4115*a* on a tray, frame, or enclosure (not shown). The first guide pin 4115*a* is engaged with a first slot 4117*a* in the mounting plate 4110*a* so that the mounting plate 4110*a* can move only in a direction parallel to the longitudinal axis of the first slot 4117*a*. The second mounting plate 4110*b* may be moved according to a second guide pin 4115*b* and a second slot 4117*b*. In position 4100*b*, as compared to position 4100*a*, mounting plate 4110*b* and port assemblies 4105*b* have been moved closer, along the Y direction, to mounting plate 4110*a* and port assemblies 4105*a*.

FIG. 41B shows an arrangement of port assemblies in two different positions 4130*a* and 4130*b* in accordance with an embodiment. The arrangement includes a multiple of port assemblies 4135 attached to a segmented mounting plate 4140. The segmented mounting plate 4140 is fixed to a frame or enclosure at pivot points 4145 and is configured to move about the pivot points 4145 to translate the port assemblies 4135 along in the Y direction while allowing the X and Z coordinates of the port assemblies 4135 to remain fixed. In the FIG. 41B configuration, adjacent ones of the port assemblies 4135 move in opposite directions in response to movement of the mounting plate 4140. For example, the relative positions of port assemblies 4150 and 4155 has reversed in position 4130*b* relative to position 4130*a*.

Figure 42:
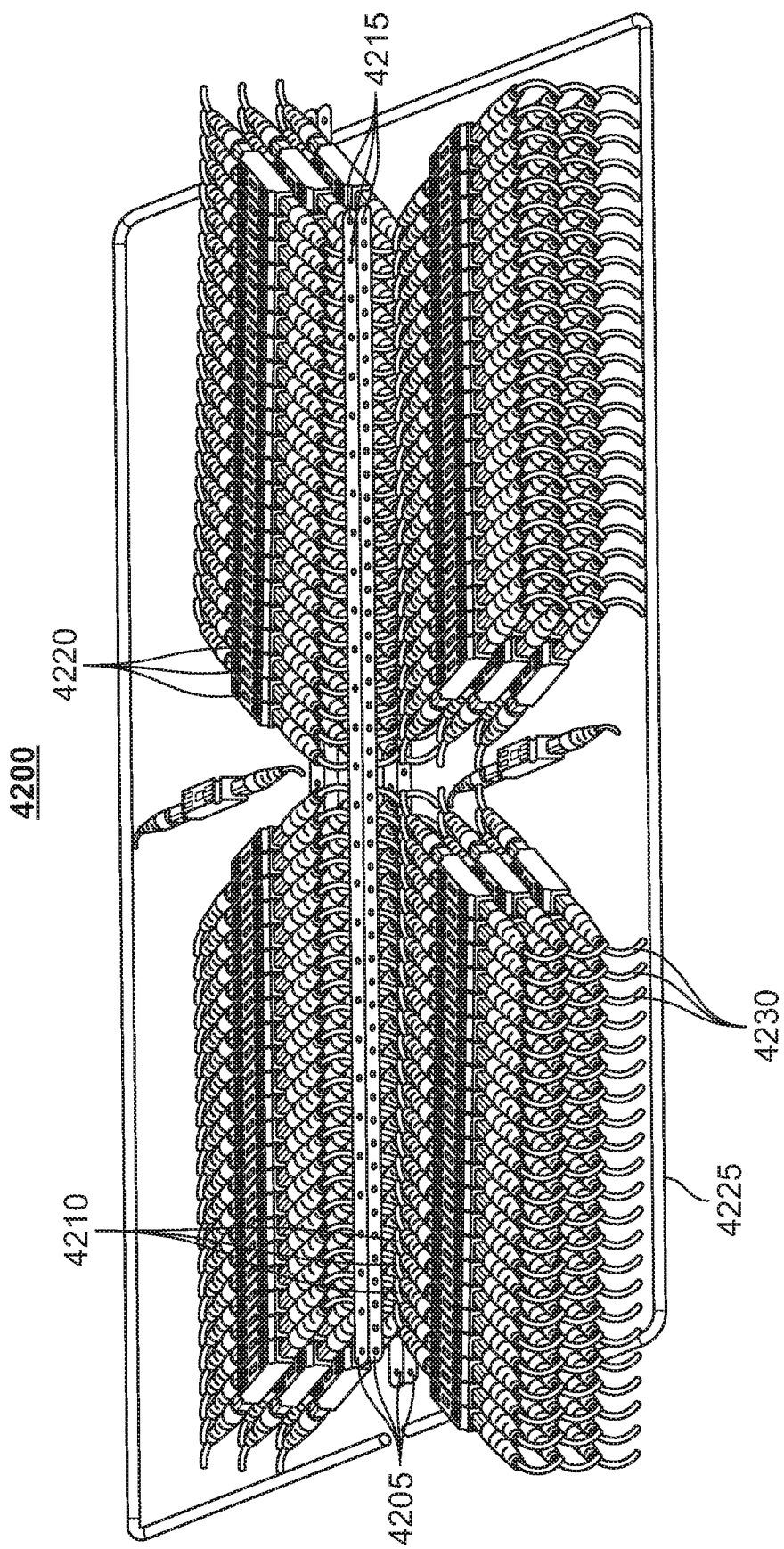
FIG. 42 is a perspective view of a patch panel assembly according to an embodiment.

FIG. 42 is a perspective view of a patch panel assembly 4200 according to an embodiment. The patch panel assembly includes a multiple of cable support plates 4205 and a multiple of intermediate cables 4210. The cable support plates 4205 have openings 4215 through which the intermediate cables 4210 are passed such that the intermediate cables 4210 are supported by the cable support plates 4205. The patch panel assembly 4200 also includes a multiple of ports 4220, with respective pairs of the ports 4220 being communicatively coupled to each other by respective ones of the intermediate cables 4210. Further, the patch panel assembly 4200 includes a cable support 4225 for supporting cables 4230 coupled to the patch panel assembly.

Figure 43:
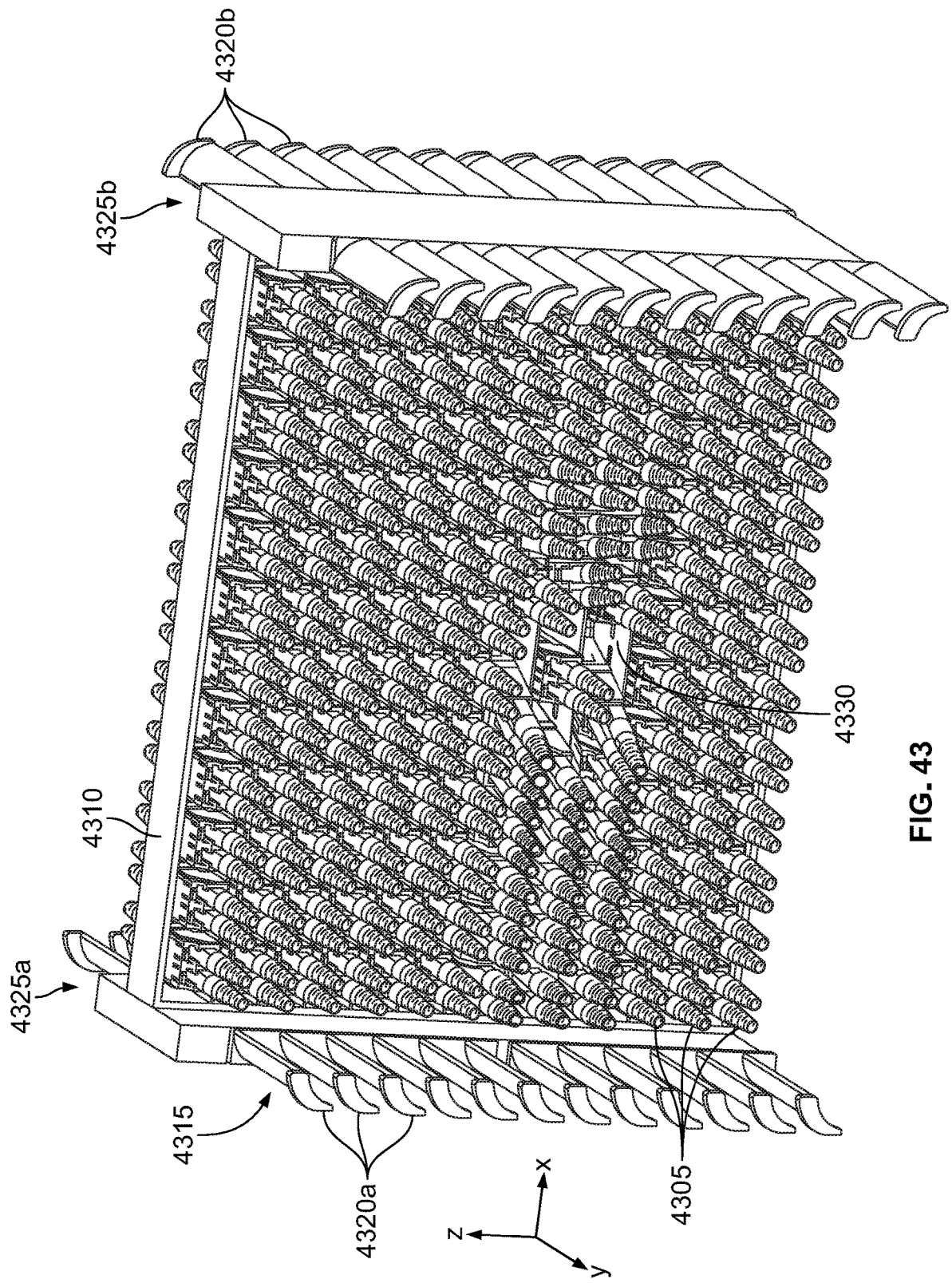
FIG. 43 is a perspective view of a patch panel assembly according to an embodiment.

FIG. 43 is a perspective view of a patch panel assembly 4300 according to an embodiment. The patch panel assembly 4300 includes a multiple of patch panel subassemblies 4305, a frame 4310, and a multiple of cable hangers 4315. The patch panel subassemblies 4305 are shown as being of the same type as the patch panel subassemblies 2105*a*,

2105*b*, and 2105*c* of the FIG. 21 configuration; however, it should be noted that upon review of this description it will be apparent that patch panel subassemblies of this disclosure, other than patch panel subassemblies of the type disclosed in FIG. 21, may be used in the FIG. 43 embodiment. The frame 4310 provides support for the patch panel subassemblies 4305 and attachment points for the cable hangers 4315. The cable hangers 4315 are provided at two ends of assembly 4300, a first multiple of cable hangers 4320*a* being provided at a first end 4325*a* of frame 4310, and a second multiple of cable hangers 4320*b* being provided at a second end 4325*b* of frame 4310, with the first end 4325*a* being opposite the second end 432*b* with respect to the X direction. As shown in the figure, each of cable hangers 4315 may extend in a direction perpendicular to the longitudinal axes of the subassembly mounting plates. For example, in the depicted embodiment, the cable hangers 4315 extend in a direction parallel to the Y direction, whereas mounting plate 4330 has a longitudinal axis extending parallel to the X direction. In addition, it should be noted that the cable hangers may be an integral part of the frame 4310 rather than attached to the frame 4310.

Figure 44:
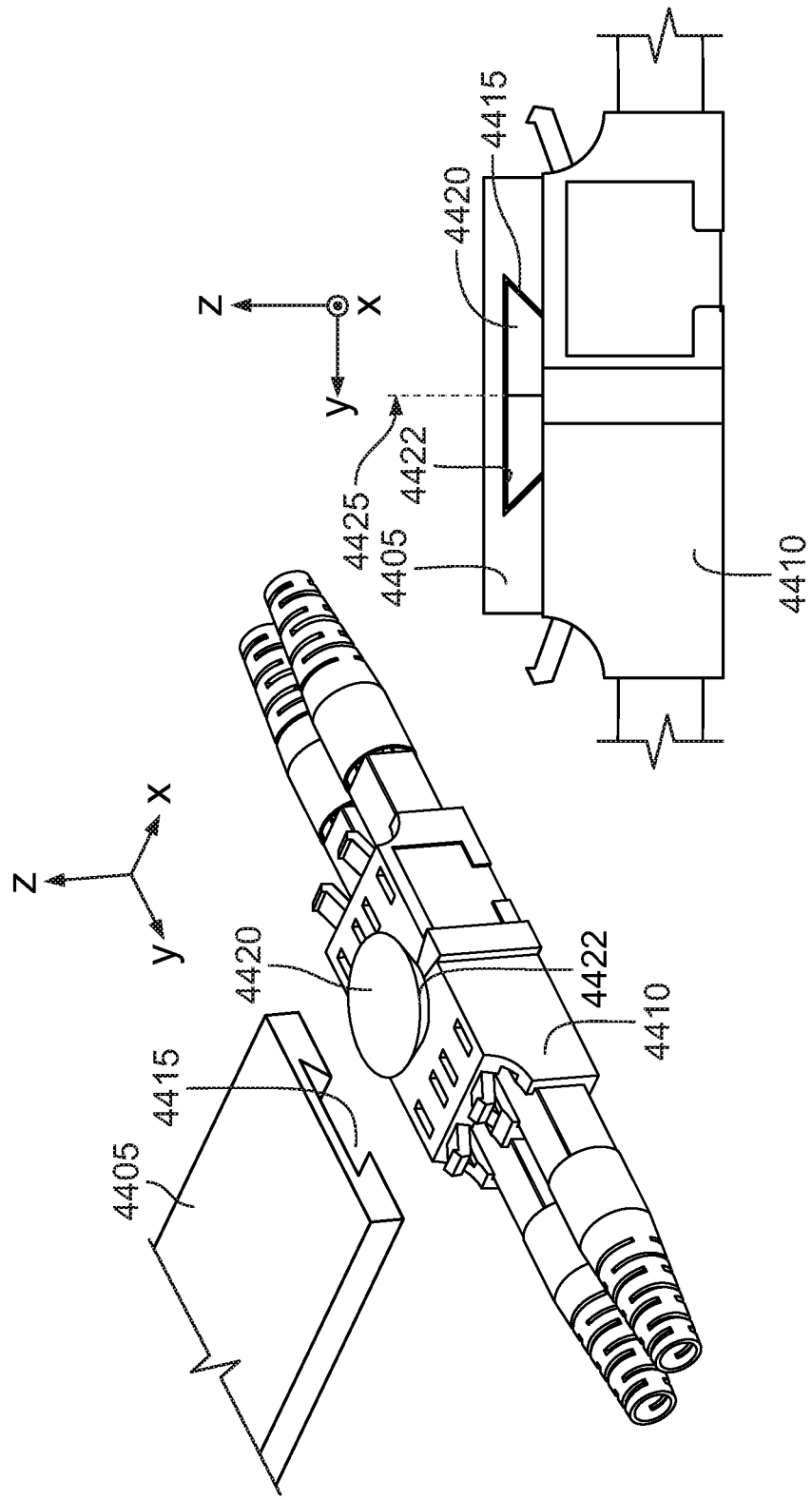
FIG. 44A is a detail view of a portion of a patch panel subassembly of an embodiment, showing part of a mounting plate and a port assembly.
FIG. 44B is a profile view of the port holder of FIG. 43A engaged with the mounting plate of FIG. 43A.

FIG. 44A is a detail view of a portion of a patch panel subassembly of an embodiment, showing part of a mounting plate 4405 and a port assembly 4410. The mounting plate 4405 includes a cutout 4415 having a dovetail cross-section. The port assembly includes an engagement member 4420 having a dovetail shaped cross-section corresponding to the cross-section of cutout 4415.

The port assembly 4410 is engaged with the mounting plate 4405 by inserting engagement member 4420 into cutout 4415. When engaged in this fashion, the port assembly free to translate along the longitudinal axis of the mounting plate 4405 (parallel to the X direction in the figure) and free to rotate about an axis perpendicular to the longitudinal axis of the mounting plate 4405 (parallel to the Z direction in the figure).

FIG. 44B is a profile view of the port assembly 4410 of FIG. 44A engaged with the mounting plate 4405 of FIG. 43A. As can be seen from FIG. 44B, in the configuration of FIGS. 44A and 44B, when the port assembly 4420 is engaged with the mounting plate 4405 the port assembly is free to rotate about an axis 4435 passing through the center of the engagement member 4420.

Figure 45:
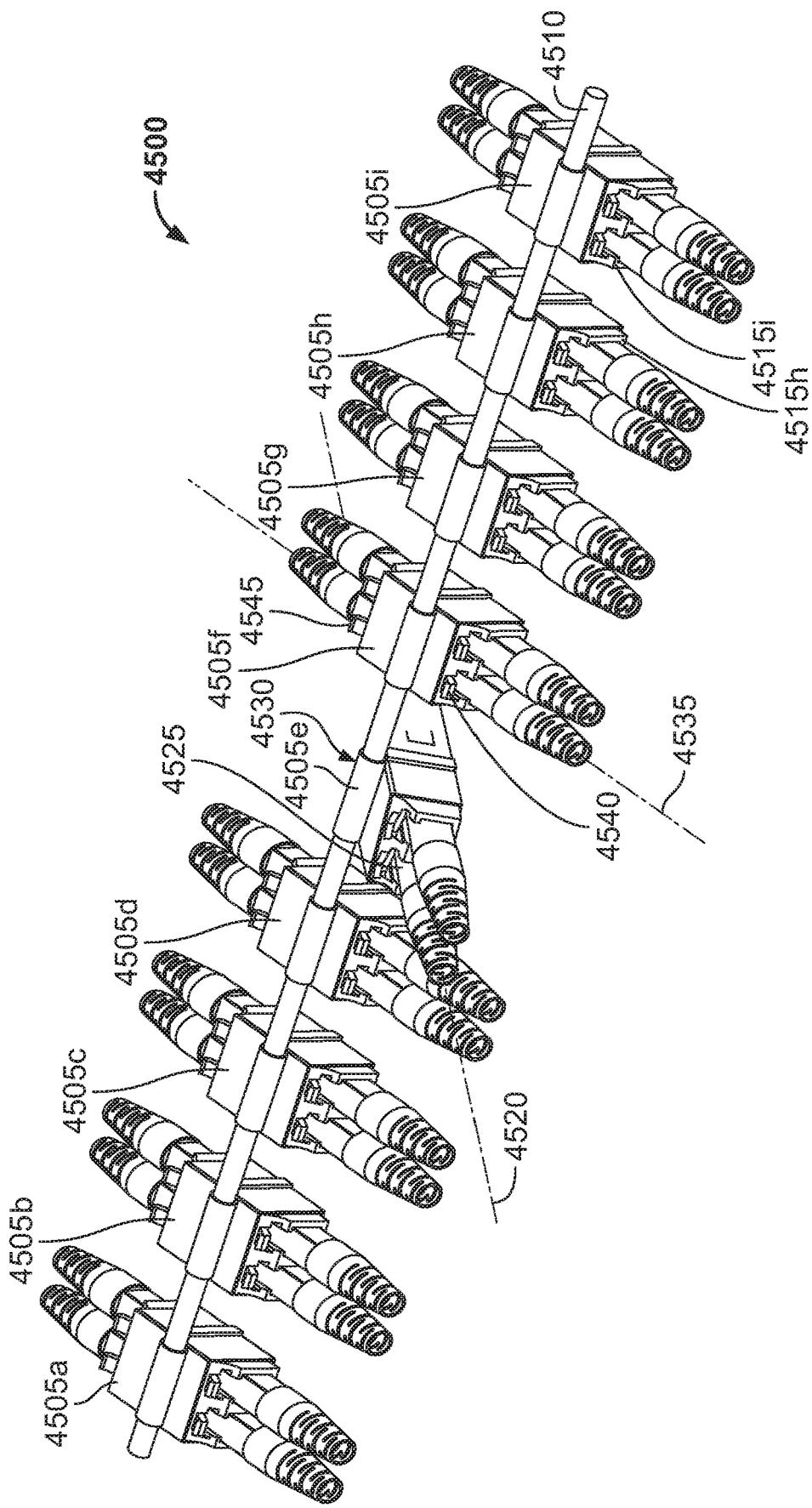
FIG. 45 is perspective view of a patch panel subassembly according to an embodiment.

In the configuration depicted in FIGS. 44A and 44B, the engagement member 4420 has a base portion 4422 with a circular shape. However, it should be noted that the base portion 4422 may have a non-circular shape. For example, the base portion 4422 may have an oval shape, or a racetrack shape (i.e., two curved portions connected by two straight portions), or the like. FIG. 45 is perspective view of a patch panel subassembly 4500 according to an embodiment. The subassembly 4500 includes a multiple of port assemblies 4505*a*, 4505*b* 4505*i*. the port assemblies 4505*a* to 4505*i* are mounted on a mounting rod 4510, which serves as the mounting means of the subassembly 4500. The port assemblies 4505*a* to 4505*i* are individually translatable along a direction parallel to a surface of the mounting rod 4510, which as illustrated in FIG. 45, may parallel the longitudinal axis of the mounting means. Further, since the port assemblies 4505*a* to 4505*i* are individually translatable, a distance between a port of one of the port assemblies, e.g., port 4515*h* of port assembly 4505*h*, and a port of another one of the port assemblies, e.g., port 4515*i* of port assembly 4505*i*, is changeable by moving one or both of the one of the port assemblies, e.g., port assembly 4505*h*, and the another one of the port assemblies, e.g., port assembly 4505*i*. Still further, it is noted that the port assemblies 4505*a* to 4505*i* are individually rotatable such that for any one of the port assemblies, e.g. port assembly 4505*e*, an axis, e.g., axis 4520, passing through the center of a front port, e.g., front port 4525 of the one of the port assemblies and through the center of a corresponding rear port, e.g., rear port 4530, of the one of the port assemblies is positionable to be non-parallel with an axis, e.g., axis 4530, passing through the center of a front port, e.g., port 4540, of another one of the port assemblies, e.g., port assembly 4535, and through the center of a corresponding rear port, e.g., 4545, of the another one of the port assemblies.

Embodiments of the present technology include, but are not restricted to, the following.

(1) A patch panel including a frame; and a plurality of trays supported by the frame and stacked in a first direction, each of the trays configured to receive respective pairs of cable connection terminals, whereby for each pair of cable connection terminals the terminals are configured to be communicatively coupled to each other such that the cable connection terminals extend outward from each other in a direction of a first axis, wherein each tray of the plurality of trays is adapted to slide along one or more guides in the frame between a tray-in position and at least one tray-out position by sliding parallel, or substantially parallel, to other trays of the plurality of trays and in a direction of a second axis angularly offset from the first axis, the tray being displaced less than 100 millimeters when slid between the tray-in position and the tray-out position, and wherein one or more of the trays of the plurality of trays includes at least one handle configured for use in sliding the tray.

(2) The patch panel according to (1), wherein for any given tray of the plurality of trays, any two adjacent cable connection terminals which are not communicatively coupled to each other are spaced a distance (d) apart, any given cable connection terminal extends co-extensively with a first line in the direction of the first axis when in the tray is in the tray-in position, and extends co-extensively with a second line in the direction of the first axis when the tray is in the tray-out position, and the first line and second line are separated by a distance (d/2) in a direction perpendicular to the first axis.

(3) The patch panel according to (2), wherein the distance (d) is between about 15 millimeters and about 25 millimeters.

(4) The patch panel according to (1), further including a mechanical stopper configured to be moved between a locking position and an unlocking position; and a bias spring configured to exert a force on the mechanical stopper to bias the mechanical stopper to the locking position, wherein the mechanical stopper prevents each of the trays from sliding from the tray-in position to the at least one tray-out position when in the locking position, and permits each of the trays to slide from the tray-in position to the at least one tray-out position when in the unlocking position, and wherein any given tray in the at least one tray-out position is configured to prevent the bias spring from biasing the mechanical stopper into the locking position.

(5) The patch panel according to (4), wherein the mechanical stopper includes a plurality of notches in a frame-width direction, wherein the notches are configured to be misaligned with the guides of the frame when the mechanical stopper is in the locking position, and wherein the notches are configured to align with the guides in the frame when the mechanical stopper is in the unlocking position.

(6) A patch panel including a frame; and a plurality of pairs of trays supported by the frame and stacked in a first direction, each of the pairs of trays configured to receive respective pairs of cable connection terminals so that, for each pair of cable connection terminals received by a pair of trays, one of the cable connection terminals is received by a first tray of the pair of trays, a second of the cable connection terminals is received by a second tray of the pair of trays, and the first cable connection terminal and the second cable connection terminal are configured to be communicatively coupled to each other by an intermediate cable such that the cable connection terminals extend outward from each other in a direction of a first axis, wherein the first tray of the pair of trays is adapted to slide between a first tray-in position and at least one first tray-out position by sliding parallel to, or substantially parallel, to trays in other pairs of the plurality of pairs of trays while the second tray of the pair of trays does not move.

(7) The patch panel according to (6), further including a support for supporting the intermediate cable.

(8) The patch panel according to (7), wherein the support provides support in a direction perpendicular to, or substantially perpendicular to, a direction in which the first tray is adapted to slide, and does not provide support in a direction parallel to, or substantially parallel to, the direction in which the first tray is adapted to slide.

(9) The patch panel according to (6), wherein the second tray of the pair of trays is adapted to slide between a second tray-in position and at least one second tray-out position by sliding parallel to, or substantially parallel, to trays in other pairs of the plurality of pairs of trays while the first tray of the pair of trays does not move.

(10) The patch panel according to (6), wherein one or more of the trays of the plurality of pairs of trays includes at least one handle configured for use in sliding the tray.

(11) A patch panel including at least one patch panel subassembly, the patch panel subassembly including at least one mounting plate and a plurality of port assemblies, the at least one mounting plate being configured to accommodate the port assemblies so that each port assembly can individually translate along a direction parallel to a surface of the mounting plate and can rotate about an axis perpendicular to the surface of the mounting plate.

(12) The patch panel according to (11), wherein the at least one mounting plate includes at least one opening for accommodating the port assemblies.

(13) The patch panel according to (12), wherein the at least one mounting plate includes a plurality of openings for accommodating respective ones of the port assemblies so that each port assembly can translate along a longitudinal axis of the respective opening and can rotate about an axis perpendicular to the longitudinal axis.

(14) The patch panel according to (13), wherein for each at least one subassembly the port assemblies are operable to be uniformly spaced along a longitudinal direction of the at least one mounting plate, the port assemblies have a common width dimension, and a spacing distance between the port assemblies is in the range of approximately two percent of the width dimension and approximately twenty percent of the width dimension.

(15) The patch panel according to (11), wherein each port assembly includes a port secured within a port holder, and each port is configured to receive one or more cable connection terminals at a first interface of the port and one or more cable connection terminals at a second interface of the port.

(16) The patch panel according to (11), wherein each of the port assemblies includes a label tab.

(17) The patch panel according to (11), further including at least one hinged portion including a cable hanger and being openable to expose a side of at least a portion of the at least one subassembly.

(18) The patch panel according to (17), including at least two hinged portions, a first one of the hinged portions including one or more first cable hangers and being openable to expose a first side of at least a portion of the at least one subassembly, and a second one of the hinged portions including one or more second cable hangers and being openable to expose a second side of at least one subassembly.

(19) The patch panel according to (18), wherein the one or more first cable hangers support cables extending from the first side of the at least one subassembly, and the second cable hangers support cables extending from the second side of the at least one subassembly.

(20) The patch panel according to (18), wherein a first hinge for the first one of the hinged portions has a first axis of rotation, a second hinge for the second one of the hinged portions has a second axis of rotation, and the first axis of rotation is parallel, or substantially parallel, to the second axis of rotation.

(21) The patch panel according to (18), wherein a first hinge for the first one of the hinged portions has a first axis of rotation, a second hinge for the second one of the hinged portions has a second axis of rotation, and the first axis of rotation is perpendicular, or substantially perpendicular, to the second axis of rotation.

(22) The patch panel according to (11), further including a sliding tray on which the plurality of patch panel subassemblies is mounted.

(23) The patch panel according to (22), further including a first cable jacket for enclosing one or more cables extending from a first side of the plurality of patch panel subassemblies; a first support for supporting the first cable jacket in a direction perpendicular to a sliding direction of the sliding tray and allowing the first cable jacket to move in a plane parallel, or substantially parallel, to a plane in which the sliding tray slides; a first cable hanger for positioning one end of the first cable jacket; a second cable jacket for enclosing one or more cables extending from a second side of the plurality of patch panel subassemblies; a second support for supporting the second cable jacket in a direction perpendicular to a sliding direction of the sliding tray and allowing the second cable jacket to move in a plane parallel, or substantially parallel, to a plane in which the sliding tray slides; and a second cable hanger for positioning one end of the second cable jacket.

(24) The patch panel according to (11), including a plurality of patch panel subassemblies stacked in a first direction.

(25) The patch panel according to (11), wherein the at least one mounting plate comprises a cutout having a dovetail cross-section.

(26) The patch panel according to (25) wherein at least a portion of the port assemblies comprise an engagement member having a dovetail cross-section for engaging the mounting plate.

(27) A patch panel including a plurality of port assemblies that are individually rotatable such that for any one of the port assemblies an axis passing through the center of a front port of the one of the port assemblies and through the center of a corresponding rear port of the one of the port assemblies is positionable to be non-parallel with an axis passing through the center of a front port of another one of the port assemblies and through the center of a corresponding rear port of the another one of the port assemblies.

(28) A patch panel including a plurality of port assemblies arranged in a space, wherein one dimension of the space is less than two times a depth dimension of the port assemblies, and wherein the port assemblies are individually translatable and rotatable in the space.

(29) A patch panel including a plurality of port assemblies arranged in a space, wherein one dimension of the space is less than two times a depth dimension of the port assemblies, and wherein the port assemblies are individually translatable and rotatable in the space, and wherein a distance between a port of one of the port assemblies and a port of another one of the port assemblies is changeable by moving one or both of the one of the port assemblies and the another one of the port assemblies.

(30) A patch panel including a plurality of port assemblies which is associated with at least one mounting means, wherein each port assembly of the plurality of port assemblies is rotatable and translatable while keeping in contact with the at least one mounting means.

(31) The patch panel according to (30), wherein each port assembly of the plurality of port assemblies includes an engagement member having a narrow portion, and the mounting means includes constraining portions for engaging the engagement members to constrain translation of the port assemblies to translation along one direction.

(32) A plurality of port assemblies secured in an elongated space, a longitudinal axis of the space defining a first direction, wherein the port assemblies have at least one front port and one rear port and configured to accept a first cable connection terminal at the front port and to accept a second cable connection terminal at the rear port to make an energy conveying connection between the first cable connection terminal and the second cable connection terminal, the relative positions of the front port and the rear port defines a second direction, the angle between the first direction and the second direction is adjustable within the range of 30 degrees to 90 degrees, and the port assembly can be translated in at least the first direction.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A patch panel comprising:
a frame; and
a plurality of pairs of trays supported by the frame and stacked in a first direction, each of the pairs of trays configured to receive respective pairs of cable connection terminals so that, for each pair of cable connection terminals received by a pair of trays, one of the cable connection terminals is received by a first tray of the pair of trays, a second of the cable connection terminals is received by a second tray of the pair of trays, and the first cable connection terminal and the second cable connection terminal are configured to be communicatively coupled to each other by an intermediate cable such that the cable connection terminals extend outward from each other in a direction of a first axis,
wherein the first tray of the pair of trays is adapted to slide between a first tray-in position and at least one first tray-out position by sliding parallel to, or substantially parallel, to trays in other pairs of the plurality of pairs of trays while the second tray of the pair of trays does not move.

2. The patch panel according to claim 1, further comprising a support for supporting the intermediate cable.

3. The patch panel according to claim 2, wherein the support provides support in a direction perpendicular to, or substantially perpendicular to, a direction in which the first tray is adapted to slide, and does not provide support in a direction parallel to, or substantially parallel to, the direction in which the first tray is adapted to slide.

4. The patch panel according to claim 1, wherein the second tray of the pair of trays is adapted to slide between a second tray-in position and at least one second tray-out position by sliding parallel to, or substantially parallel, to trays in other pairs of the plurality of pairs of trays while the first tray of the pair of trays does not move.

5. The patch panel according to claim 1, wherein one or more of the trays of the plurality of pairs of trays comprises at least one handle configured for use in sliding the tray.

* * * * *